(12) United States Patent
Zhu et al.

(10) Patent No.: US 11,904,938 B2
(45) Date of Patent: Feb. 20, 2024

(54) OBSTACLE AVOIDANCE GUIDANCE FOR GROUND VEHICLES

(71) Applicant: Ohio University, Athens, OH (US)

(72) Inventors: Jianchao Zhu, Athens, OH (US); Letian Lin, Athens, OH (US)

(73) Assignee: Ohio University, Athens, OH (US)

( * ) Notice: Subject to any disclaimer, the term of this patent is extended or adjusted under 35 U.S.C. 154(b) by 572 days.

(21) Appl. No.: 17/048,285

(22) PCT Filed: Apr. 16, 2019

(86) PCT No.: PCT/US2019/027662
§ 371 (c)(1),
(2) Date: Oct. 16, 2020

(87) PCT Pub. No.: WO2019/204296
PCT Pub. Date: Oct. 24, 2019

(65) Prior Publication Data
US 2021/0163068 A1    Jun. 3, 2021

Related U.S. Application Data

(60) Provisional application No. 62/658,035, filed on Apr. 16, 2018.

(51) Int. Cl.
*B62D 15/02* (2006.01)
*G05D 1/02* (2020.01)
*G05D 1/00* (2006.01)

(52) U.S. Cl.
CPC ......... *B62D 15/0285* (2013.01); *G05D 1/021* (2013.01); *G05D 2201/02* (2013.01)

(58) Field of Classification Search
CPC . B62D 15/0285; G05D 1/021; G05D 2201/02
See application file for complete search history.

(56) References Cited

U.S. PATENT DOCUMENTS

| 9,283,960 | B1 | 3/2016 | Lavoie |
| 9,855,890 | B2 | 1/2018 | James et al. |
| 2019/0225267 | A1* | 7/2019 | Ohtani ................. G06V 20/586 |

FOREIGN PATENT DOCUMENTS

| DE | WO 2009015942 | * | 2/2009 |
| JP | WO2017073159 | * | 5/2017 |

(Continued)

OTHER PUBLICATIONS

PCT Office, International Search Report and Written Opinion issued in PCT/US19/27662 dated Aug. 2, 2019.

(Continued)

*Primary Examiner* — Jeff A Burke
*Assistant Examiner* — Sihar A Karwan
(74) *Attorney, Agent, or Firm* — Wood Herron & Evans LLP

(57) ABSTRACT

Systems, methods, and computer program products for guiding vehicles. A vehicle control system detects obstacles and avoids contact between the vehicle, and the obstacles by solving a path planning problem using a four-phase system. In a parking scenario, switching control laws are used to drive the vehicle to a target line, and a forward path segment and a reverse path segment defined. The two path segments are connected along the target line to define a path for entering or exiting the parking space. Objects in a driving environment may be avoided by identifying an obstacle corner, defining an avoidance circle (62), (185) around the obstacle corner, and determining a path that allows the vehicle to avoid penetrating the avoidance circle. A line-of-sight guidance method may be used to follow the path by defining target points on the path at a lookout distance l, and steering the vehicle using the target points.

20 Claims, 32 Drawing Sheets

(56) References Cited

FOREIGN PATENT DOCUMENTS

WO      2009015942 A1      2/2009
WO      2017073159 A1      5/2017

OTHER PUBLICATIONS

"Automatic Parking Based on Bird's Eye View Vision System", Wang et al., Advances in Mechanical Engineering, vol. 2014.
PCT Office, International Preliminary Report on Patentability issued in PCT/US19/27662 dated Oct. 20, 2020.

* cited by examiner

OBSTACLE AVOIDANCE GUIDANCE FOR GROUND VEHICLES

CROSS-REFERENCE TO RELATED APPLICATIONS

This application claims the benefit of U.S. Application No. 62/658,035 filed on Apr. 16, 2018, and entitled "Autonomous Parking and Obstacle Avoidance Guidance for Wheeled Ground Vehicles", the disclosure of which is incorporated by reference herein in its entirety.

BACKGROUND

The present invention relates to autonomous parking and obstacle avoidance guidance for vehicles, and in particular, for wheeled ground vehicles in a confined environment.

This section is intended to introduce the reader to various aspects of art that may be related to various aspects of the present invention, which are described or claimed below. This discussion is believed to be helpful in providing the reader with background information to facilitate a better understanding of various aspects of the present invention. Accordingly, it should be understood that these statements are to be read in this light, and not as admissions of prior art.

Obstacle avoidance in general, where parking is a particular application, is a highly desirable feature with countless applications, and yet is among the greatest of the challenges to autonomous ground vehicles and mobile robots. Two key technical issues to enable autonomous obstacle avoidance and parking are: (1) how to generate a feasible path from an initial vehicle pose (position and orientation) to a final pose without colliding with an obstacle given the non-holonomic kinematics constraints of a wheeled vehicle (i.e. the wheels cannot move sideways), and (2) how to generate a feasible velocity profile for the vehicle to traverse the path at the highest speed having acceptable position errors given the dynamics constraints (i.e. mass and force properties). Parallel parking and backing up a vehicle with a trailer are good examples that demonstrate the technical challenges.

Others have attempted to solve some of the problems in this area. However, those attempts all includes various limitations or deficiencies. According to the strategies implemented, the existing path planning techniques (approaches) for automatic parking can be classified in four main groups: (1) geometric approach, (2) three-step approach, (3) sampling-based approach, and (4) numerical optimization approach. Each of these is discussed in greater detail below.

The geometric approach considers the path planning in vehicle parking as a Euclidean geometry problem, namely, generating a path by using a set of curves with basic geometrical equations that satisfy the maximum curvature constraint. Many studies of the geometric approach consider generating a path with straight line segments and circle arcs. This type of paths was implemented for parallel parking [see Vorobieva, H., Glaser, S., Minoiu-Enache, N., and Mammar, S., 2015, "Automatic parallel parking in tiny spots: Path planning and control," IEEE Transactions on Intelligent Transportation Systems, 16(1), pp. 396-410; Lo, Y., Rad, A., Wong, C., and Ho, M., 2003, "Automatic parallel parking," In Intelligent Transportation Systems, 2003, Proceedings, 2003 IEEE, Vol. 2, IEEE, pp. 1190-1193; and Sungwoo, C., Boussard, C., and d'Andréa Novel, B., 2011, "Easy path planning and robust control for automatic parallel parking," IFAC Proceedings Volumes, 44(1), pp. 656-661], and for perpendicular parking [see Wang, C., Zhang, H., Yang, M., Wang, X., Ye, L., and Guo, C., 2014, "Automatic parking based on a bird's eye view vision system," Advances in Mechanical Engineering, Volume 2014, Article ID 847406. In Paromtchik, I. E., and Laugier, C., 1996, "Autonomous parallel parking of a nonholonomic vehicle," In Intelligent Vehicles Symposium, 1996, Proceedings of the 1996 IEEE, IEEE, pp. 13-18 and in Paromtchik, I. E., and Laugier, C., 1996, "Motion generation and control for parking an autonomous vehicle," Robotics and Automation, 1996, Proceedings, 1996 IEEE International Conference on, Vol. 4, IEEE, pp. 3117-3122, the backward motion of parallel parking is selected from a class of time-parametrized curves that are generated by applying the sinusoidal control inputs to the vehicle. The method was extended to the head-in perpendicular parking [in Paromtchik, I. E., 2003, "Planning control commands to assist in car maneuvers," In Proc. of the 11th IEEE Int. Conf. on Advanced Robotics, pp. 1308-1313], and to back-in perpendicular parking [in Pradalier, C., Vaussier, S., and Corke, P., 2005, "Path planning for a parking assistance system: Implementation and experimentation," Australian Robotics and Automation Association, Sydney, Australia]. In additional work, in order to reduce the dependence on human's knowledge in design, a fuzzy logic was introduced to the geometric approach to adjust the parameters of the predefined curve patterns [see Gómez-Bravo, F., Cuesta, F., and Ollero, A., 2001, "Parallel and diagonal parking in nonholonomic autonomous vehicles," Engineering applications of artificial intelligence, 14(4), pp. 419-434; Li, T.-H., and Chang, S.-J., 2003, "Autonomous fuzzy parking control of a car-like mobile robot," IEEE Transactions on Systems, Man, and Cybernetics-Part A: Systems and Humans, 33(4), pp. 451-465; and Razinkova, A., Cho, H.-C., and Jeon, H.-T., 2012, "An intelligent auto parking system for vehicles," International Journal of Fuzzy Logic and Intelligent Systems, 12(3), pp. 226-231.

In Laumond, J.-P., Jacobs, P. E., Taix, M., and Murray, R. M., 1994, "A motion planner for nonholonomic mobile robots," IEEE Transactions on Robotics and Automation, 10(5), pp. 577-593 and Laumond, J., Sekhavat, S., and Vaisset, M., 1994, "Collision-free motion planning for a nonholonomic mobile robot with trailers," IFAC Proceedings Volumes, 27(14), pp. 171-177, a three-step path planning approach for non-holonomic systems was proposed and its application in parallel parking was presented. The algorithm begins with computing a collision-free path without satisfying the non-holonomic constraints. Then, by taking into account the non-holonomic constraints and the other kinematic constraints, the path obtained in step one is approximated by a concatenation of segments computed by a local planner. In the last step, the path generated in step two is optimized into a shorter and smoother one with fewer cusps.

The sampling-based approach employs the sampling-based pathfinding algorithms which has been extensively studied in robotic and computer science. Instead of explicitly constructing the free space, which is time-consuming to compute [see Jiang, K., Seneviratne, L. D., and Earles, S., 1999, "A shortest path based path planning algorithm for nonholonomic mobile robots," Journal of intelligent & robotic systems, 24(4), pp. 347-366], these algorithms probe the free space and conduct a search with a sampling strategy. The algorithms stop when a path connecting the initial and final poses is found. According to the sampling type, the sampling-based pathfinding algorithms can be classified into two categories: randomly sampling-based algorithms and orderly sampling-based algorithms. The most popular randomly sampling-based algorithms is the Rapidly-exploring Random Tree (RRT) [see LaValle, S. M., and Kuffner Jr, J. J., 2000, "Rapidly exploring random trees: Progress and prospects," and Pepy, R., Lambert, A., and Mounier, H., 2006, "Path planning using a dynamic vehicle model," In Information and Communication Technologies, 2006, ICTTA'06, 2nd, Vol. 1, IEEE, pp. 781-786]. RRT was applied to path planning in labyrinth environment for the car-like robot [in Pepy, et al. 2006]. Its applications in perpendicular parking and parallel parking were shown [in Kuwata, Y., Teo, J., Fiore, G., Karaman, S., Frazzoli, E., and How, J. P., 2009, "Real-time motion planning with applications to autonomous urban driving," IEEE Transactions on Control Systems Technology, 17(5), pp. 1105-1118, and Han, L., Do, Q. H., and Mita, S., 2011, "Unified path planner for parking an autonomous vehicle based on rrt," In Robotics and Automation (ICRA), 2011 IEEE International Conference on, IEEE, pp. 5622-5627, respectively]. The most notable orderly sampling-based algorithm is A* [see Nilsson, N. J., 2014. Principles of artificial intelligence. Morgan Kaufmann] and its extensions. In Dolgov, D., Thrun, S., Montemerlo, M., and Diebel, J., 2008, "Practical search techniques in path planning for autonomous driving," Ann Arbor, 1001(48105), pp. 18-80, a path planner based on the Hybrid-State A* was used in perpendicular parking for a real car. Another orderly sampling-based algorithm was developed in Kim, D., and Chung, W., 2008, "Motion planning for carparking using the slice projection technique," In Intelligent Robots and Systems, 2008, IROS 2008, IEEE/RSJ International Conference on, IEEE, pp. 1050-1055, where the possible traces of a car backing out from the parking space are sampled in order. In Yang, S. X., and Meng, M.-H., 2003, "Real-time collision-free motion planning of a mobile robot using a neural dynamics-based approach," IEEE Transactions on Neural Networks, 14(6), pp. 1541-1552, a neural dynamics based motion planning algorithm which is essentially an orderly sampling-based one was applied to parallel parking.

In the numerical optimization approach, by introducing an optimality objective, the motion planning problem for a non-holonomic system is reformulated as an open-loop optimal control problem and solved numerically. In Kondak, K., and Hommel, G., 2001, "Computation of time optimal movements for autonomous parking of nonholonomic mobile platforms," In Robotics and Automation, 2001, Proceedings 2001 ICRA, IEEE International Conference on, Vol. 3, IEEE, pp. 2698-2703, the minimum time paths were found for all three parking cases where the optimization problem was solved by using sequential quadratic programming (SQP). A similar study was carried out [in Li, B., Wang, K., and Shao, Z., 2016, "Time-optimal maneuver planning in automatic parallel parking using a simultaneous dynamic optimization approach," IEEE Transactions on Intelligent Transportation Systems, 17(11), pp. 3263-3274] where the interior-point method [see Wächter, A., and Biegler, L. T., 2006, "On the implementation of an interior-point filter line-search algorithm for large-scale nonlinear programming," Mathematical programming, 106(1), pp. 25-57] was used to solve the optimization problem. In Zips, P., Bock, M., and Kugi, A., 2013, "A fast motion planning algorithm for car parking based on static optimization," In Intelligent Robots and Systems (IROS), 2013 IEEE/RSJ International Conference on, IEEE, pp. 2392-2397 and Zips, P., Böck, M., and Kugi, A., 2016, "Optimisation based path planning for car parking in narrow environments," Robotics and Autonomous Systems, 79, pp. 1-11, the path planning problem was discretized and the path is determined by solving a static optimization problem iteratively.

All of these approaches have limitations and deficiencies. Thus, there is a need for improved systems, methods, and computer program products that provide autonomous parking and obstacle avoidance for vehicles.

SUMMARY

In an embodiment of the invention, a system is provided. The system includes one or more processors, and a memory coupled to the one or more processors that includes program code which, when executed by the one or more processors, causes the system to define a virtual space including a vehicle, a parking space, an obstacle corner, and a target line. The program code further causes the system to determine a ready position from which the vehicle can avoid the obstacle corner when moving between the ready position and the target line, move the vehicle between a first pose in the parking space and a second pose in the ready position, move the vehicle between the second pose and a third pose on the target line, and determine a first path segment by tracing the vehicle as the vehicle is moved between the first pose, the second pose, and the third pose. The program code further causes the system to move the vehicle between a fourth pose outside the parking space and a fifth pose on the target line and determine a second path segment by tracing the vehicle as the vehicle is moved between the fourth pose and the fifth pose. The program code then causes the system to connect the first path segment to the second path segment to define a virtual path between the first pose and the fourth pose, and generate one or more control signals that cause a physical vehicle to move in a physical space using the virtual path in the virtual space.

In an aspect of the invention, the first pose is one of an initial pose or a final pose, and the fourth pose is the other of the initial pose or the final pose.

In another aspect of the invention, the target line is in a drive aisle adjacent to the parking space.

In another aspect of the invention, the program code causes the system to move the vehicle between the first pose in the parking space and the second pose in the ready position by moving the vehicle from the first pose to the second pose.

In another aspect of the invention, the program code causes the system to move the vehicle between the second pose and the third pose by moving the vehicle from the third pose to the second pose.

In another aspect of the invention, the program code causes the system to define the virtual space to further include a bounded region, and the vehicle is kept within the bounded region.

In another aspect of the invention, the vehicle includes an orientation and a position, and when the vehicle is in the third pose, the orientation of the vehicle is within an orientation tolerance of the target line and the position of the vehicle is within a position tolerance of the target line.

In another aspect of the invention, the vehicle has a longitudinal axis and a width, and the program code causes the system to move the vehicle between the first pose and the second pose by defining an avoidance circle around the obstacle corner having a radius greater than half the width of the vehicle, maneuvering the vehicle from the first pose until the longitudinal axis is pointing out of the parking space without hitting the avoidance circle, straightening a steering angle of the vehicle, and moving the vehicle forward to the second pose.

In another aspect of the invention, the vehicle has a rear axle having a midpoint, and the program code causes the system to maneuver the vehicle from the first pose until the longitudinal axis is pointing out of the parking space without hitting the avoidance circle by defining a line-of-sight that intersects the midpoint of the rear axle, points out of the parking space, and is tangent to the avoidance circle, and alternately adjusting the steering angle and moving the vehicle backward and forward one or more times until an acute angle between the longitudinal axis of the vehicle and the line-of-sight is below an orientation threshold.

In another aspect of the invention, the program code causes the system to connect the first path segment to the second path segment along the target line.

In another aspect of the invention, the program code causes the system to connect the first path segment to the second path segment using a polynomial curve.

In another aspect of the invention, the program code further causes the system to generate the one or more control signals by converting the virtual path to a trajectory.

In another aspect of the invention, the trajectory satisfies kinematics constraints of the vehicle, dynamics constraints of the vehicle, or both the kinematics constraints and the dynamics constraints of the vehicle.

In another aspect of the invention, the virtual path includes one or more path segments, and the program code causes the system to convert the virtual path to the trajectory by assigning a prespecified velocity profile to each path segment.

In another aspect of the invention, the prespecified velocity profile is selected from a plurality of prespecified velocity profiles based on a cost function that minimizes an error between the trajectory and the virtual path.

In another aspect of the invention, the program code causes the system to convert the virtual path to the trajectory by defining a line-of-sight that intersects the midpoint of the rear axle of the vehicle and a virtual target on the virtual path, selecting a position of the virtual target on the virtual path that provides a lookout distance and a line-of-sight angle, and determining a yaw rate for the vehicle based on the lookout distance, the line-of-sight angle, and a speed of the vehicle.

In another aspect of the invention, the speed for the vehicle is determined based on a curvature of the virtual path.

In another aspect of the invention, the position of the virtual target is selected so that the lookout distance is inversely proportional to the curvature of the virtual path.

In another aspect of the invention, the yaw rate for the vehicle and the speed for the vehicle are further determined based on a guidance constant, and the guidance constant is increased in response to a change in a sign of a curvature of the virtual path.

In another embodiment of the invention, a method is provided. The method includes defining a virtual space including the vehicle, the parking space, the obstacle corner, and the target line. The method further includes determining the ready position from which the vehicle can avoid the obstacle corner when moving between the ready position and the target line, moving the vehicle between the first pose in the parking space and the second pose in the ready position, moving the vehicle between the second pose and the third pose on the target line, and determining the first path segment by tracing the vehicle as the vehicle is moved between the first pose, the second pose, and the third pose. The method further includes moving the vehicle between the fourth pose outside the parking space and the fifth pose on the target line, determining the second path segment by tracing the vehicle as the vehicle is moved between the fourth pose and the fifth pose, connecting the first path segment to the second path segment to define the virtual path between the first pose and the fourth pose, and generating one or more control signals that cause the physical vehicle to move in the physical space using the virtual path in the virtual space.

In another aspect of the invention, the method moves the vehicle between the first pose in the parking space and the second pose in the ready position by moving the vehicle from the first pose to the second pose.

In another aspect of the invention, the method moves the vehicle between the second pose and the third pose by moving the vehicle from the third pose to the second pose.

In an aspect of the invention, the method further includes defining the virtual space to further include the bounded region, and keeping vehicle within the bounded region.

In another aspect of the invention, moving the vehicle between the first pose and the second pose includes defining the avoidance circle around the obstacle corner having the radius greater than half the width of the vehicle, maneuvering the vehicle from the first pose until the longitudinal axis is pointing out of the parking space without hitting the avoidance circle, straightening the steering angle of the vehicle, and moving the vehicle forward to the second pose.

In another aspect of the invention, the vehicle has a longitudinal axis and a width, and the method moves the vehicle between the first pose and the second pose by defining the avoidance circle around the obstacle corner having the radius greater than half the width of the vehicle, maneuvering the vehicle from the first pose until the longitudinal axis is pointing out of the parking space without hitting the avoidance circle, straightening the steering angle of the vehicle, and moving the vehicle forward to the second pose.

In another aspect of the invention, maneuvering the vehicle from the first pose until the longitudinal axis is pointing out of the parking space without hitting the avoidance circle includes defining the line-of-sight that intersects the midpoint of the rear axle, points out of the parking space, and is tangent to the avoidance circle, and alternately adjusting the steering angle and moving the vehicle backward and forward one or more times until an acute angle between the longitudinal axis of the vehicle and the line-of-sight is below an orientation threshold.

In another aspect of the invention, the method connects the first path segment to the second path segment along the target line.

In another aspect of the invention, the method connects the first path segment to the second path segment using the polynomial curve.

In another aspect of the invention, the method generates the one or more control signals by converting the virtual path to the trajectory.

In another aspect of the invention, the virtual path includes one or more path segments, and the method converts the virtual path to the trajectory by assigning the prespecified velocity profile to each path segment.

In another aspect of the invention, the method selects the prespecified velocity profile from the plurality of prespecified velocity profiles based on the cost function that minimizes the error between the trajectory and the virtual path.

In another aspect of the invention, the method converts the virtual path to the trajectory by defining the line-of-sight that intersects the midpoint of the rear axle of the vehicle and the virtual target on the virtual path, selecting the position of the virtual target on the virtual path that provides the lookout distance and the line-of-sight angle, and determining the yaw rate for the vehicle based on the lookout distance, the line-of-sight angle, and the speed of the vehicle.

In another embodiment of the invention, a computer program product is provided. The computer program product includes a non-transitory computer-readable storage medium, and program code stored on the non-transitory computer-readable storage medium. The program code is configured so that, when executed by one or more processors, the program code causes the one or more processors to define the virtual space including the vehicle, the parking space, the obstacle corner, and the target line. The program code further causes the one or more processors to determine the ready position from which the vehicle can avoid the obstacle corner when moving between the ready position and the target line, move the vehicle between the first pose in the parking space and the second pose in the ready position, move the vehicle between the second pose and the third pose on the target line, and determine the first path segment by tracing the vehicle as the vehicle is moved between the first pose, the second pose, and the third pose. The program code further causes the one or more processors to move the vehicle between the fourth pose outside the parking space and the fifth pose on the target line, determine the second path segment by tracing the vehicle as the vehicle is moved between the fourth pose and the fifth pose, connect the first path segment to the second path segment to define the virtual path between the first pose and the fourth pose, and generate the one or more control signals that cause the physical vehicle to move in the physical space using the virtual path in the virtual space.

In another embodiment of the invention, a system for controlling a vehicle is provided. The system includes one or more processors, and memory coupled to the one or more processors and including program code that, when executed by the one or more processors, causes the system to identify an obstacle corner on an obstacle blocking a current path of the vehicle, define an avoidance circle centered on and defining a prohibited region around the obstacle corner, define a line-of-sight that passes through a position point of the vehicle and outside the prohibited region, calculate an updated path using the line-of-sight, and generate one or more control signals that cause the vehicle to steer toward the updated path.

In an aspect of the invention, the program code causes the system to define the line-of-sight by defining a tangent line passing through the position point of the vehicle and tangent to the avoidance circle at a ready position, and defining the line-of-sight as a line that passes through the position point of the vehicle and through the ready position or past the ready position in a direction outside the prohibited region.

In another aspect of the invention, the position point of the vehicle may be one of a midpoint of an axle of the vehicle, or a geometric center of the vehicle.

In another aspect of the invention, the program code may further cause the system to, in response to being unable to define the line-of-sight that passes through the position point of the vehicle and outside the prohibited region, bring the vehicle to a stop.

In another aspect of the system, the obstacle may be one of a plurality of obstacles each having a respective obstacle corner, and the program code may further cause the system to define a respective avoidance circle centered on and defining a respective prohibited region around each obstacle corner, and define the line-of-sight that passes through the position point of the vehicle and outside each of the prohibited regions.

In another embodiment of the invention, a method of controlling the vehicle is provided. The method includes identifying the obstacle corner on the obstacle blocking the current path of the vehicle, defining the avoidance circle centered on and defining the prohibited region around the obstacle corner, defining the line-of-sight that passes through the position point of the vehicle and outside the prohibited region, calculating the updated path using the line-of-sight, and generating one or more control signals that cause the vehicle to steer toward the updated path.

In an aspect of the invention, defining the line-of-sight includes defining the tangent line passing through the position point of the vehicle and tangent to the avoidance circle at the ready position, and defining the line-of-sight as the line that passes through the position point of the vehicle and through the ready position or past the ready position in the direction outside the prohibited region.

In another aspect of the invention, the method further includes, in response to being unable to define the line-of-sight that passes through the position point of the vehicle and outside the prohibited region, bringing the vehicle to a stop.

In another aspect of the invention, the obstacle may be one of the plurality of obstacles each having the respective obstacle corner, and the method may further include defining the respective avoidance circle centered on and defining the respective prohibited region around each obstacle corner, and defining the line-of-sight that passes through the position point of the vehicle and outside each of the prohibited regions.

In another embodiment of the invention, a computer program product for controlling a vehicle is presented. The computer program product may include a non-transitory computer-readable storage medium, and program code stored on the non-transitory computer-readable storage medium that, when executed by one or more processors, causes the one or more processors to identify the obstacle corner on the obstacle blocking the current path of the vehicle, define the avoidance circle centered on and defining the prohibited region around the obstacle corner, define the line-of-sight that passes through a position point of the vehicle and outside the prohibited region, calculate the updated path using the line-of-sight, and generate one or more control signals that cause the vehicle to steer toward the updated path.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
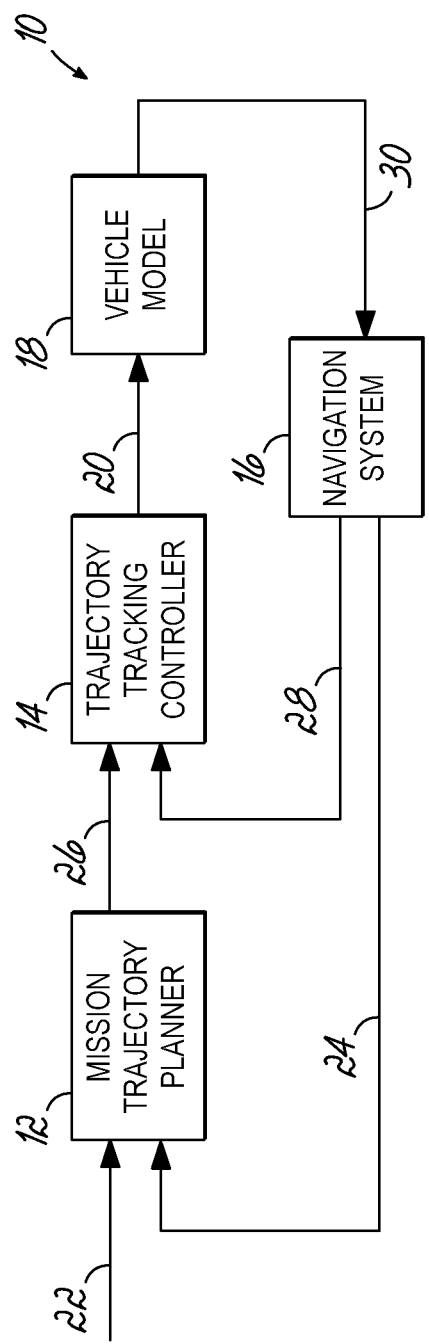
FIG. 1 is a schematic view of vehicle control system including a mission trajectory planner, a trajectory tracking controller, a navigation system, and a vehicle model in accordance with an embodiment of the invention.

One or more specific embodiments of the present invention are described below. In an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Motion of the vehicle at low speed may subject to nonholonomic constraints which make maneuvering very complex. Moreover, as the parking spaces have become narrow in cities, parking can be stressful even for experienced drivers.

Embodiments of the invention solve a path planning problem for autonomous vehicle parking using a path planner that copes with parking in tight environments for all common parking scenarios using a novel four-phase system. By using switching control laws to drive a virtual vehicle to a target line, a forward path segment and a reverse path segment are obtained. The two path segments are connected along the target line to define a virtual path for entering or exiting the parking space. As illustrated by simulation results, the proposed path planning algorithm is fast, highly autonomous, sufficiently general, and can be used in tight environment.

As described above, obstacle avoidance in general, and in particular, obstacle avoidance while parking, is a highly desirable feature with countless applications. And yet, obstacle avoidance is one of the greatest challenges to autonomous ground vehicles and mobile robots. Present attempts to solve the challenges in this area have been inadequate. Various aspects of the present invention overcome these challenges and the drawbacks of the prior art.

In that regard, certain aspects of the present invention include a computational method or algorithm that enables wheeled ground vehicle parking and driving around obstacles without human intervention. The algorithm may be implemented using a computer system onboard of the vehicle with one or more motion sensors, situational awareness sensors, and suitable steering and speed actuators. The computer system may use a local pathway and obstacle map generated by the situational awareness sensor, or received from an off-board information source, and generate feasible trajectories. These trajectories may be provided to a trajectory tracking controller to park the vehicle in tight spaces or drive through a tightly-cluttered obstacle course promptly and smoothly with minimal maneuvers, time, computational power, and human intervention.

FIG. 1 depicts an exemplary autonomous vehicle control system 10 in accordance with an embodiment of the invention. The control system 10 may include a mission trajectory planner 12, a trajectory tracking controller 14, a navigation system 16, and a vehicle model 18 that receives control signals 20 from the trajectory tracking controller 14. The control signals 20 may include, for example, one or more signals indicative of a steering angle, throttle, and brake input. Based on mission objective data 22 and situational awareness data 24, the mission trajectory planner 12 may generate data defining a feasible, collision-free nominal trajectory 26 configured to lead the vehicle to a fixed target (e.g., a destination) or moving target (e.g., a leading vehicle). The trajectory tracking controller 14 may control the vehicle to follow the nominal trajectory 26 as well as account for tracking errors, modeling errors, and disturbances. The navigation system 16 may seek the target and detect the operating environment of the vehicle. The navigation system 16 may also provide measurements 28 of the vehicle state useful for autonomous vehicle control to the trajectory tracking controller 14 based on vehicle output data 30 received from the vehicle model 18.

Figure 2:
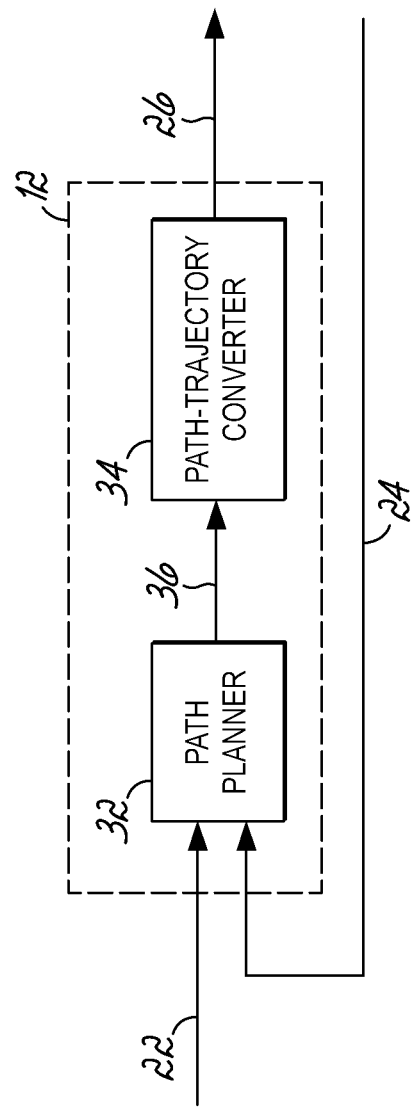
FIG. 2 is a schematic view of the mission trajectory planner of FIG. 1 including a path planner and path-trajectory converter.

FIG. 2 depicts an exemplary mission trajectory planner 12 that includes a path-planner 32 and a path-trajectory converter 34. Based on the mission objective data 22 and the situational awareness data 24, the path-planner 32 may generate a feasible, collision-free path that connects the starting point to the destination. The path-trajectory converter 34 may receive data defining the path 36, and assign an appropriate velocity profile along the path, thereby converting the path into the nominal trajectory 26. Path planning may be used to solve the autonomous vehicle parking problem.

Path planning techniques for autonomous vehicle parking may be classified in four main groups: (1) geometric approaches, (2) three-step approaches, (3) sampling-based approaches, and (4) numerical optimization approaches. Geometric approaches consider the path planning in vehicle parking as a Euclidean geometry problem, and generate a path by using a set of curves with basic geometrical equations that satisfy a maximum curvature constraint. Geometric approaches thereby generate a path using straight line segments and circle arcs. This type of path may be implemented for parallel parking and for perpendicular parking. The backward motion of parallel parking may be selected from a class of time-parametrized curves that are generated by applying sinusoidal control inputs to the vehicle. The method may be extended to head-in perpendicular parking and to back-in perpendicular parking. To reduce the dependence on human knowledge in the design of systems using a geometric approach, fuzzy logic may be introduced into the geometric approach to adjust the parameters of the predefined curve patterns.

Three-step path planning approaches for non-holonomic systems may be used in parallel parking applications. The parallel parking algorithm may begin by computing a collision-free path without satisfying the nonholonomic constraints. Then, by taking into account the nonholonomic constraints and the other kinematics constraints, the computed path may be approximated by a connected group of segments computed locally. The approximated path may then be optimized into a shorter and smoother path with fewer cusps.

Sampling-based approaches may employ sampling-based pathfinding algorithms. Instead of explicitly constructing the free space, which is time-consuming to compute, these algorithms probe the free space and conduct a search with a sampling strategy. The algorithms stop when a path connecting the initial and final poses is found. According to the sampling type, the sampling-based pathfinding algorithms may be classified into two categories: random-sampling-based algorithms and orderly-sampling-based algorithms. One random-sampling-based algorithm is the Rapidly-exploring Random Tree (RRT). RRT may be applied to path planning in a labyrinth environment for vehicle-like robots, and may also be used for perpendicular parking and parallel parking applications. An orderly-sampling-based algorithm that may be used in autonomous driving systems is A* and its extensions. A path planner based on the Hybrid-State A* may be used in perpendicular parking. Orderly-sampling-based algorithms may be used in cases where possible traces of a vehicle backing out from a parking space are sampled in order. A neural dynamics-based algorithm, which is essentially an orderly-sampling-based algorithm, may also be applied to parallel parking.

Numerical optimization approaches operate by introducing an optimality objective. The motion planning problem for a non-holonomic system may then be reformulated as an open-loop optimal control problem and solved numerically. Minimum time paths may be found for parking, and the optimization problem solved using Sequential Quadratic Programming (SQP). Interior-point methods may also be used to solve the optimization problem. The path planning problem may be discretized, and the path determined by solving a static optimization problem iteratively.

Criteria used to evaluate a path planner may include computing time, smoothness of path, number of cusps on path, tight parking capability, applicability to different scenarios, and dependence on human knowledge and intervention. A comparison of the four path planning approaches in terms of these criteria is shown in Table I.

One advantage of the geometric approach is that, since the path is solved geometrically, the computation is relatively fast. Also, implementation of the algorithm is relatively simple. In contrast, the other approaches are relatively time-consuming from the practical perspective. For example, a typical computing time of an optimization-based path planner may be about 20 ms. However, the actual computing time can be much larger if the landmarks and the weighting factors in the cost function are not selected optimally. Although the geometric approach is fast and simple, it has some drawbacks. First, a geometric planner can typically only be applied to a specific parking scenario, and may fail for small environmental changes. Second, the design typically involves a great deal of human knowledge. Third, the driver must drive the vehicle to a pre-specified zone to enable planning. Disadvantages of the three-step approach include the requirement for a large amount of computing resources, and that it often results in a path with too many cusps. Sampling-based approaches have a very low efficiency in tight parking and the resulting path is often jerky.

TABLE I

Comparison of Path Planning Approaches

| Approach | Computing Time | Smoothness | No. of Cusps | Applicability to Scenarios | Tight Parking | Tight Drive Aisle | Dependence on Human Knowledge/ Intervention |
|---|---|---|---|---|---|---|---|
| Geometric | Very Short | Good | Med | Low | Fair | Poor | High |
| 3-Step | Long | Good | Large | High | Good | Good | Low |
| Random Sampling-Based | Medium | Bad | Med | High | Poor | Poor | Low |
| Orderly Sampling Based | Medium | Fair | Small | High | Fair | Fair | Low |
| Numerical Optimization | Vary Long (incl. initialization) | Good | Small | High | Good | Good | Low |

To produce a path in a reasonable amount of time, the numerical optimization approach requires a good initial guess. This initial guess may greatly extend the computing time if it is non-optimal. For example, it may take over 40 s to compute the initial guess using commonly available Central Processing Unit (CPU) technology. However, the initialization must be carried out for each new parking environment that is not included in the lookup table. Therefore, it is a challenging problem to design a fast path planner that has a good performance according to these criteria.

Embodiments of the invention may include a path planner for autonomous vehicle parking that includes features which provide improvements over conventional systems. These features may include path-generation using a four-phase scheme. In phases one and two, a reverse path may be determined by moving a virtual vehicle from a parking space and steering it to a target line in a drive aisle. In phase three, a forward path may be generated by steering the virtual vehicle from the initial pose to the target line. In phase four, the two paths may be connected along the target line to define a virtual path that can be used to generate a trajectory for the physical vehicle.

Instead of finding a path with enough width to accommodate the vehicle or computing the free-space, embodiments of the invention may pad obstacles with a buffer zone for collision avoidance, thereby reducing the feasible path to a single line. Advantageously, this feature may improve the computational efficiency of the system.

A feasible path may be generated using a Line-Of-Sight (LOS) Pure Pursuit Guidance (PPG) technique, which may produce a feasible path segments that are natural and smooth.

The problem of retrieving a virtual parked vehicle from the parking space may be formulated as a first-order nonlinear switching control problem, and the problem of steering the virtual vehicle to the target line may be formulated as a third-order nonlinear switching control problem. For each problem, an effective switching control law may be designed. The use of switching control theory solve the path planning problem provides a novel solution to solving these problems associated with autonomous parking.

Path-trajectory converters 34 may be classified into two categories: velocity profile assignment converters and optimal path-to-trajectory converters. In the velocity profile assignment approach, a velocity profile in a prespecified shape (e.g., a trapezoidal shape) is assigned on each path segment. In the optimal path-to-trajectory conversion algorithm, the dynamics of the vehicle may be characterized as a 2nd-order integrator, and the path-to-trajectory conversion problem converted to a free ending time optimal control problem.

In order to generate the trajectories in a real-time manner, the computing time of path-to-trajectory conversion should be short. Moreover, the resulting trajectory should be feasible to track. Although the velocity profile assignment approach may be relatively simple to implement, it does not take into account the dynamics of the vehicle. Thus, the resulting trajectories may be difficult, or even impossible to track by the real vehicle. Since the real vehicle's dynamics may be quite different from the $2^{nd}$-order integrator, the resulting trajectory of the optimal path-to-trajectory conversion algorithm may be non-optimal in a practical context and can still be difficult for the vehicle to track. In addition, the computation of an optimal trajectory is time-consuming for a long path.

Embodiments of the invention use a two-step algorithm to convert a path to a trajectory for automatic vehicle parking. In Step 1, coarse path-to-trajectory conversion may be conducted by assigning a pre-specified velocity profile on each path segment. In Step 2, optimal control may be implemented to generate an optimal trajectory for difficult segments of the path where the kinematics or dynamics constraints are violated.

The following definitions may be used throughout the specification to facilitate an understanding of embodiments of the invention.

Switched System: Given a family of continuous vector fields:

$$\{f_p: \mathbb{R}^n \times \mathbb{R}^m \to \mathbb{R}^n, p \in \mathscr{P}\}$$

where $$\mathscr{P} = \{1, 2, \ldots, N\}$$

is a set of positive integers, a continuous-time switched system may be modeled as:

$$\dot{\xi} = f_\sigma(\xi, \mu) \qquad \text{Eqn. 1}$$

where a switching signal is provided by $$\sigma: [0, +\infty) \to \mathscr{P}$$

which is a piecewise continuous integer-valued function of time that specifies the vector field being followed at each time instant.

Dwell Time: A switching signal σ(t) is said to have a dwell time $\tau_d > 0$ if the switching times $t_1, t_2, \ldots$ satisfy the inequality:

$$\inf_{k\geq 1}(t_{k+1} - t_k) \geq \tau_d$$

In other words, if a switching signal has a dwell time $\tau_d$, then the time interval between any two consecutive switching is not smaller than $\tau_d$. The following definitions may be made for the unforced switched system:

$$\dot{\xi} = f_\sigma(\xi), \sigma:[0,+\infty) \to \mathscr{P} \quad \text{Eqn. 2}$$

Weak Invariance: A compact set $M \subset \mathbb{R}^n$ may be weakly invariant with respect to Equation 2 if for each $\xi \in M$ there is an index $p \in \mathscr{P}$, a solution $\phi(t)$ of the vector field $f_p(\xi)$, and $T>0$ such that $\phi(0)=\xi$ and $\phi(t) \in M$ for either $t \in [-T,0]$ or $t \in [0,T]$.

Common Weak Lyapunov Function: Let $\Omega$ be an open subset of $\mathbb{R}^n$ containing the origin. A continuously differentiable function $$V(\xi):\Omega \to [0,+\infty)$$

is said to be a common weak Lyapunov function for Equation 2 if it is positive, definite, and satisfies $$\frac{\partial V}{\partial x} f_p(\xi) \leq 0 \quad \text{Eqn. 3}$$

for each $\xi \in \Omega$ and each $p \in \mathscr{P}$

Attractivity: A solution for $\phi(t)$ of Equation 2 is said to be attracted by a compact set $M \subset \mathbb{R}^n$ if for each $\varepsilon>0$ there exists $T>0$ such that:

$$\text{Dist}(\phi(t),M)<\varepsilon, \forall t \geq T \quad \text{Eqn. 4}$$

where $\text{Dist}(\bullet,\bullet)$ is the point-to-set distance function on $\mathscr{P}^n$ defined by:

$$\text{Dist}(x,E) = \inf_{y \in E}\|x - y\|, \text{ for } x \in \mathbb{R}^n, \emptyset \neq E \subset \mathbb{R}^n \quad \text{Eqn. 5}$$

By using the above definitions, the extension of LaSalle's Invariance Principle to switched systems may be stated as follows:

Theorem 1.1: Let $V(\xi):\Omega \to [0,+\infty)$ be a weak Lyapunov function for Equation 2. Let $c>0$ and let $\Omega_c$ be the connected component of the level set $\{\xi \in \Omega:V(\xi)<c\}$ such that $0 \in \Omega_c$. Assume that $\Omega_c$ is bounded and let $$Z = \left\{\xi \in \Omega: \exists p \in \mathscr{P} \text{ such that } \frac{\partial V}{\partial x} f_p(\xi) = 0\right\} \quad \text{Eqn. 6}$$

Let M be the union of all compact, weakly invariant sets which are contained in $Z \cap \Omega_c$. If the switching signal has a dwell time, then every solution $\phi(t)$ to Eqn. 2 with $\phi(0) \in \Omega_c$ is attracted by M.

Figure 3:
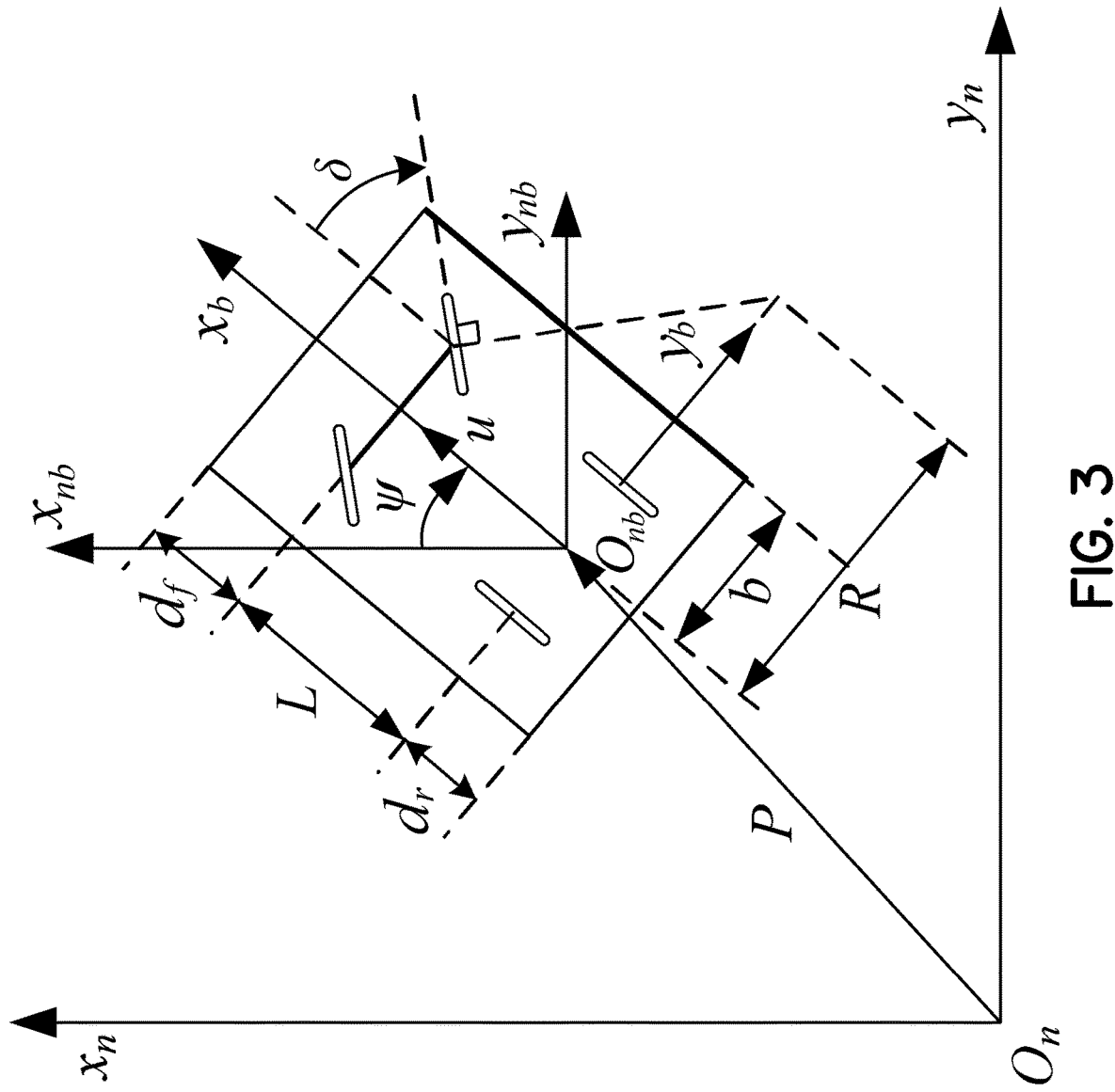
FIG. 3 is a diagrammatic view of a vehicle illustrating a coordinate frame for the vehicle.

The following coordinate frames may be used to describe the kinematics of the vehicle: a ground-fixed North-East-Down (NED) navigation frame (n-frame), a body-carried NED frame (nb-frame) and a body-fixed frame (b-frame). The n-frame may have an origin $O_n$ located at a fixed point of interest on the ground, with $x_n$ pointing to the north, $y_n$ pointing to the east, and $z_n$ pointing down. The n-frame may be treated as a flat and inertial frame. The nb-frame may also be parallel to the n-frame and may have its origin $O_{nb}$ located at the midpoint of the rear axle of the vehicle. The b-frame may have an origin $O_b$, overlapped with $O_{nb}$, with $x_b$ along the longitude of the vehicle pointing forward, $y_b$ pointing to the driver's right side of the vehicle and $z_b$, pointing down. The exemplary reference frames and notations are shown in FIG. 3, where L is the wheelbase, $d_f$ is the front overhang, $d_r$ is the rear overhang, b is the half-width of the vehicle, $\psi$ is the orientation of the vehicle in the nb-frame with respect to the $x_{nb}$-axis, $\delta$ is the steering angle relative to the $x_b$-axis, u is the longitudinal speed in the b-frame, and R is the turning radius.

Assumptions used with path-trajectory conversion may include that the steering angle is bounded by $|\delta| \leq \delta_{max}$, that the steering rate $\eta = \dot{\delta}$ satisfies $|\eta| \leq \eta_{max}$. Consider the following kinematics equation for a vehicle:

$$\dot{x}_n(t) = \cos\psi(t) \cdot u(t) \quad \text{Eqn. 7}$$

$$\dot{y}_n(t) = \sin\psi(t) \cdot u(t)$$

$$\dot{\psi}(t) = \kappa(t) \cdot u(t) = \frac{1}{L}\tan\delta(t) \cdot u(t)$$

where $\kappa$ can be interpreted geometrically as the curvature of the vehicle's path in the $x_n$-$y_n$ plane. The vehicle may be assumed to drive at low speed on level ground while parking. Thus, it may be assumed that there is no skidding between the tires and the ground. It may also be assumed that $\delta$ is bounded by $|\delta(t)| \leq \delta_{max}$. This constraint can be characterized by using saturated $\kappa$. Thus, Equation 7 can be rewritten as:

$$\dot{x}_n(t) = \cos\psi(t) \cdot u(t)$$

$$\dot{y}_n(t) = \sin\psi(t) \cdot u(t)$$

$$\dot{\psi}(t) = sat_{\kappa^*}(\kappa(f)) \cdot u(t) \quad \text{Eqn. 8}$$

where $sat(\bullet)$ is the saturation function, which may be defined by:

$$sat_a(x) = \begin{cases} -a & \text{for } x < -a \\ x & \text{for } |x| \leq a, \text{ for all } a > 0 \\ a & \text{for } x > a \end{cases} \quad \text{Eqn. 9}$$

and $\kappa^*$ is the saturation limit that satisfies $\kappa^* = (\tan \delta_{max})/L$. Let s be the traveled distance of the vehicle from a given initial position. For a path that is a curve in the $x_n$-$y_n$ plane, the path may be independent of u. Thus, without loss of generality, we can normalize u as U satisfying $|U|=1$. The normalization can be carried out by a change of time variable $t \to s$. Then, the path may be parameterized as $(x_n(s), y_n(s), \psi(s))$, and U can be interpreted as the traveling direction of the vehicle. The kinematics equation may be represented in the normalized time s as:

$$\dot{x}_n(s) = \cos\psi(s) \cdot U$$

$$\dot{y}_n(s) = \sin\psi(s) \cdot U$$

$$\dot{\psi}(s) = sat_{\kappa^*}(\kappa(s)) \cdot U \quad \text{Eqn. 10}$$

Because all the derivatives in Equation 10 are with respect to s, the term s may be omitted in subsequent equations without introducing any ambiguity. Moreover, since the normalized time s is also the traveled distance, the words "path" and "trajectory" may be also be used interchangeably, and s may simply be referred to as "time" or "distance" in subsequent equations satisfying these conditions.

The parking space is commonly structured in a quadrangular form. Parking structures may include multiple types of parking space, e.g., "lane", "diagonal" and "row" parking spaces. The lane structure is usually used in parking along the street where the parallel parking maneuver is required. The diagonal and row structures are typical for lots or garages. For parking in such places, an angle parking or perpendicular parking maneuver may be involved.

Path Planner

Figure 4:
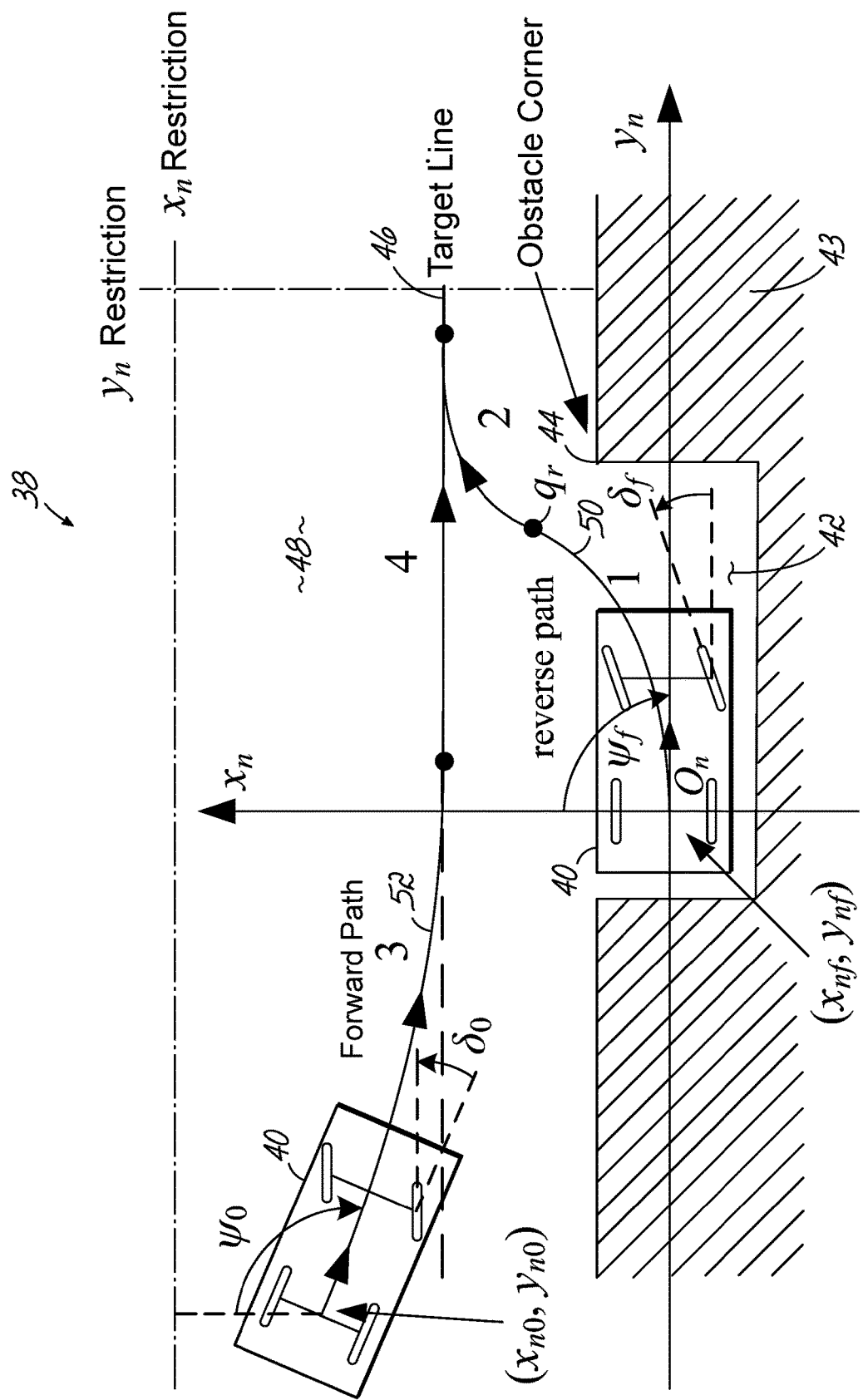
FIG. 4 is a diagrammatic view of illustrating a parking maneuver that may be planned by the mission trajectory planner of FIGS. 1 and 2 for the vehicle of FIG. 3.

FIG. 4 depicts a virtual space 38 including one or more virtual objects. The virtual objects may include a vehicle 40, a parking space 42, a prohibited region 43 having an obstacle corner 44 that the vehicle 40 is to avoid, a target line 46, and a drive aisle 48, which may be parallel to the target line 46.

Without loss of generality, it may be assumed that: (i) the parking space is on the right side of the driver, (ii) the origin $O_n$ of the n-frame is located at the final position of the vehicle in the parking space, and (iii) the drive aisle is parallel to the $y_n$ axis. For the general cases where the assumptions (i), (ii) and (iii) may be violated, the question can be put in the same form using an inertial frame transform. It may also be assumed that in the $x_n$ and $y_n$ directions, there are restrictions that the body of the vehicle cannot cross. A unified path planning algorithm may be developed that, for a given vehicle, a parking space and restrictions on $x_n$ and $y_n$, generates a feasible, collision-free path that connects the initial pose $q_0 = (x_{n0}, y_{n0}, \psi_0)$ and the final pose $q_f = (x_{nf}, y_{nf}, \psi_f)$. Using these assumptions, the final pose may be provided by $q_f = (0, 0, \pi/2)$. The path may be defined by in four-phases.

Also without loss of generality, a method of defining the path may be illustrated using a parallel parking scenario. In phase one, the vehicle 40 may be in a parked position within the parking space 42, and may be moved from the parked position to a ready position $q_r$ from which the obstacle corner 44 can be avoided. In phase two, the vehicle 40 may be steered to the target line 46 from the ready position $q_r$.

A reverse path 50 may be obtained by recording a trace of the vehicle 40 as it is moved between the parking position and the target line in the first and second phases. Note that the reverse path 50 may also be used for retrieval of the physical vehicle from the physical parking space provided that the obstacle corner 44 in the virtual space 38 remains unchanged. The obstacle corner 44 may remain unchanged in the virtual space 38, for example, if the vehicle in front of the physical parking space in physical space does not move between the time the physical vehicle is parked and the time the physical vehicle leaves the physical parking space. If the environment around the physical vehicle changes while it is parked, then the virtual space 38 may need to be updated and a new path 50 determined before leaving the parking space.

In phase three, a forward path 52 may be generated by steering the vehicle 40 from the initial pose to the target line 46. In phase four, the reverse and forward paths 50, 52 may be connected along the target line 46 to form a path connecting the initial pose and the final pose. Thus, the reverse and forward paths 50, 52 may become segments of a longer path.

Figure 5:
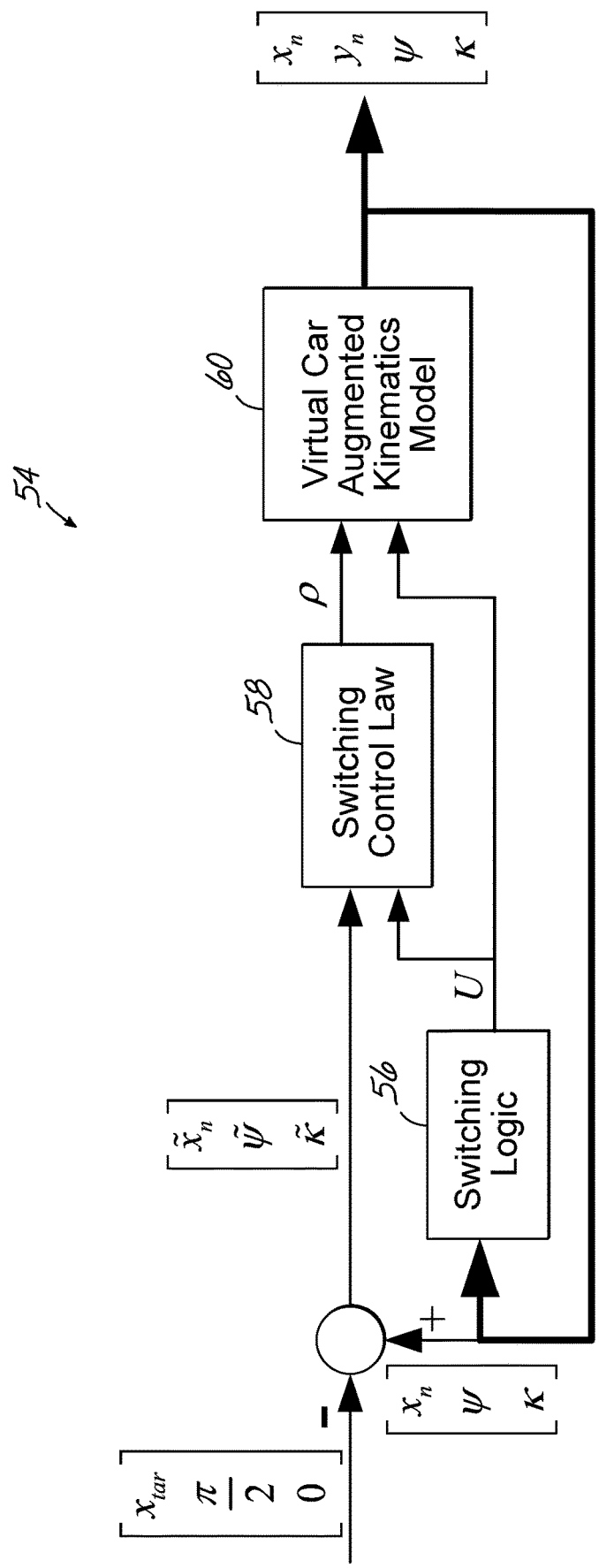
FIG. 5 is a schematic view of a control system that may be used to perform the parking maneuver of FIG. 4.

FIG. 5 illustrates an exemplary switching control system 54 for steering the vehicle 40 to the target line 46 under a switching control framework. The switching control system 54 may include switching logic 56, a switching control law module 58, and an augmented kinematics model 60 of the vehicle 40. Without loss of generality, consider a target line 46 defined in the n-frame by:

$$l_{tgt} = \{(x_n, y_n) \in \mathbb{R}^2 : x_n = x_{tgt}\}$$

where $x_{tgt}$ is a real constant. In the general cases, a target line 46 that is not parallel to the $y_n$-axis may be put in the above form by a coordinate rotation. For a vehicle having a half-width b driving in a drive aisle of width W (e.g., W>2.5×b), to guarantee that the target line 46 is achievable by the vehicle 40 using a relatively small number of directional changes and with a reasonable traveled distance, a rule of thumb for the selection of $x_{tgt}$ is $2.3 \times b < x_{tgt} < \min\{W, 3.5 \times b\}$. It may be desirable to change the steering angle of the vehicle 40 continuously while driving. Otherwise, when the trace of the vehicle 40 is used as the path for a real vehicle, the real vehicle may have to stop at the positions where sudden steering angle change occurs. A straightforward way to take into account the continuity of the steering angle may be to augment the kinematics Equation 10 by introducing $\dot{\kappa} = \rho$, where $\rho$ replaces $\kappa$ as the control input to Equation 10. If $\rho$ is piecewise continuous, $\kappa$ would be continuous. Then the continuity of $\delta$ would be guaranteed. The augmented kinematics equation may be written as:

$$\dot{x}_n = \cos\psi \cdot U$$

$$\dot{y}_n = \sin\psi \cdot U$$

$$\dot{\psi} = sat_{\kappa^*}(\kappa) \cdot U$$

$$\dot{\kappa} = \rho \qquad \text{Eqn. 11}$$

Figure 6:
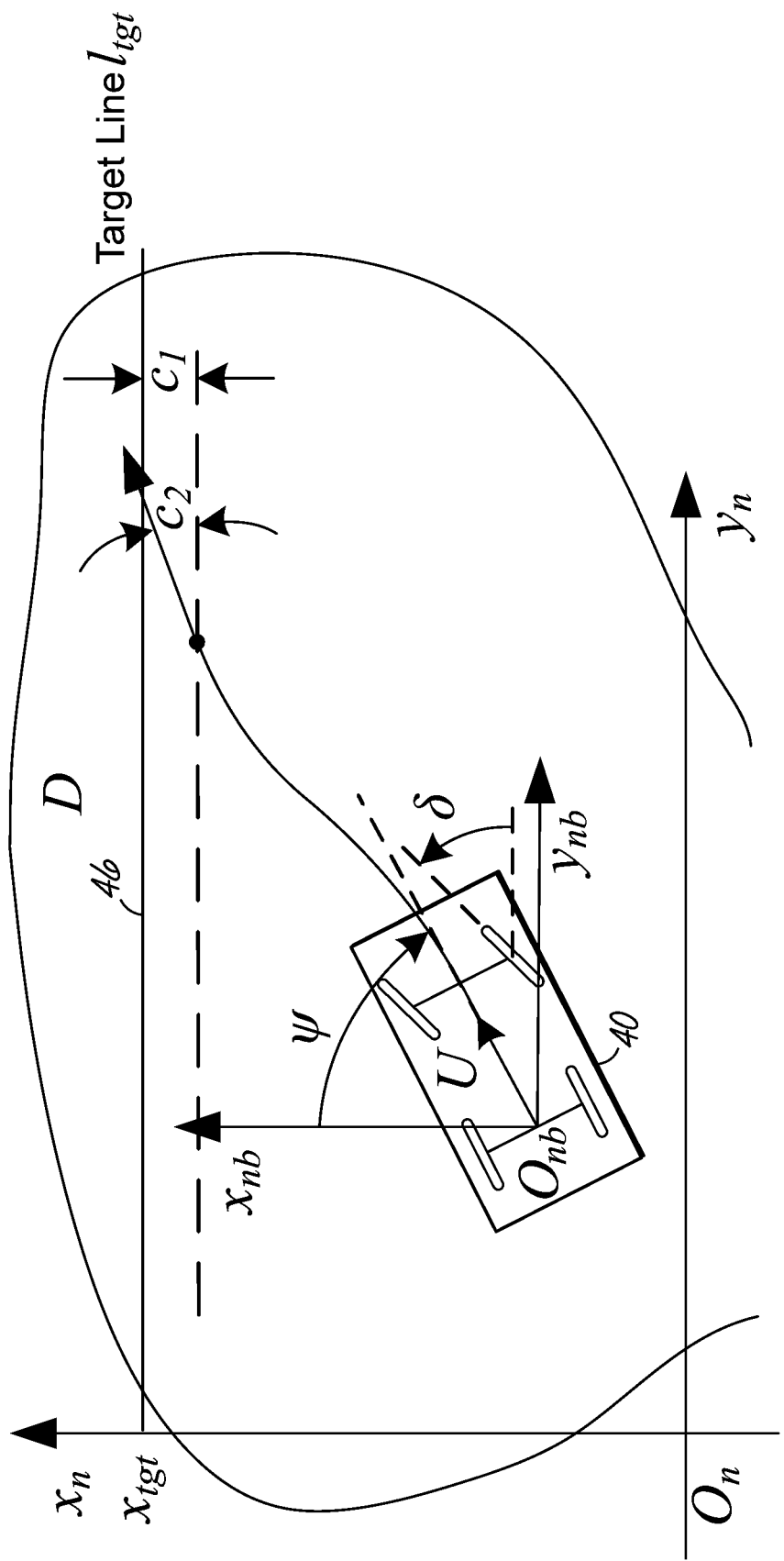
FIG. 6 is a diagrammatic view that illustrates steering the vehicle of FIG. 3 to a target line as part of the parking maneuver of FIG. 4.

FIG. 6 illustrates a control diagram for steering the vehicle 40 to the target line 46 in accordance with an embodiment of the invention. A bounded region $D \subset \mathbb{R}^2$ may be defined on the $x_n$-$y_n$ plane due to obstacles and restrictions on the $x_n$ axis and the $y_n$ axis. Areas outside the bounded region D may be considered a prohibited region, and the body of the vehicle 40 may need to stay inside region D while driving. In order to guarantee that the vehicle 40 remains within region D, the driving direction U may need to be changed when the vehicle 40 reaches the boundary of region D. Thus, Equation 11 may be treated as a switched system with U as the switching signal whose sign changes when the boundary of region D is reached. The corresponding switching logic may depend on the pose of the vehicle 40 and the boundary of region D.

In phases two and three, the process may steer the vehicle 40 to the vicinity of the target line 46. That is, it may not be necessary to exactly align the vehicle 40 to the target line 46. By way of example, let $c_1 > 0$ be a position tolerance of the final distance to the target line in the $x_n$ coordinate, and $c_2 > 0$ be an orientation tolerance of the final angle between the orientation of the vehicle and the positive direction of $y_n$-axis. In addition, let $I_{y_n} = \{y_n \in \mathbb{R} : y_{min} \leq y_n \leq y_{max}\}$ be a finite interval on the $y_n$-axis that contains all the possible values of $y_n$ when the virtual vehicle is traveling in D and where $y_{min}$ and $y_{max}$ are constants. The design goal may be stated as designing a switched control law to drive the vehicle 40 as characterized by Equation 11 from an initial pose $(x_{nA}, y_{nA}, \psi_A)$ to some final pose $(x_{nB}, y_{nB}, \psi_B)$ that satisfies $|x_{nB} - x_{tgt}| < c_1$, $y_{nB} \in I_{y_n}$, and $|\psi_B - \pi/2| < c_2$. The nominal trajectories of Equation 11 may correspond to the motions of the vehicle 40 traveling inside region D along the target line $l_{tgt}$ with the vehicle 40 heading in the positive direction of $y_n$. The trajectories of Equation 11 may be given by:

$$\bar{x}_n = x_{tgt}, \bar{y}_n = \bar{U}, \bar{\psi} = \pi/2, \bar{\kappa} = 0 \qquad \text{Eqn. 12}$$

where the nominal control input is given by $\bar{\rho} = 0$.

In order to steer the vehicle 40 to the target line 46, the switching control design may be conducted in the error coordinates. Let $\tilde{x}_n = x_n - \bar{x}_n$, $\tilde{y}_n = y_n - \bar{y}_n$, $\tilde{\psi} = \psi - \bar{\psi}$, $\tilde{\kappa} = \kappa - \bar{\kappa}$, $\tilde{\rho} = \rho - \bar{\rho}$. The error dynamics may be given by:

$$\dot{\tilde{x}}_n = -\sin\tilde{\psi} \cdot U$$

$$\dot{\tilde{y}}_n = \cos\tilde{\psi} \cdot U - \bar{U}$$

$$\dot{\tilde{\psi}} = sat_{\kappa*}(\tilde{\kappa}) \cdot U$$

$$\dot{\tilde{\kappa}} = \tilde{\rho} \qquad \text{Eqn. 13}$$

where $U$ and $\bar{U}$ are the switching signals for Equations 11 and 12, respectively, and $\tilde{\rho}$ is the control input. The aforementioned requirement on the final pose is translated as $|\tilde{x}_n(s_B)| < c_1$, $|\tilde{y}_n(s_B)| \le |y_{max} - y_{min}|$, $|\tilde{\psi}(s_B)| < c_2$, for some finite time $s_B$. It may not be possible to fully control the term $\tilde{y}_n$ using $\tilde{\rho}$ because the sign of $\tilde{y}_n$ may be dominated by $-\bar{U}$. However, the constraint on $\tilde{y}_n(s_B)$ may be guaranteed by the switching logic of $U$ and $-\bar{U}$. Because $\tilde{y}_n$ may not have an effect on the other three state variables, the problem may be reduced to designing a switching control law for the following reduced order error dynamics:

$$\dot{\tilde{x}}_n = -\sin\tilde{\psi} \cdot U$$

$$\dot{\tilde{\psi}} = sat_{\kappa*}(\tilde{\kappa}) \cdot U$$

$$\dot{\tilde{\kappa}} = \tilde{\rho} \qquad \text{Eqn. 14}$$

The following two assumptions may be made to facilitate the switching control design. First, the switching signal U of Equation 14 is time-dependent, and second, the switching signal U has a user-specified dwell-time. The first assumption may be made because of the dependence of U on the boundary of D and the pose of the virtual vehicle is difficult to characterize mathematically by using a switching logic rule. Therefore, U may be treated as a time-dependent switching signal with uncertain switching times. The second assumption may be feasible because the dwell time for U may be determined by the minimum drivable space, and the dwell time can be provided by the user in practice. For Equation 14, the switching control law may be provided by:

$$\tilde{\rho} = K_1 \tilde{x}_n - K_2 \sin\tilde{\psi} \cdot U - K_3 \tilde{\kappa} \qquad \text{Eqn. 15}$$

where $K_1, K_2, K_3 > 0$. The closed-loop reduced order error dynamics may then be given by:

$$\dot{\tilde{x}}_n = -\sin\tilde{\psi} \cdot U$$

$$\dot{\tilde{\psi}} = sat_{\kappa*}(\tilde{\kappa}) \cdot U$$

$$\dot{\tilde{\kappa}} = K_1 \tilde{x}_n - K_2 \sin\tilde{\psi} \cdot U - K_3 \tilde{\kappa} \qquad \text{Eqn. 16}$$

The following theorem indicates that the trajectories given by Equation 16 are attracted by the origin of the error coordinate. Let the constraint on $\tilde{x}_n$ be $|\tilde{x}_n| < x_{max}$. If the switching signal U has a dwell-time, and $K_1, K_2, K_3$ satisfy $K_2 K_3 > K_1$, $\kappa^* > (K_2 K_3 - K_1)/(4K_3^2)$, and $2(K_2 K_3 - K_1)/(K_1 K_2) > x_{max}^2$, then the trajectories starting from $\Omega_0 = \{(\tilde{x}_n, \tilde{\psi}, \tilde{\kappa}) : |\tilde{x}_n| < x_{max}, |\tilde{\psi}| \le \pi/2, \tilde{\kappa} = 0\}$ play be attracted by the origin. Proof of this theorem may be shown using the common weak Lyapunov function candidate:

$$V(\tilde{x}_n, \tilde{\psi}, \tilde{\kappa}) = K_1(K_2 K_3 - K_1)\tilde{x}_n^2 + 2K_3(K_2 K_3 - K_1)(1 - \cos\tilde{\psi}) + (K_1 \tilde{x}_n - K_3 \tilde{\kappa})^2 \qquad \text{Eqn. 17}$$

The derivative of V along the trajectories of Equation 16 is given by:

$$\dot{V} = \qquad \text{Eqn. 18}$$
$$-2K_1^2 K_3 \tilde{x}_n^2 - 2K_3 |\tilde{\kappa}|\left(K_3^2 |\tilde{\kappa}| - (K_2 K_3 - K_1)\sin\tilde{\psi} \cdot U \frac{\tilde{\kappa} - sat_{\kappa*}(\tilde{\kappa})}{|\tilde{\kappa}|}\right)$$

For $|\tilde{\kappa}| \le \kappa^*$ and $\tilde{\kappa} = sat_{\kappa*}(\tilde{\kappa})$, then $\dot{V} = -2K_1^2 K_3 \tilde{x}_n^2 - 2K_3^3 \tilde{\kappa}^2 \le 0$. Now considering the case when $|\tilde{\kappa}| > \kappa^*$. The condition $K_2 K_3 > K_1$ indicates that $K_2 K_3 - K1 > 0$. Thus, Equation 18 yields:

$$\dot{V} \le -2K_1^2 K_3 \tilde{x}_n^2 - 2K_3 |\tilde{\kappa}|\left(K_3^2 |\tilde{\kappa}| - (K_2 K_3 - K_1)\frac{|\tilde{\kappa} - sat_{\kappa*}(\tilde{\kappa})|}{|\tilde{\kappa}|}\right) = \qquad \text{Eqn. 19}$$
$$-2K_1^2 K_3 \tilde{x}_n^2 - 2K_3 |\tilde{\kappa}|\left(K_3^2 |\tilde{\kappa}| - (K_2 K_3 - K_1)\left(1 - \frac{\kappa^*}{|\tilde{\kappa}|}\right)\right)$$

For $\kappa^* > (K_2 K_3 - K_1)/(4K_3^2)$, the term in the bracket satisfies:

$$K_3^2 |\tilde{\kappa}| - (K_2 K_3 - K_1)\left(1 - \frac{\kappa^*}{|\tilde{\kappa}|}\right) = \qquad \text{Eqn. 20}$$
$$K_3^2 |\tilde{\kappa}| + (K_2 K_3 - K_1)\frac{\kappa^*}{|\tilde{\kappa}|} - (K_2 K_3 - K_1) \ge$$
$$2\sqrt{K_3^2 (K_2 K_3 - K_1)\kappa^*} - (K_2 K_3 - K_1) > 0$$

Therefore, by Equation 19, we have $\dot{V} < 0$. This holds for any neighborhood $\Omega_c$ of the origin. For example, let $\Omega_c = \{(\tilde{x}_n, \tilde{\psi}, \tilde{\kappa}) : V(\tilde{x}_n, \tilde{\psi}, \tilde{\kappa}) < 4K_3(K_2 K_3 - K1)\}$. Then $|\tilde{\psi}| < \pi$ in $\Omega_c$ and the subset Z where $\dot{V} = 0$ in $\Omega_c$ is given by:

$$Z = \{(\tilde{x}_n, \tilde{\psi}, \tilde{\kappa}) \in \Omega_c : \tilde{x}_n = 0, \tilde{\kappa} = 0\} \qquad \text{Eqn. 21}$$

It may be seen that the unique compact, weakly invariant set contained in Z is the origin. Moreover, by condition $2(K_2 K_3 - K_1)/(K_1 K_2) > x_{max}^2$, we have $\Omega_0 \subset \Omega_c$. Therefore, by Theorem 1.1 above, the origin is attractive for all trajectories starting from $\Omega_0$. Consequently, for all $c_1 > 0$, $c_2 > 0$, every trajectory starting from $\Omega_0$ enters and remains in the region $\Omega < \{(\tilde{x}_n, \tilde{\psi}, \tilde{\kappa}) : |\tilde{x}_n| < c_1, |\tilde{\psi}| < c_2\}$ in some finite time.

Figure 7:
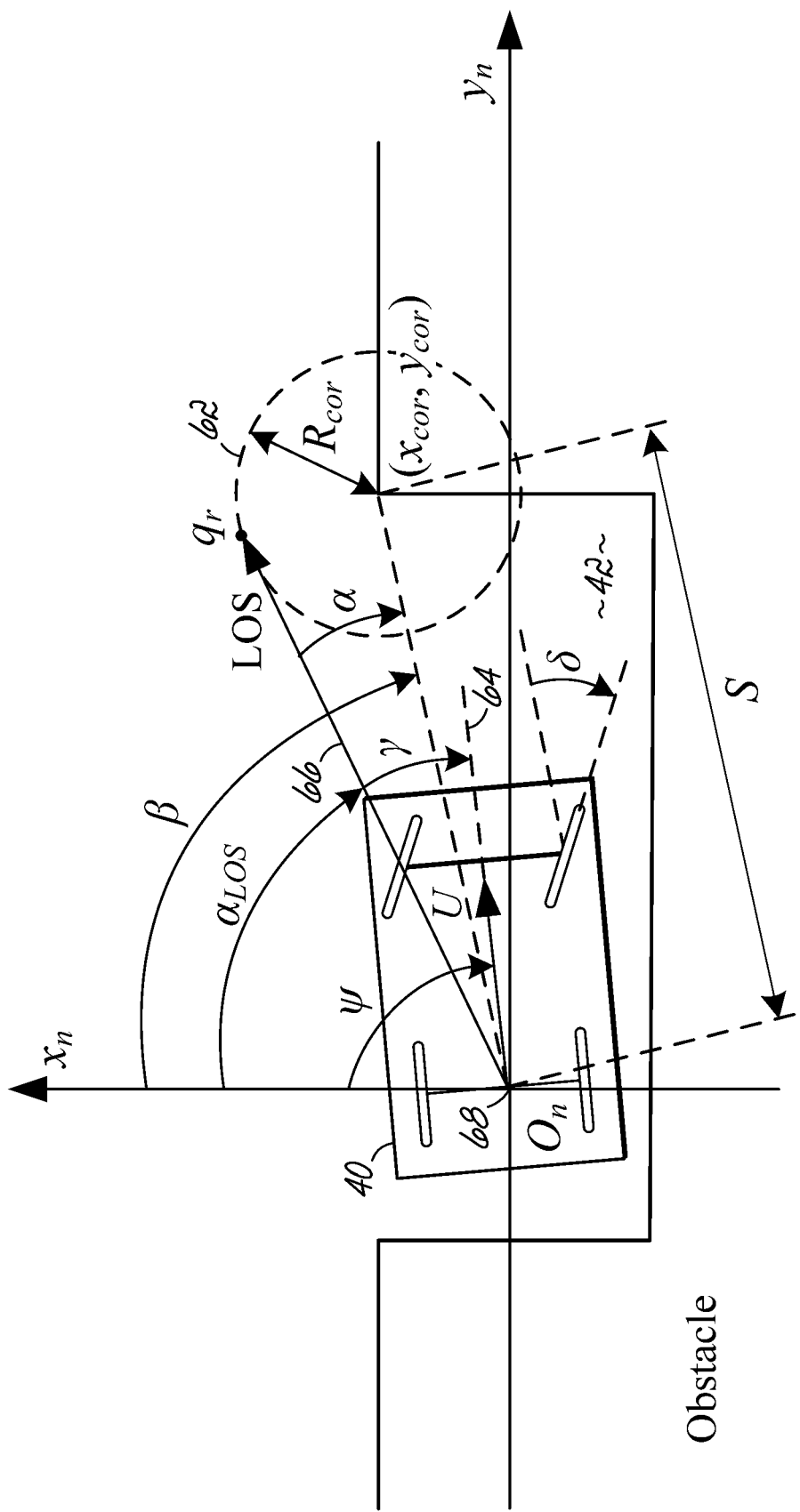
FIG. 7 is a diagrammatic view illustrating positional relationships between the vehicle, a parking space, and avoidance circles as the vehicle is steered to the target line of FIG. 5.

FIG. 7 depicts retrieving the vehicle 40 from the parking space 42. To avoid the corners of the parking space 42, the control system 10 may (i) draw an avoidance circle 62 with a radius $R_{cor} > b$ (e.g., $R_{cor} = 1.4b$) around each corner, (ii) maneuver the vehicle 40 until the longitudinal axis 64 of the vehicle 40 is pointing out of the parking space 42 without passing through the avoidance circles 62, and (iii) move the vehicle 40 out of the parking space along a linear path to a ready position $q_r$, where the corner is avoided. For example, the maneuvering of the vehicle 40 may be conducted by selecting an obstacle corner in front of or in back of the vehicle 40, and maneuvering the vehicle 40 until the longitude of the vehicle 40 is tangent to the avoidance circle 62.

Let the LOS be a tangent line 66 that points out the parking space and passes through the midpoint 68 of the rear axle. The LOS angle $\gamma$ may be defined by the acute angle between the tangent line 66 and the longitudinal axis 64 of the vehicle. The switching control law may be configured to, for a given orientation tolerance $c > 0$, determines the LOS angle $\gamma$ satisfies $|\gamma| < c$ in finite time. Deriving the differential equation for $\gamma$. Inspection of FIG. 7 shows that $\alpha_{LOS} = \psi - \gamma = \beta - \alpha$ where:

$$\beta = \arctan\left(\frac{y_{cor} - y_n}{x_{cor} - x_n}\right), \quad \alpha = \arcsin(R_{cor}/S) \qquad \text{Eqn. 22}$$

and where $$S = \sqrt{(x_{cor} - x_n)^2 + (y_{cor} - y_n)^2}$$

Using Equation 10 provides:

$$\dot{\gamma} = \dot{\psi} - \dot{\alpha}_{LOS} = sat_{\tilde{\kappa}*}(\tilde{\kappa}) \cdot U - \dot{\beta} + \dot{\alpha} \quad \text{Eqn. 23}$$

where $\dot{\beta}$ along the trajectories of Equation 10 is given by:

$$\dot{\beta} = \frac{\dot{x}_n(y_{cor} - y_n) - \dot{y}_n(x_{cor} - x_n)}{(x_{cor} - x_n)^2 + (y_{cor} - y_n)^2} = \frac{1}{S}\sin(\alpha - \gamma) \cdot U \quad \text{Eqn. 24}$$

and $\dot{\alpha}$ along the trajectories of Equation 10 is given by:

$$\dot{\alpha} = -\frac{R_{cor}}{\sqrt{1 - R_{cor}/S^2}} \cdot \frac{-\dot{x}_n(x_{cor} - x_n) - \dot{y}_n(y_{cor} - y_n)}{S^3}$$
$$= \frac{1}{S}\tan\alpha\cos(\alpha - \gamma) \cdot U \quad \text{Eqn. 25}$$

Substituting Equations 24 and 25 for $\dot{\beta}$ and $\dot{\alpha}$ in Equation 23 produces:

$$\dot{\gamma} = sat_{\tilde{\kappa}*}(\kappa) \cdot U + \frac{1}{\sqrt{S^2 - R_{cor}^2}}\sin\gamma \cdot U \quad \text{Eqn. 26}$$

When maneuvering a vehicle in a tight parking space, directional changes may be unavoidable. However, it may be desirable to minimize the number of directional changes. Directional changes may cause the steering angle to be discontinuous along the path. Thus, the switching control law can be directly designed for $\tilde{\kappa}$. By treating S as a time-varying parameter S(s), and by defining the switching control law as:

$$\tilde{\kappa} = K\gamma U \quad \text{Eqn. 27}$$

the closed-loop system is given by:

$$\dot{\gamma} = -sat_{\tilde{\kappa}*}(K\gamma) + \frac{1}{\sqrt{S^2(s) - R_{cor}^2}}\sin\gamma \cdot U \quad \text{Eqn. 28}$$

The stability of Equation 28 may be determined using Theorem 3.2, which states that for Equation 28, if (i) there exists d>0 such that $d < \sqrt{S^2(s) - R_{cor}^2}$ in a sufficiently large finite positive time interval, (ii) $\gamma(0)$ satisfies $|\sin\gamma(0)| \leq \tilde{\kappa}*d$, and (iii) the gain K is selected to satisfy K>1/d, then, for a given orientation tolerance c>0, the trajectory of $\gamma$ enters the region $|\gamma|<c$ in finite time. Theorem 3.2 may be proven by considering the quadratic function $V = \gamma^2/2$. The problem is studied in two cases below.

For $|\gamma| > \tilde{\kappa}*/K$, we have $sat_{\tilde{\kappa}*}(K\gamma) = \tilde{\kappa}*sgn(\gamma)$, where sgn(•) is the sign function. The derivative of V along the trajectories of Equation 28 is given by:

$$\dot{V} = \dot{\gamma}\gamma = -\kappa^*|\gamma| + \frac{1}{\sqrt{S^2(s) - R_{cor}^2}}\sin(\gamma)\gamma U \quad \text{Eqn. 29}$$

If condition (i) of Theorem 3.2 holds, then:

$$\dot{V} \leq -\kappa^*|\gamma| + \frac{1}{d}\sin(\gamma)\gamma = -(\kappa^* - |\sin\gamma|/d)|\gamma| \quad \text{Eqn. 30}$$

If condition (ii) of Theorem 3.2 also holds, then:

$$\dot{V} \leq -(\tilde{\kappa}* - |\sin(\gamma(0))|/d)|\gamma| < 0 \quad \text{Eqn. 31}$$

holds for the set $|\gamma| \leq |\gamma(0)|$. Therefore, the set $|\gamma| \leq |\gamma(0)|$ is invariant, $|\gamma| = \sqrt{2V}$ decreases monotonically with respect to time, and Equation 31 can be rewritten as:

$$\dot{V} \leq -(\tilde{\kappa}* - |\sin(\gamma(0))|/d)\sqrt{2V} < 0 \quad \text{Eqn. 32}$$

By using the comparison principle, it can be shown that:

$$|\gamma| = \sqrt{2V} \leq |\gamma(0)| - (\tilde{\kappa}* - |\sin(\gamma(0))|/d)t \quad \text{Eqn. 33}$$

Therefore, the trajectory of $\gamma$ starting from $|\gamma(0)| > \tilde{\kappa}*/K$ enters the region $|\gamma| \leq \tilde{\kappa}*/K$ within a time $T_1$ of:

$$T_1 = \frac{|\gamma(0)| - \kappa^*/K}{\kappa^* - |\sin(\gamma(0))|/d}$$

For $|\gamma| \leq \tilde{\kappa}*/\kappa$ we have $sat_{\tilde{\kappa}*}(K\gamma) = K\gamma$ and the derivative of V along the trajectories of Equation 28 is given by:

$$\dot{V} = \dot{\gamma}\gamma = -K\gamma^2 + \frac{1}{\sqrt{S^2(s) - R_{cor}^2}}\sin(\gamma)\gamma U \quad \text{Eqn. 34}$$

If condition (i) of Theorem 3.2 holds, then:

$$\dot{V} \leq -K\gamma^2 + \sin(\gamma)\gamma/d \quad \text{Eqn. 35}$$

then, by condition (iii):

$$\dot{V} \leq -(K - 1/d)\gamma^2 = -2(K - 1/d)V < 0 \quad \text{Eqn. 36}$$

holds for all $|\gamma| \leq \tilde{\kappa}*/K$, $\gamma \neq 0$. Therefore, the set $|\gamma| \leq \tilde{\kappa}*/K$ is invariant, and $|\gamma| = \sqrt{2V}$ will decay to 0 with an exponential convergence rate. As a consequence, for any c>0, the trajectory of $\gamma$ will enter the region $|\gamma|<c$ in finite time.

Due to the position tolerance for the poses at the target line 46, it may not be possible to connect the forward and reverse paths by a segment of the target line 46. To address this issue, the system may use a 5th-order polynomial curve to connect the two paths. By way of example, for a final pose of $(x_{nBF}, y_{nBF}, \psi_{BF})$ and a steering angle of $\delta_{BF}$ for the forward path, and a final pose of $(x_{nBR}, y_{nBR}, \psi_{BR})$ and a steering angle of $\delta_{BR}$ for the reverse path, the forward and reverse paths may be connected using the 5th-order polynomial function of Equation 37 defined on [min $\{y_{nBF}, y_{nBR}\}$, max $\{y_{nBF}, y_{nBR}\}$].

$$x_n(y_n) = a_5 y_n^5 + a_4 y_n^4 + a_3 y_n^3 + a_2 y_n^2 + a_1 y_n + a_0 \quad \text{Eqn. 37}$$

where $a_i$ for i=0, ..., 5 can be determined by the endpoint condition:

$$x_n(y_{nBF}) = x_{nBF}, \frac{dx_n}{dy_n}(y_{nBF}) = \cot\psi_{BF} \quad \text{Eqn. 38}$$

$$x_n(y_{nBR}) = x_{nBR}, \frac{dx_n}{dy_n}(y_{nBR}) = \cot\psi_{BR}$$

and the δ(s)-continuity condition is provided by:

$$\frac{d^2 x_n}{dy_n^2}(y_{nBF}) = \tan\delta_{BF}/(L|\sin\psi_{BF}|^3) \quad \text{Eqn. 39}$$

$$\frac{d^2 x_n}{dy_n^2}(y_{nBR}) = \tan\delta_{BR}/(L|\sin\psi_{BR}|^3)$$

The system may use collision detection while the vehicle 40 is moving. In response to detecting an upcoming collision between the vehicle 40 and the boundary of region D, the sign of the switching signal may be changed to keep the vehicle 40 within region D. Any suitable collision detection technique may be employed. If the vehicle is a sufficient distance from the boundary of region D, the system may deactivate collision detection for a period of time and reactivate collision detection after the period of time has expired. Advantageously, deactivating collision detection may significantly reduce computational costs of the control system. If there are available sensors on the vehicle for real-time collision detection, the control system 10 may also work in a closed-loop manner using signals from these sensors.

Path-Trajectory Converter

For a given feasible, collision-free path with several cusps, path-trajectory converter 34 may perform path-to-trajectory conversion on each path segment and then connect the resulting trajectories in time order. Thus, without loss of generality, consider a path segment having a length l and starting from $(z_{n0}, y_{n0})$ with the initial orientation $\psi_0$ and ending at $(x_{nf}, y_{nf})$ with the final orientation $\psi_f$. Let s be the distance traveled by the vehicle 40 from the starting point of the segment. The path segment may be parameterized in terms of s in the inertial frame as $(x_n(s), y_n(s), \psi(s))$, $0 \le s \le 1$. It is further assumed that the path segment is planned with respect to the center of gravity (CG) of the virtual vehicle. If the given path is for the midpoint of the rear axle, then the corresponding path for CG can be obtained by:

$$x_n(s) = x_{nr}(s) + d\cos\psi(s)$$

$$y_n(s) = y_{nr}(s) + d\sin\psi(s) \quad \text{Eqn. 40}$$

where $(x_{nr}, y_{nr})$ is the path for the midpoint of the rear axle, and d is the distance between the CG of the virtual vehicle 40 and the midpoint 68 of the rear axle.

The path-to-trajectory conversion problem for the path segment may be solved using two steps: (1) determine $t \to s(t)$ and (2) compute the nominal trajectory using:

$$x_n = x_n(s(t))$$

$$y_n(t) = y_n(s(t))$$

$$\psi(t) = \psi(s(t)) \quad \text{Eqn. 41}$$

The path-to-trajectory conversion may be conducted subject to both the kinematics constraints and the dynamics constraints of the vehicle 40 so that the resulting trajectory can directly serve as the nominal trajectory for the vehicle 40. In order to obtain a nominal trajectory that is easy for the real vehicle to track, the path-trajectory converter 34 may allow the nominal trajectory to deviate slightly from the path received from the path-planner 32.

Without loss of generality, it may be assumed that the initial time $t_0 = 0$ and the traveling direction is positive.

Denoting the nominal velocity in body frame by (u, v) and the nominal angular velocity by r, the path-to-trajectory conversion problem may be stated as follows:

Given a path segment $(x_n(s), y_n(s))$ and the orientation $\psi(s)$ along the path segment, both parameterized by the natural parameter s for $0 \le s \le 1$, find a nominal trajectory $(x_n(t), y_n(t), \psi(t))$ on $t \in [0, t_f]$, where $t_f$ is the free ending time, such that the nominal trajectory remains in the vicinity of the given path segment, and satisfies the boundary conditions:

$$(x_n(0), y_n(0), \psi(0)) = (x_{n0}, y_{n0}, \psi_0)$$

$$u(0) = v(0) = r(0) = 0$$

$$(x_n(t_f), y_n(t_f), \psi(t_f)) = (x_{nf}, y_{nf}, \psi_f)$$

$$u(t_f) = v(t_f) = r(t_f) = 0 \quad \text{Eqn. 42}$$

as well as satisfies the kinematics and dynamics constraints of the vehicle and some other constraints imposed along the trajectory on u, v, r, etc.

Embodiments of the invention may use a two-phase path-to-trajectory conversion that includes (1) assigning a prespecified velocity profile on the path segment, and (2) implementing an optimal control to generate optimal trajectory at the parts where the constraints are not satisfied. Phase one may assign a velocity profile on the path segment by only taking into account the bounds on linear velocity and acceleration. Assume that the velocity and acceleration on the path segment are subject to the constraints:

$$|u| \le M_u, |\dot{u}| \le M_{\dot{u}} \quad \text{Eqn. 43}$$

Because of the dynamics of the actuator, a trapezoidal velocity profile which corresponds to a square-wave acceleration profile may be not practical for control of the real vehicle. One remedy may be to assign a continuous acceleration profile for the path segment thereby generating a smooth velocity profile. A smooth velocity profile may be generated, for example, by an acceleration profile that consists of half sine waves. For the half sine wave case and for $l > \pi M_u^2/(2M_{\dot{u}})$, the corresponding smooth velocity profile may given by:

$$u(t) = \quad \text{Eqn. 44}$$

$$\begin{cases} \frac{M_{\dot{u}}}{\omega}(1 - \cos\omega t) & \text{for } 0 \le t < \pi/\omega \\ M_u & \text{for } \pi/\omega \le t < l/M_u \\ \frac{M_{\dot{u}}}{\omega}(1 - \cos\omega(t - l/M_u - \pi/\omega)) & \text{for } l/M_u \le t \le l/M_u + \pi/\omega \end{cases}$$

where $\omega = 2M_{\dot{u}}/M_u$

Equation 44 thereby provides an acceleration profile corresponding to Equation 40.

For the half-sine wave case and $0 < l \le \pi M_u^2/(2M_{\dot{u}})$ the vehicle 40 may be unable to reach the maximum speed $M_u$, the corresponding velocity profile may be given by:

$$u(t) = \frac{M_{\dot{u}}}{\omega}(1 - \cos\omega t) \text{ for } 0 \le t < 2\pi/\omega \quad \text{Eqn. 45}$$

where $\omega = 2M_{\dot{u}}/M_u$

Taking the constraints imposed on the nominal trajectory into consideration may allow the path-to-trajectory converter to be analyzed as an optimal control problem. In order to make the nominal trajectory trackable by the real vehicle, the kinematics and dynamics constraints should be satisfied.

Kinematic constraints with respect to CG may be defined by:

$$\dot{x}_n = \cos\psi u - d\sin\psi \cdot r$$

$$\dot{y}_n = \sin\psi u - d\cos\psi \cdot r$$

$$\dot{\psi} = r \qquad \text{Eqn. 46}$$

and the dynamic constraints may be defined by:

$$\begin{bmatrix} \dot{u} \\ \dot{v} \end{bmatrix} = \begin{bmatrix} 0 & r \\ -r & 0 \end{bmatrix}\begin{bmatrix} u \\ v \end{bmatrix} + \frac{1}{m}\begin{bmatrix} F_x \\ F_y \end{bmatrix} \qquad \text{Eqn. 47}$$

$$\dot{r} = \frac{1}{I_{zz}}N_m$$

Constraints on the vehicle 40 along the trajectory may include:

$$|u| \le M_u,\ |v| \le M_v,\ |r| \le M_r,\ |ur| \le M_{ur},\ |vr| \le M_{vr},\ |\dot{u}| \le M_{\dot{u}},$$
$$|\dot{v}| \le M_{\dot{v}},\ |\dot{r}| \le M_{\dot{r}} \qquad \text{Eqn. 48}$$

where the first three inequalities set bounds for the body frame velocity and the angular velocity, the fourth and fifth inequalities set bounds for the interaction between the body frame velocity and the angular velocity and thus restrict the centrifugal force, and the last three inequalities set bounds for the longitudinal acceleration and the angular acceleration.

In an embodiment of the invention, the nominal trajectory may be required to satisfy the following boundary conditions:

$$(x_n(0), y_n(0), \psi(0)) = (x_{n0}, y_{n0}, \psi_0)$$

$$u(0) = v(0) = r(0) = 0$$

$$(x_n(t_f), y_n(t_f), \psi(t_f)) = (x_{nf}, y_{nf}, \psi_f)$$

$$u(t_f) = v(t_f) = r(t_f) = 0 \qquad \text{Eqn. 49}$$

There may be an infinite number of trajectories that satisfy the previous constraints. Therefore, it may be advantageous to introduce an appropriate optimality objective and formulate the path-to-trajectory conversion problem as a free ending time optimal control problem, thereby determining a unique nominal trajectory. To this end, let PH be a set of points on the path:

$$PH = \{(x_n(s), y_n(s)) | 0 \le s \le l\} \qquad \text{Eqn. 50}$$

Let $\text{Dist}(\cdot, \cdot)$ be the point-to-set distance function in $\mathbb{R}^2$ which may be defined by:

$$\text{Dist}(x, S) = \inf\{\|x - y\| | y \in S\}, \text{ for } x \in \mathbb{R}^2, \emptyset \ne S \subset \mathbb{R}^2 \qquad \text{Eqn. 51}$$

Then the error between the nominal trajectory and the path may be characterized by:

$$\text{Dist}((x_n(t), y_n(t)), PH) \qquad \text{Eqn. 52}$$

for all $0 \le t \le t_f$.

An exemplary optimality objective may be, along the nominal trajectory, minimizing the following cost function:

$$J = \int_0^{t_f}[1 + \lambda_{Dist}\text{Dist}^2(x_n, y_n), PH)]dt \qquad \text{Eqn. 53}$$

where $\lambda_{Dist}$ is a positive parameter. The traveling time may be accounted for and made sufficiently short by introducing the term "1" into Equation 53. The term $\lambda_{Dist}\text{Dist}^2((x_n, y_n), PH)$ penalizes the error between the nominal trajectory and the path to fulfill the requirement that the resulting nominal trajectory remains in the vicinity of the given path segment.

Experimental Results for Path Planner Module

To verify the effectiveness of the proposed path planning algorithm, four common parking scenarios have been studied by simulation using MATLAB software (available from MathWorks, Inc. of Natick, Mass., United States) with an Intel Core i5-2450M 2.5 GHz CPU (available from Intel Corporation of Santa Clara, Calif., United States). The parameters of the vehicle come from the common mid-size vehicle and are shown in Table II. The dimensions of the parking space and the restrictions on $x_n$ and $y_n$ in the different parking scenarios are shown in Table III, where $W_1$ is the length of the long side of the parking space 42, $W_s$ is the length of the short side of the parking space 42, and the width of the drive aisle is 3.66 m. In all scenarios, the radius of the avoidance circle was set to 1.4b=1.3 m, and the middle line of the drive aisle is used as the target line 46. In parallel parking and back-in perpendicular parking, the ready position $q_r$ was selected as the position where the geometric center of the vehicle is on the avoidance circle 62. In head-in perpendicular parking, $q_r$ was selected as the position where the vehicle's front end is on the avoidance circle 62. The parameters of the switching controllers were chosen as $K_1=0.9$, $K_2=4.5$, $K_3=15$, $K=10$, and the conditions of theorems 3.1 and 3.2 were satisfied for all scenarios. The initial and final steering angles are 0 radians in all cases.

TABLE II

Virtual Vehicle Parameters

| L (m) | $d_r$ (m) | $d_f$ (m) | b (m) | $\delta_{max}$ (rad) |
|---|---|---|---|---|
| 2.91 | 0.97 | 1.14 | 0.93 | 0.55 |

TABLE III

Parking Environment Parameters

| Scenario | $W_l$ (m) | $W_s$ (m) | $x_n$ (m) | $y_n$ (m) |
|---|---|---|---|---|
| Parallel (tight) | 6.10 | 2.80 | <4.63 | <11 |
| Parallel (wide) | 7.15 | 2.80 | <4.63 | <12 |
| Perpendicular (head-in) | 5.50 | 2.74 | <11.2 | <4.5 |
| Perpendicular (back-in) | 5.50 | 2.74 | <11.2 | <6.5 |

Figure 8:
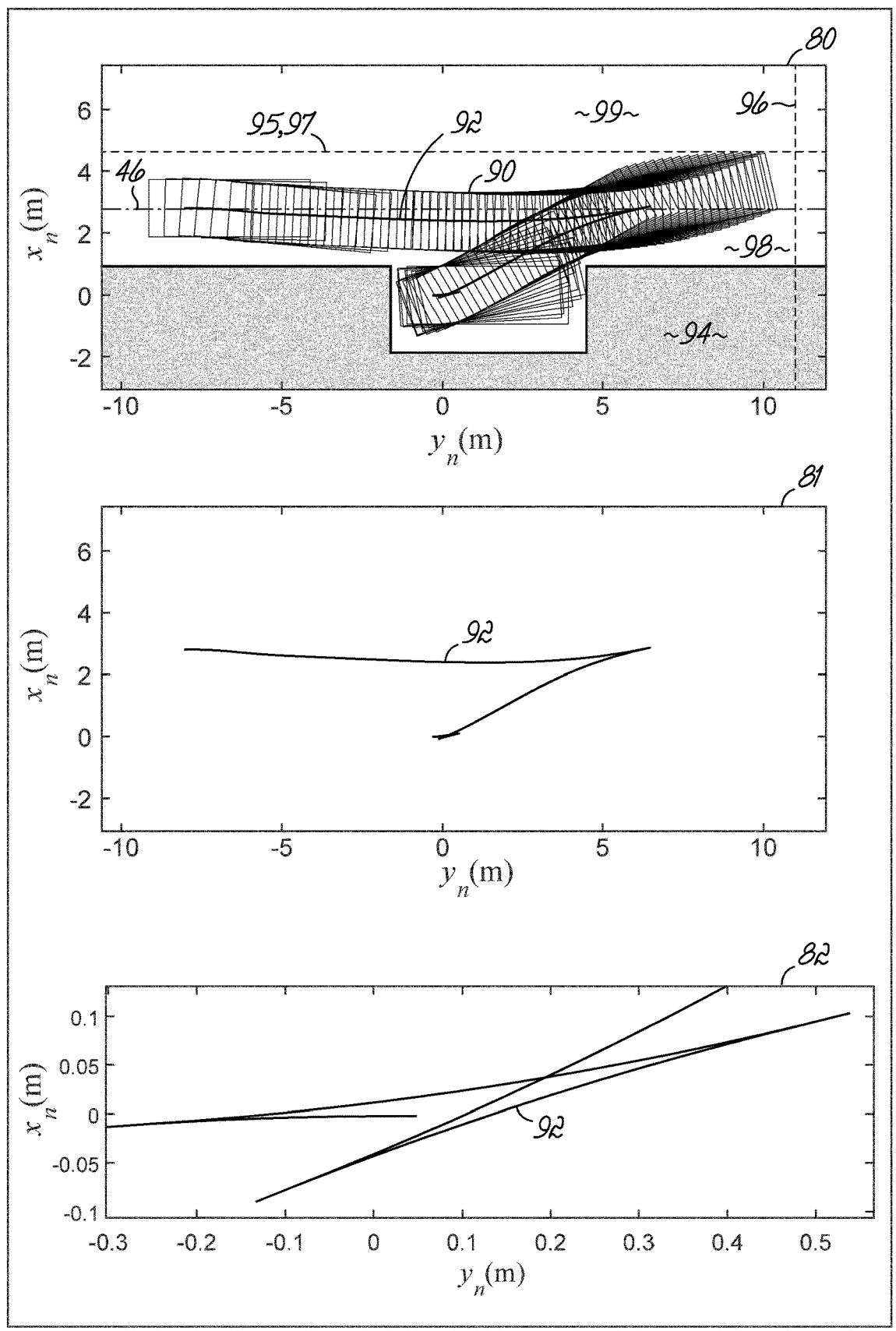
FIG. 8 is a diagrammatic view depicting a path of the vehicle for a simulated parallel parking maneuver using the vehicle control system of FIG. 1.
Figure 9:
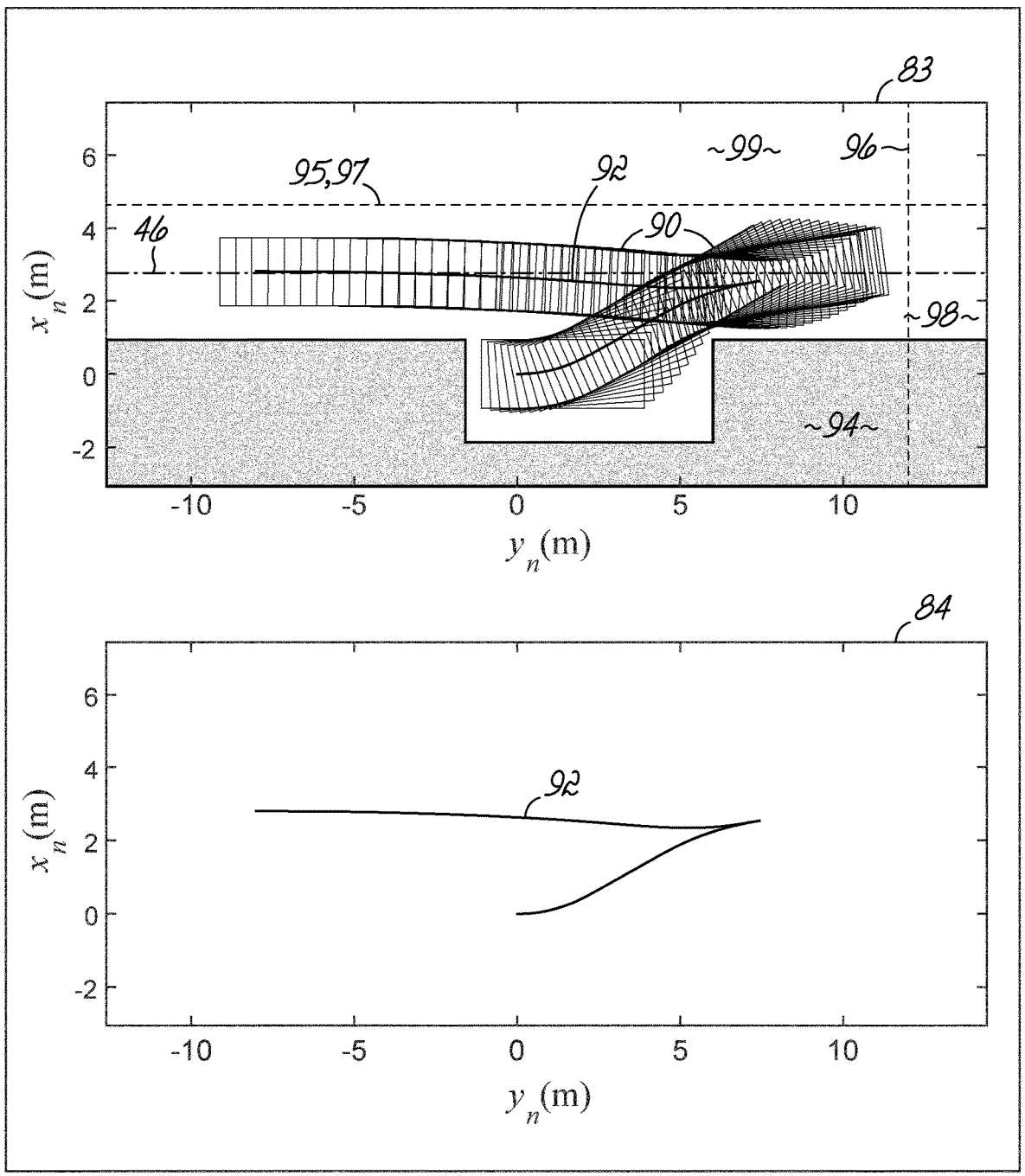
FIG. 9 is a diagrammatic view depicting a path of the vehicle for another simulated parallel parking maneuver using the vehicle control system of FIG. 1.
Figure 10:
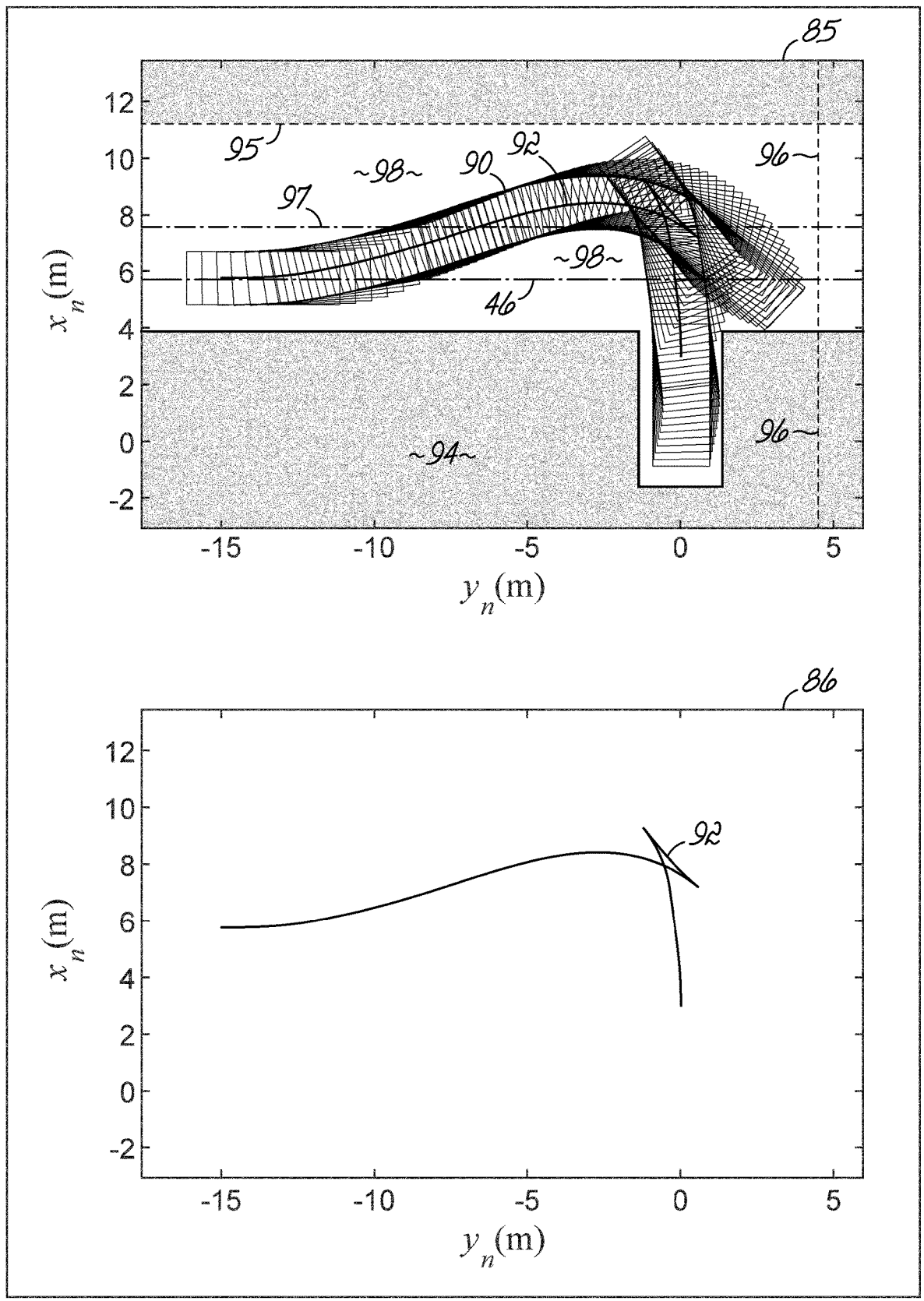
FIG. 10 is a diagrammatic view depicting a path of the vehicle for a simulated head-in perpendicular parking maneuver using the vehicle control system of FIG. 1.
Figure 11:
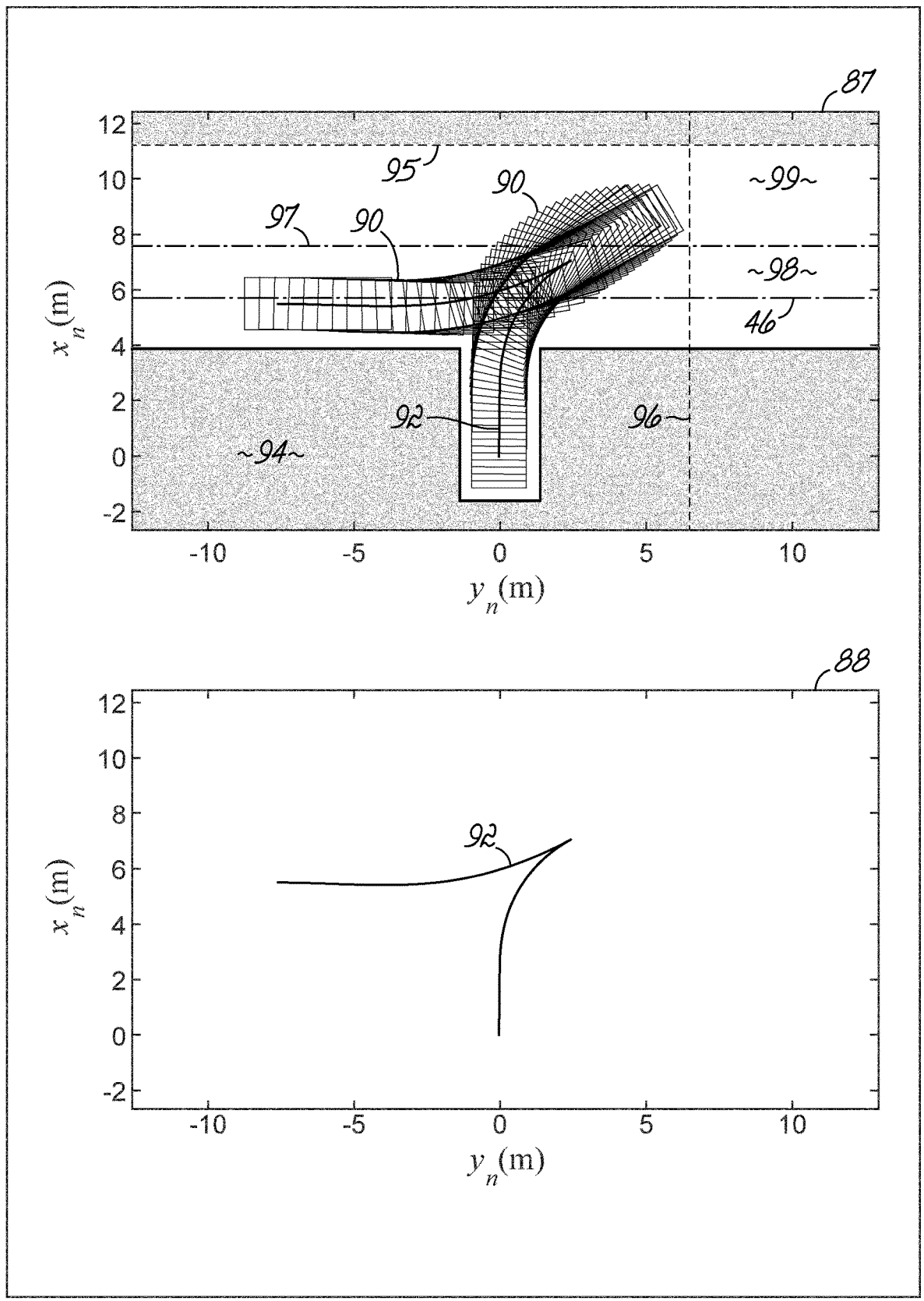
FIG. 11 is a diagrammatic view depicting a path of the vehicle for a simulated back-in perpendicular parking maneuver using the vehicle control system of FIG. 1.

FIG. 8 depicts graphs 80-82 of simulation results for a parallel parking maneuver in a narrow parking space 42, FIG. 9 depicts graphs 83-84 of simulation results for a parallel parking maneuver in a wide parking space 42, FIG. 10 depicts graphs 85-86 of simulation results for a head-in perpendicular parking maneuver, and FIG. 11 depicts graphs 87-88 of a back-in perpendicular parking maneuver. The graphs 80-88 include the target line 46, shapes 90 (e.g., polygons) illustrating a perimeter corresponding to or otherwise containing the body of the vehicle 40 when the vehicle 40 is in respective poses along a path 92, a prohibited region 94 that the vehicle 40 is not allowed to enter, a line 95 indicating a restriction on $x_n$, another line 96 indicating a restriction on $y_n$, and a line 97 representing a boundary between two drive aisles 98, 99. Graph 84 of FIG. 9 has a smaller scale showing additional details of a portion of the path 92 of graph 83. The poses along each path may include a start pose at a starting point of the path, an end pose at the ending point of the path, and intermediate poses at one or more points along the path between the start pose and the end pose.

FIG. 9 illustrates that the control system 10 is able to produce a one-maneuver path in the wide parking space. However, FIG. 8 illustrates that to park a vehicle in the tight parking space 42, the control system 10 used several forward and backward moves in which the steering angle was adjusted at the beginning of the move and the vehicle moved alternately backward and forward. FIGS. 10 and 11 illustrate that head-in parking requires a larger maneuvering space than back-in parking.

The computing time was around 80 ms for the parallel parking scenario and around 60 ms for the two perpendicular parking scenarios. Compared to the geometric planner, the computing time is on the same order of magnitude with the same class of CPUs. Conventional systems required more than 1 s (including initialization time) for parallel parking with the same class of CPUs. Embodiments of the invention can produce the entire path in four phases automatically whereas the geometric approach requires human intervention in practical use because it only automates phases one and two. Unlike the geometric approach, embodiments of the present invention have high applicability to different scenarios and can cope with environmental changes. The smoothness of the path is guaranteed by the algorithm as attested by the simulation results. It can also be see that, although the number of cusps is not explicitly taken into consideration in the design, it is small compared with conventional systems for tight parking spaces. In addition, the path-planner 32 can generate paths with a shorter length as compared to known systems.

Experimental Results for Path-Trajectory Module

Figure 12:
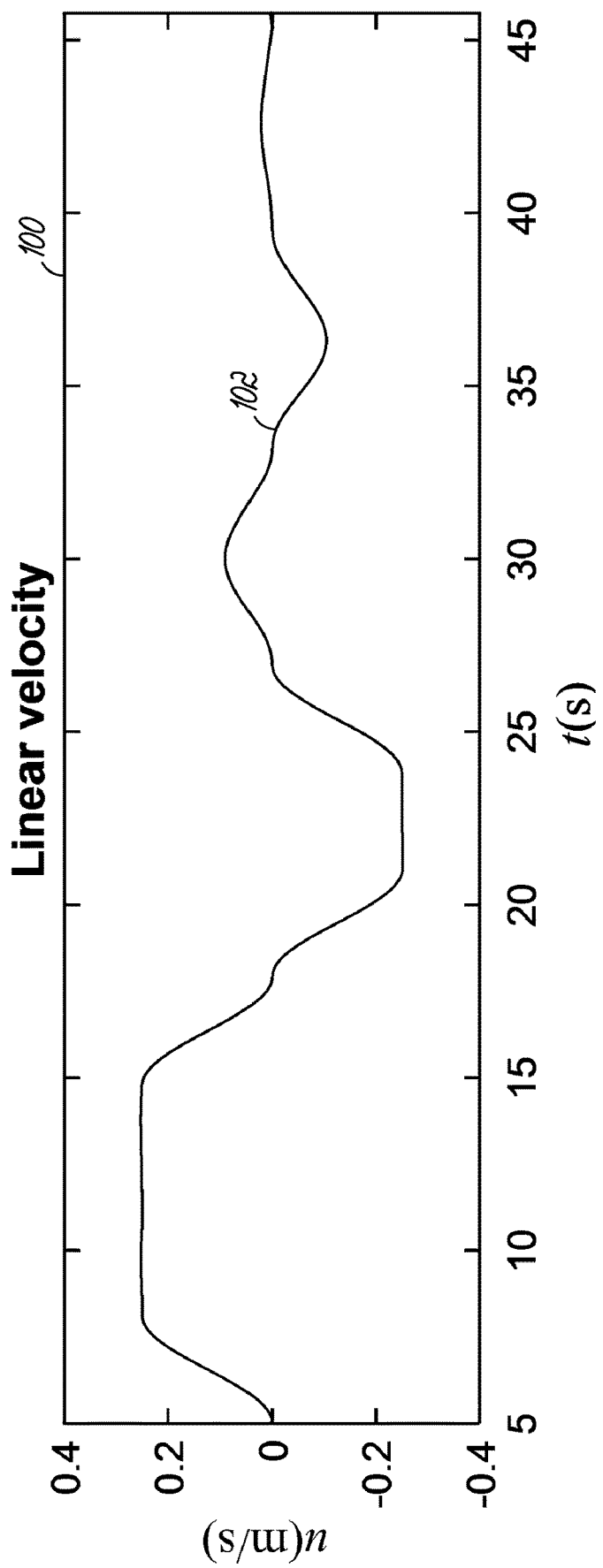
FIG. 12 is a graphical view of a plot depicting a velocity profile for an exemplary trajectory generated by the mission trajectory planner of FIGS. 1 and 2 for a simulated parallel parking maneuver.
Figure 13:
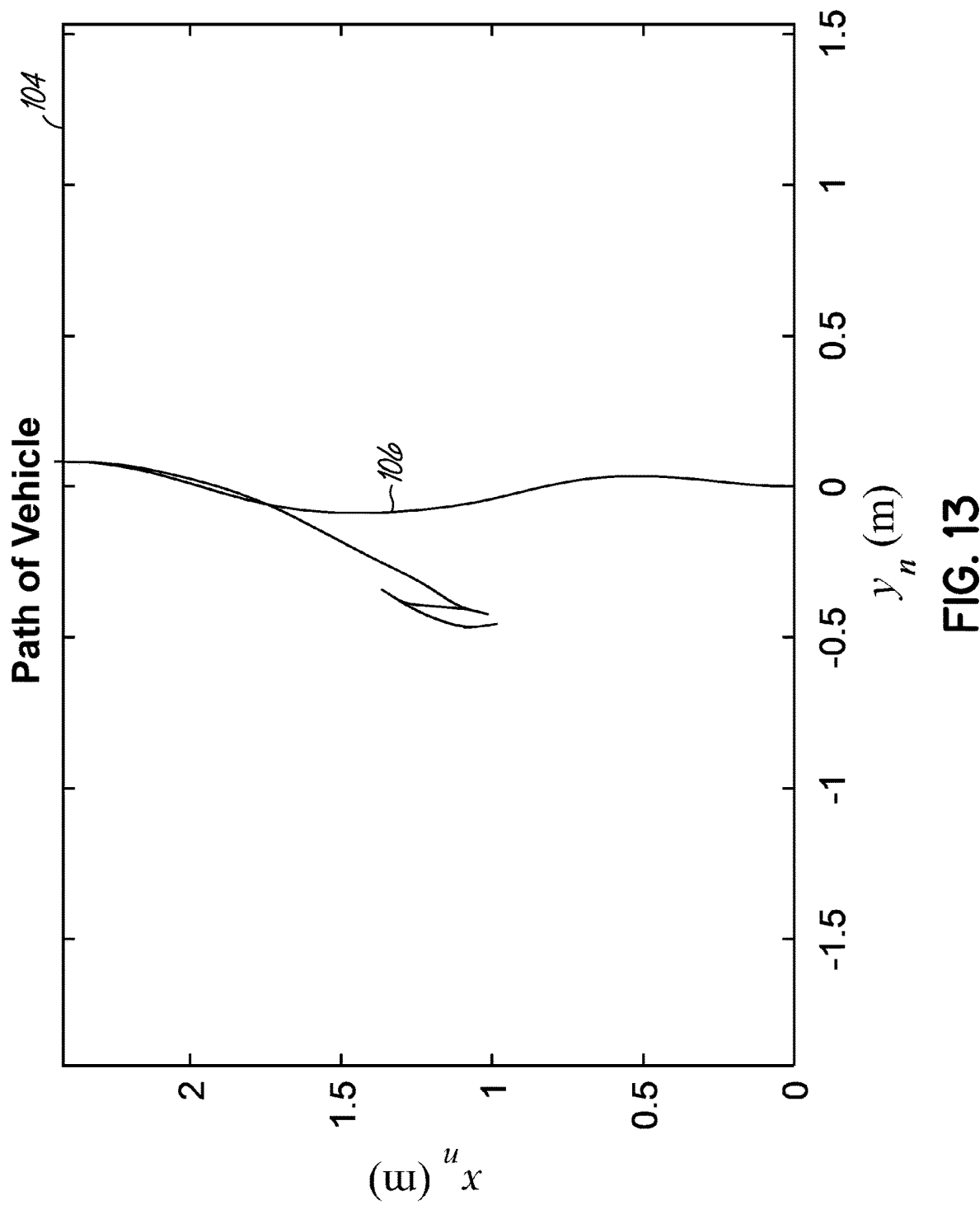
FIG. 13 is a graphical view of a plot depicting the path of the vehicle for the exemplary trajectory of FIG. 12.
Figure 14:
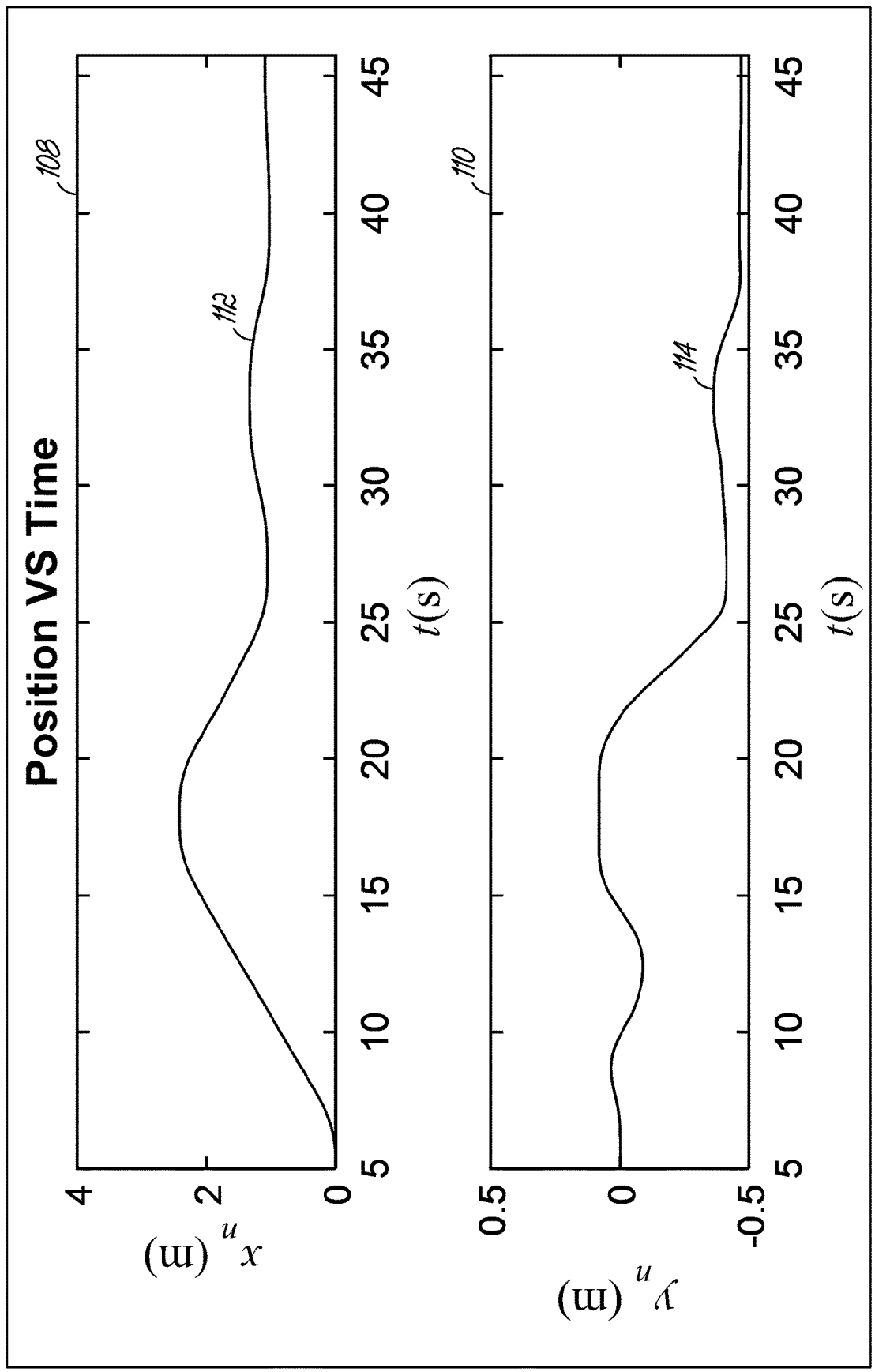
FIG. 14 is a graphical view of plots depicting position verses time in x and y-axes for the exemplary trajectory of FIGS. 12 and 13.
Figure 15:
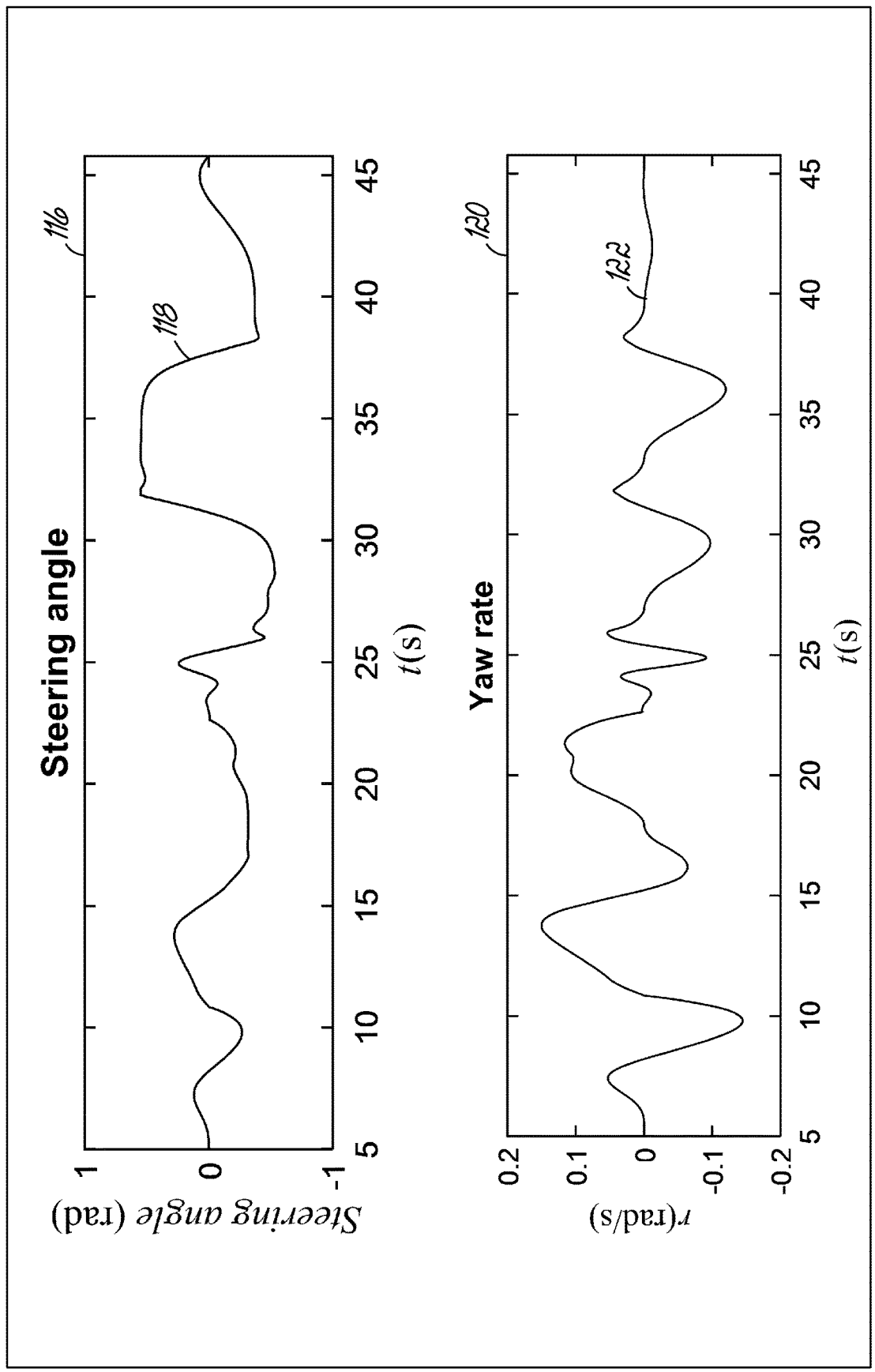
FIG. 15 is a graphical view of plots depicting steering angle and yaw rate verses time for the exemplary trajectory of FIGS. 12 and 13.
Figure 16:
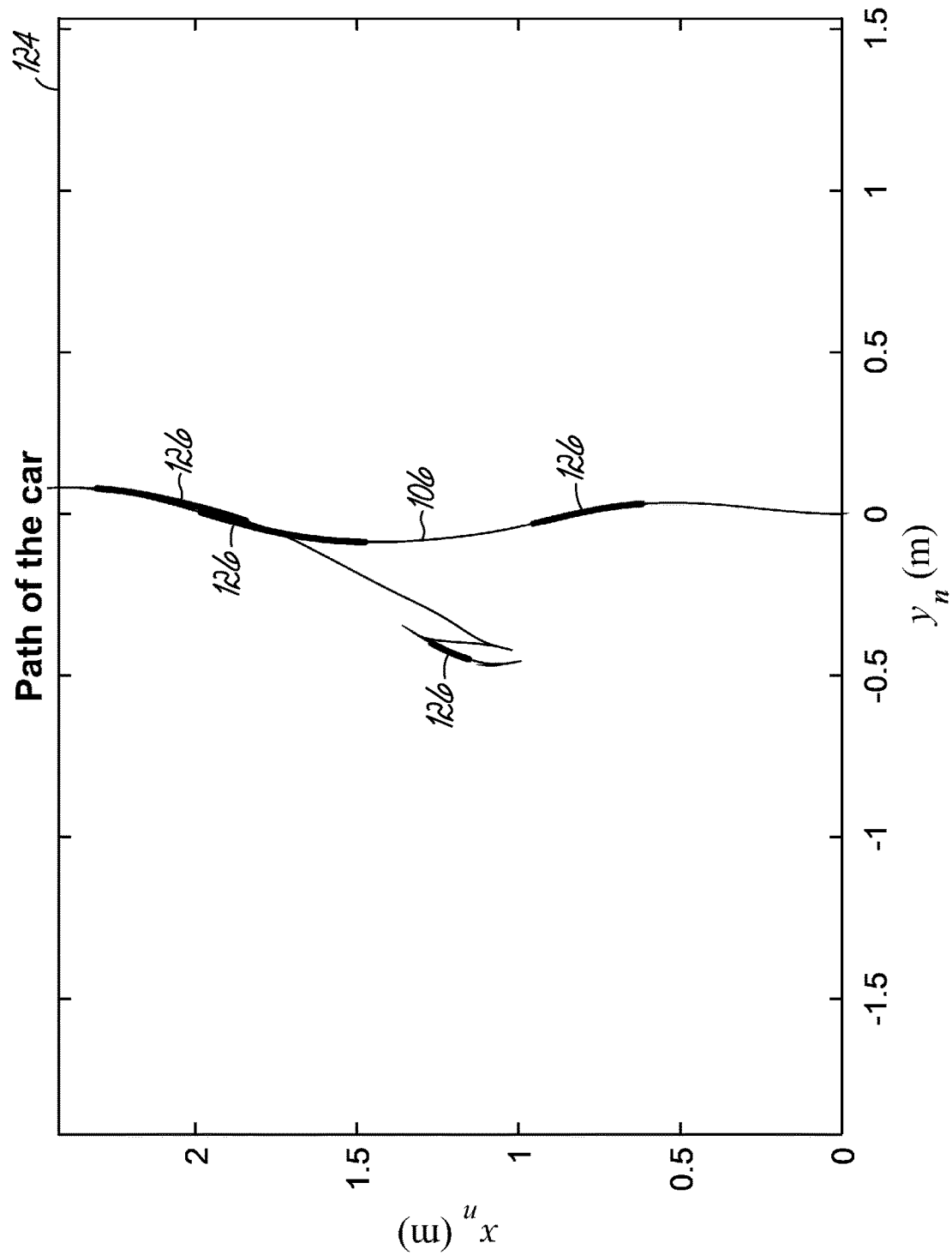
FIG. 16 is a graphical view of the path of FIG. 13 indicating portions of the path that are difficult to traverse.
Figure 17:
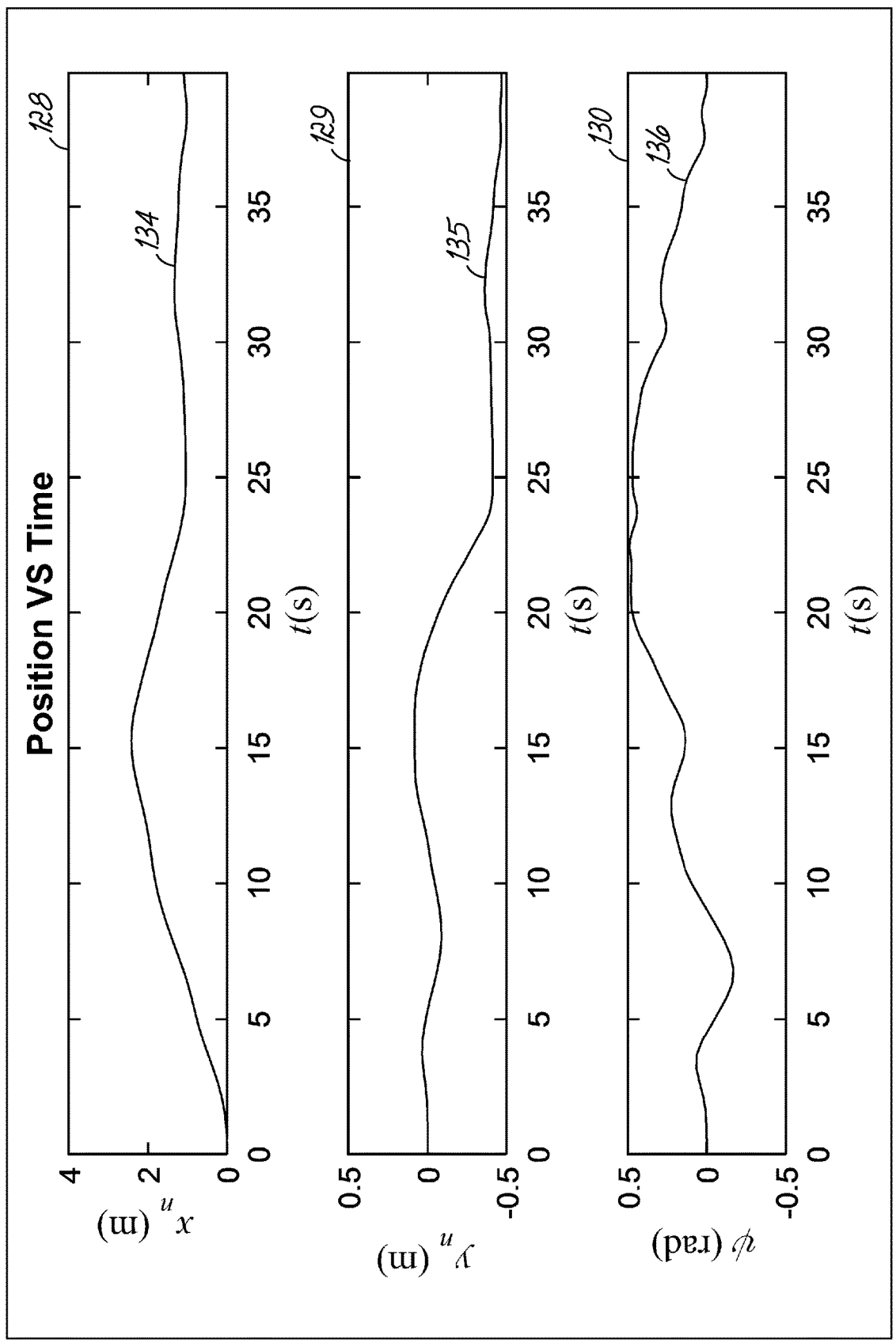
FIG. 17 is a graphical view of plots depicting position verses time in x and y-axes and orientation of the vehicle for an optimized trajectory for the parking maneuver of FIGS. 12-16.
Figure 18:
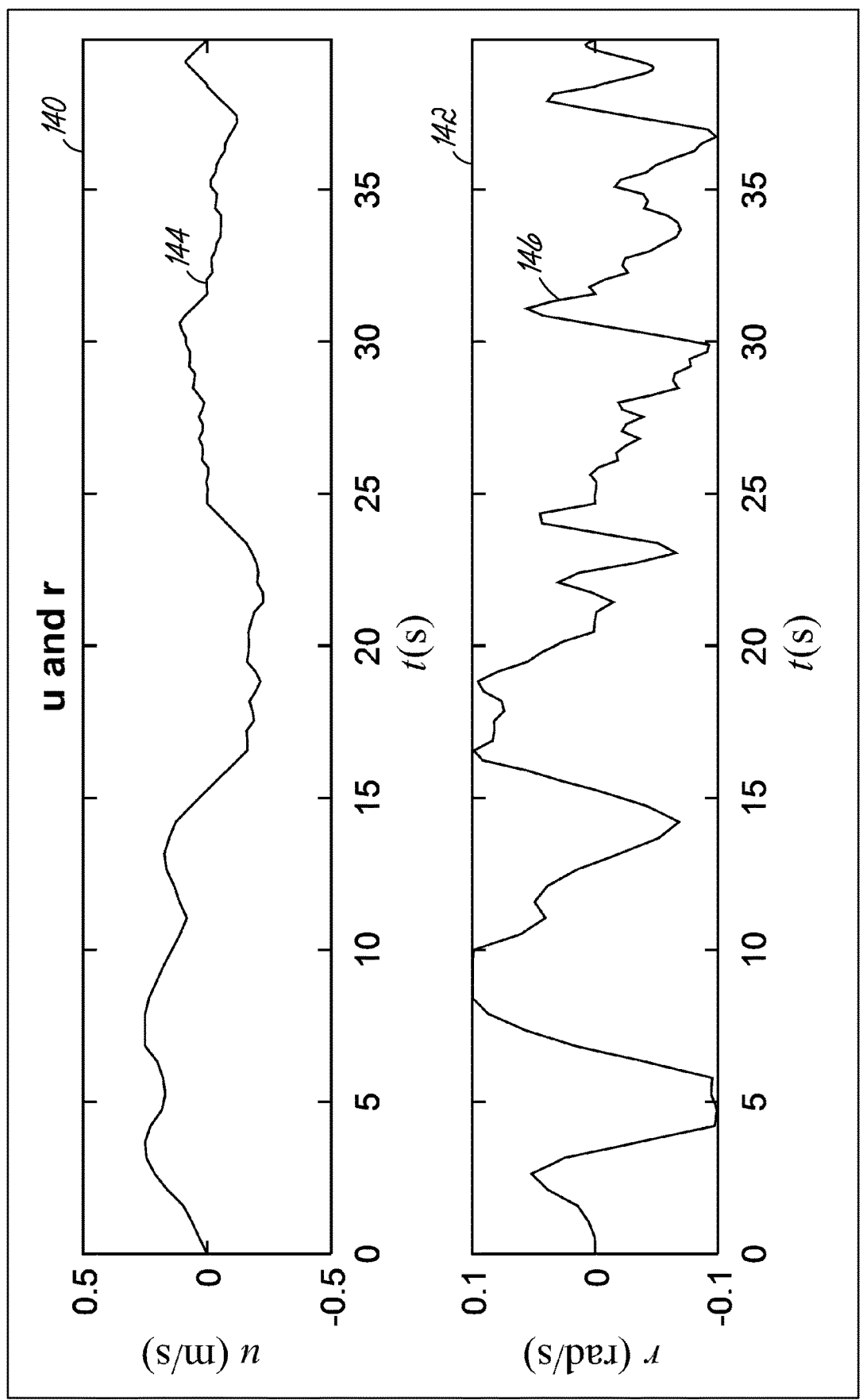
FIG. 18 is a graphical view of plots depicting velocity and yaw rate of the vehicle for the optimized trajectory of FIG. 17.

FIGS. 12-18 depict graphs illustrating the simulated performance of the path-trajectory converter 34. FIG. 12 depicts a graph 100 including a plot 102 of velocity verses time for a path for parallel parking having a smooth velocity profile. FIG. 13 depicts a graph 104 including a plot 106 of the path with respect to position coordinates $(x_n, y_n)$. FIG. 14 depicts graphs 108, 110 including plots 112, 114 of the $x_n$ and $y_n$ coordinates, respectively, verses time for the path. FIG. 15 depicts a graph 116 including a plot 118 of the steering angle verses time for the virtual vehicle 40 traversing the path and a graph 120 including a plot 122 of the yaw rate verses time for the virtual vehicle 40 traversing the path. FIG. 16 depicts a graph 124 of the plot 106 of the path with respect to position coordinates $(x_n, y_n)$ with portions of the path that are difficult to traverse indicated by lengths 126 of the plot 106 having an increased width relative to other portions of the plot 106. FIG. 17 depicts graphs 128-130 each including a plot 134-136 of position verses time for x-coordinate $x_n$, y-coordinate $y_n$, and orientation $\psi$, respectively, for an optimal trajectory. FIG. 18 depicts graphs 140, 142 each including a plot 144, 146 of velocity and yaw-rate verses time, respectively, for the optimal trajectory.

Line-of-Sight Pure Pursuit Guidance System

Under the PPG, the pursuer directs the vehicle towards an instantaneous target position rather than using an extra command. PPG for path following works by thinking of the vehicle as chasing a moving virtual target on the reference path with some distance ahead of the target. According to the chasing strategies used, PPG for path following can be classified into two categories: LOS PPG and ARC PPG. In LOS PPG, the pursuer tries to align the velocity vector with the LOS that connects itself to the virtual target. ARC PPG generates a circular arc that joins the current position of pursuer and the virtual target repeatedly for the pursuer to move along. The arcs lead the pursuer towards the reference path eventually.

Although PPG has a quite intuitive and simple form, compared to some far more complex approaches, it has a good capability to cope with discontinuity on the reference path. Moreover, PPG does not require the reference path to be known a priori. Thus, PPG is suitable to be used in real-time path following.

Because of the high nonlinearity of LOS PPG systems, a rigorous quantitative analysis of the stability of LOS PPG has not been done. There is a lack of theoretical analysis-based guidelines for the selection of the guidance parameters of LOS PPG. Thus, use of LOS PPG typically relies on empirical experience from simulations/experiments in tuning. By conducting simulations/experiments, it has been determined that a trade-off exists in selecting the lookout distance. As compared to a long lookout distance, the path generated using a short lookout distance often has less deviation from the reference path. However, if there is a delay in the guidance loop and noise in the reference path's data, the resulting path may oscillate and even diverge if the lookout distance is too small. By contrast, the path generated using a long lookout distance tends to approach the reference path more smoothly with less oscillation. But a long lookout distance may also cause the steady state error to be large for curvy reference paths. A long lookout distance may also result in the occurrence of the "cutting corner" phenomenon while executing turns.

Another guidance parameter is the guidance constant K, which may determine how fast the vehicle adjusts its velocity direction according to the LOS. ARC PPG provides the guidance system with an ability to follow a circular curve exactly at the steady state is equivalent to LOS PPG by taking the guidance constant as 2.

A Lyapunov stability analysis of LOS PPG is significant in both theoretical and practical point of view. On one hand, the stability analysis provides a rigorous and systematic interpretation of the observations in the simulations and experiments. On the other hand, it can be used as the theoretical foundation of LOS PPG design. Based on the stability analysis, a comprehensive design guideline of selecting the proper guidance parameters can be determined instead of using repeated trials. Embodiments of the invention may use LOS PPG from the perspective of path planning for lane following. By using theoretical analysis results, a comprehensive design guideline for the selection of the lookout distance and the guidance constant has been developed.

Figure 19:
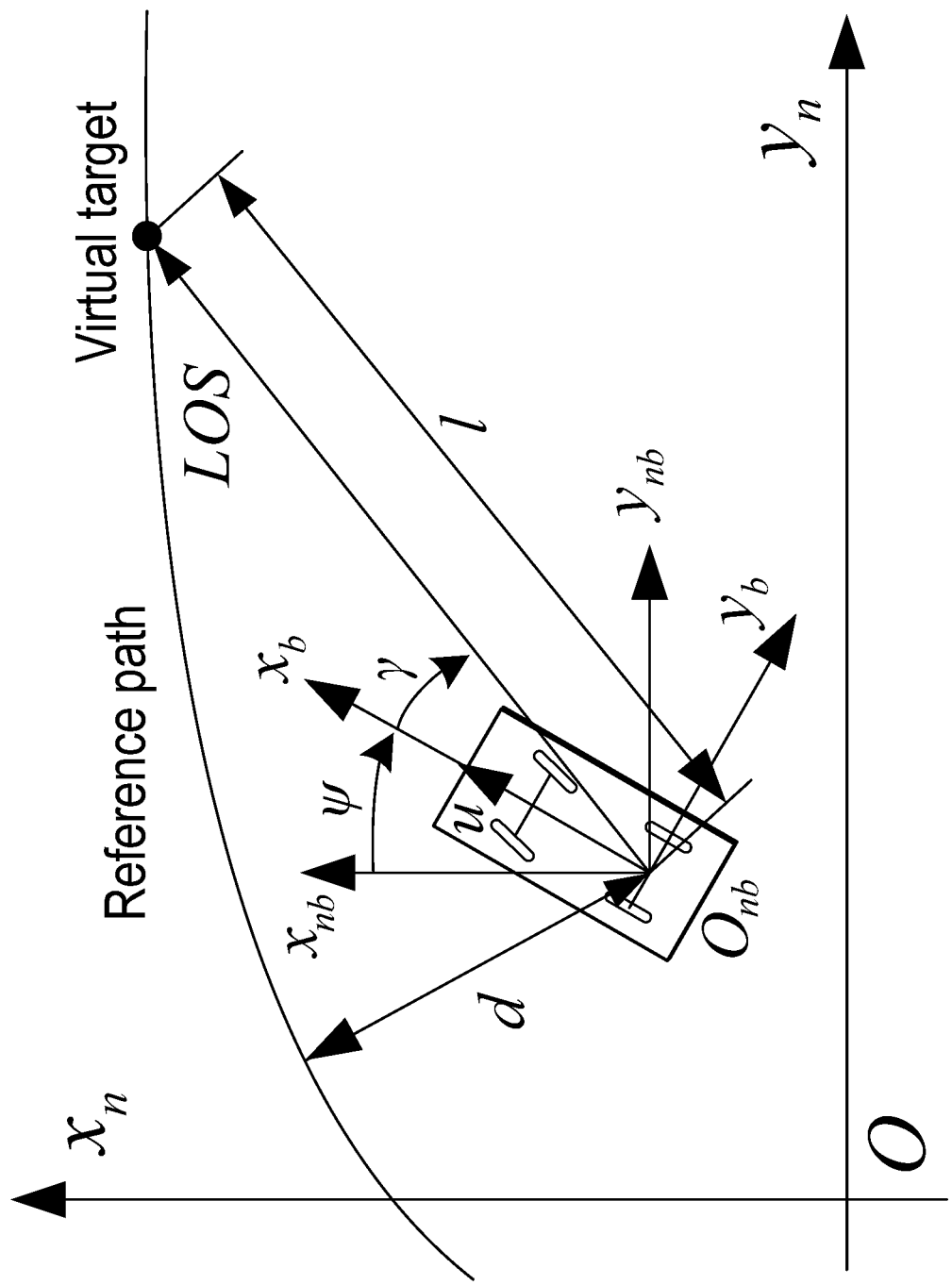
FIG. 19 is a diagrammatic view of the vehicle illustrating the coordinate frame for the vehicle in relation to a reference path and virtual target used by a Line-Of-Sight (LOS) Pure Pursuit Guidance (PPG) based trajectory planner.

FIG. 19 depicts a LOS PPG for an autonomous vehicle that includes the n-frame, the nb-frame, and b-frame described above with reference to FIG. 3, where $\psi$ is the orientation of the vehicle in the $n_b$-frame with respect to the $x_{nb}$ axis, r is the yaw rate, and u is the longitudinal speed in the b-frame. The reference path may be a curve that is feasible for the vehicle to follow. In the lane following problem, the reference path is often taken as the center line of the lane. The LOS may be defined as the line passing through the midpoint of the rear axle of the vehicle and the virtual target on the reference path. The b-frame LOS angle $\gamma$ may be defined as the angle between the orientation of the vehicle and the LOS, l denotes the length of lookout distance, and d denotes the cross-track error which is the minimum distance from the vehicle's position to the points on the reference path.

For the sake of clarity, the below description treats the two wheels on each axis as a single wheel located at the midpoint of the axis. Then, the vehicle model is equivalent to a bicycle whose kinematics are given by:

$$\dot{x}_n = \cos\psi \cdot u$$

$$\dot{y}_n = \sin\psi \cdot u$$

$$\dot{\psi} = r \qquad \text{Eqn. 54}$$

The following assumptions are made with respect to the below description of the LOS PPG. The reference path is smooth and followable by the vehicle. A virtual target can be selected on the reference path with the lookout distance l>d. The LOS angle is within (+90°, −90°). LOS is not perpendicular to the tangent of the reference path at the virtual target. The vehicle only drives forward, i.e., u>0. The lookout distance l is piecewise constant. The longitudinal speed u is smooth, slowly varying, and non-vanishing.

LOS PPG design may include selecting a longitudinal speed u, selecting a lookout distance l according to the reference path and u, selecting a virtual target on the reference path at a distance l ahead of the vehicle, and designing a guidance rule to generate a path that leads the vehicle to chase the virtual target. The LOS PPG rule may be in the form of a function of the LOS angle. The general form of the LOS PPG rule can thus be written as:

$$r = g(y, l, u) \qquad \text{Eqn. 55}$$

where g is an odd-symmetric function of y with time-varying parameters l and u.

Figure 20:
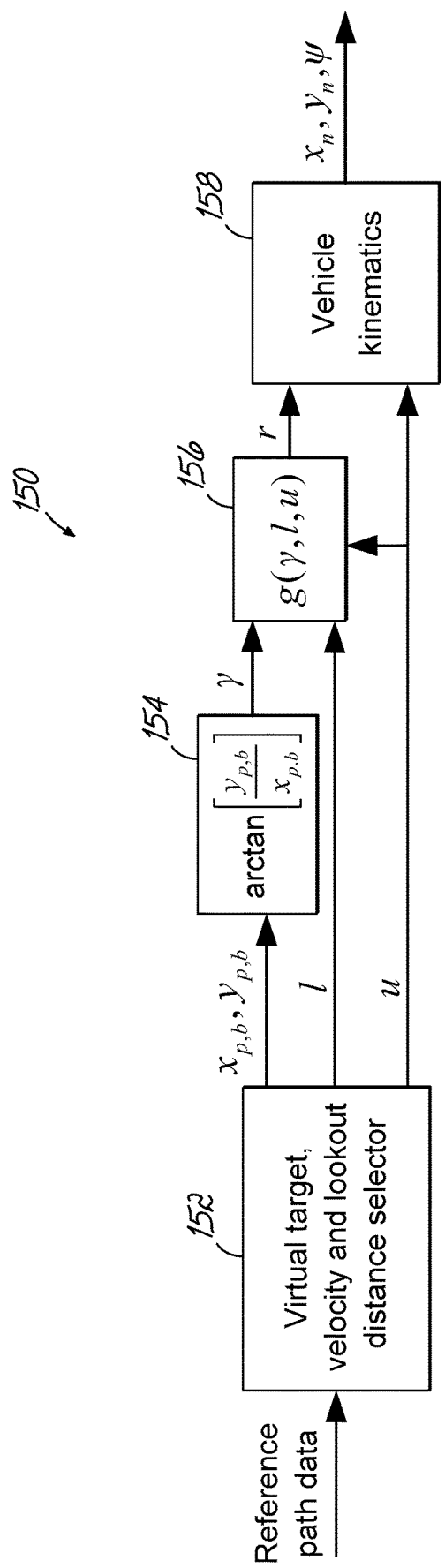
FIG. 20 is a schematic view of a control system that may be implemented by the LOS PPG trajectory planner.

FIG. 20 depicts a guidance system 150 that includes a selector module 152, a conversion module 154, a LOS PPG rule module 156, and a vehicle kinematics module 158. In an embodiment of the invention, the path planning problem solved by the guidance system 150 may be independent of the specific value of the longitudinal speed u under the previous assumption. However, if u is a fast-varying parameter, the dynamics of the vehicle may have a significant effect on the path, and may be considered in path planning. Moreover, in the trajectory planning problem, it may be advantageous to assign a velocity profile to the path. The corresponding speed limit for u may be determined by the structure constraint or by the auto planner, for example, together with the dynamic constraint.

For guidance in a road driving scenario without a leading vehicle, or for a leading vehicle that is beyond a threshold distance from the autonomous vehicle, the autonomous vehicle may drive in a lane following mode. In the lane following mode, a LOS PPG for path following may be used that selects a lookout distance l that maintains the vehicle in the lane. If the leading vehicle gets close enough, the autonomous vehicle may switch to a chasing mode. Then, PPG for target chasing may be employed. To be able to stop safely in an emergency, a vehicle in the chasing mode may maintain a certain safe lookout distance $l_{safe}$ from the vehicle ahead. In this case, $l_{safe}$ may be velocity dependent and provided by $l_{safe} = \lambda_{safe} u$, where $\lambda_{safe}$ is a safe reaction time. An exemplary value for $\lambda_{safe}$ may be one in which the following vehicle stays between one or two seconds behind the leading vehicle.

Let $(x_p, y_p)$ be the coordinate of the virtual target on the reference path in the n-frame, let $\psi_p$ be the reference orientation at the virtual target, let $u_p$ be the speed of the virtual target as the vehicle moves forward, and let $\tilde{x}_p = x_n - x_p$, $\tilde{y}_p = y_n - y_p$ be the guidance error in the $x_n$ and $y_n$ directions, respectively. Considering the polar coordinates in the $\tilde{x}_p - \tilde{y}_p$ plane, further let θ be the angle of the LOS with respect to the $\tilde{x}_p$-axis. Then, we have $\tilde{x}_p = l\cos\theta$, $\tilde{y}_p = l\sin\theta$. Differentiating $\tilde{x}_p$ and $\tilde{y}_p$ with respect to time t produces:

$$\dot{\tilde{x}} = \dot{l}\cos\theta - l\sin\theta\cdot\dot{\theta} = \cos\psi\cdot u - \dot{x}_p$$

$$\dot{\tilde{y}} = \dot{l}\sin\theta + l\cos\theta\cdot\dot{\theta} = \sin\psi\cdot u - \dot{y}_p \qquad \text{Eqn. 56}$$

which can be rewritten as:

$$\dot{l} = \cos(\psi - \theta)\cdot u - (\cos\theta\cdot\dot{x}_p + \sin\theta\cdot\dot{y}_p) \qquad \text{Eqn. 57}$$

$$\dot{\theta} = \frac{1}{l}\sin(\psi - \theta)\cdot u + \frac{1}{l}(\sin\theta\cdot\dot{x}_p - \cos\theta\cdot\dot{y}_p)$$

By using $\dot{x}_p = u_p\cos\psi_p$, $\dot{y}_p = u_p\sin\psi_p$, Equation 57 can be reduced to:

$$\dot{l} = \cos(\psi - \theta)\cdot u - \cos(\theta - \psi_p)\cdot u_p \qquad \text{Eqn. 58}$$

$$\dot{\theta} = \frac{1}{l}\sin(\psi - \theta)\cdot u + \frac{1}{l}\sin(\theta - \psi_p)\cdot u_p$$

The LOS PPG rule may be provided by:

$$r = \frac{K\sin\gamma}{l}u \qquad \text{Eqn. 59}$$

where K is the guidance constant. Let λ be the ratio of the lookout distance l to the vehicle speed u. Then, by the previous assumptions, λ is piecewise smooth. Letting the maximum and minimum longitudinal speed on the path be $u_{max}$ and $u_{min}$, respectively, produces $1/u_{min} \geq \lambda \geq 1/u_{max} > 0$. Thus, the LOS PPG rule can be further written as:

$$r = \frac{K}{\lambda}\sin\gamma \qquad \text{Eqn. 60}$$

Therefore, the yaw angle of the vehicle satisfies:

$$\dot{\psi} = \frac{K}{\lambda}\sin\gamma \qquad \text{Eqn. 61}$$

Without loss of generality, consider the reference path segment along which l is fixed. By equation 58, we have $$\cos(\psi - \theta)\cdot u - \cos(\theta - \psi_p)\cdot u_p = 0 \qquad \text{Eqn. 62}$$

Let $\kappa_p$ be the curvature of the reference path. Then, we have:

$$\dot{\psi}_p = \tilde{\kappa}_p u_r \qquad \text{Eqn. 63}$$

By the rules of geometry, the LOS angle γ satisfies γ=θ−ψ−π. Letting $\gamma_p = \psi_p - \theta + \pi$ and combining equations 58, 61, 62 and 63, we have the guidance error dynamics with state variables γ and $\gamma_p$ in polar coordinates:

$$\dot{\gamma} = -\frac{K-1}{\lambda}\sin\gamma + \frac{1}{\lambda}\cos\gamma\tan\gamma_p \qquad \text{Eqn. 64}$$

-continued $$\dot{\gamma}_p = -\frac{1}{\lambda}\sin\gamma - \frac{1}{\lambda}\cos\gamma\tan\gamma_p + \frac{l\cos\gamma}{\lambda\cos\gamma_p}\kappa_p$$

where $|\gamma|$, $|\gamma| < \pi/2$ by the previous assumptions, and $\kappa_p$ serves as a nonvanishing perturbed term to the system. Denoting the maximum absolute curvature of the reference path by $\kappa_{p,max}$ and the maximum turning curvature for the vehicle by $\kappa_{max}$, we have $\kappa_{p,max} \leq \kappa_{max}$ in order to keep the reference path feasible for the vehicle to follow.

To determine the ultimate bounds of $\gamma$ and $\gamma_p$, Lyapunov stability analysis may be conducted for the polar coordinate representation, and a quantitative analysis may be used to determine the cross-track error d. A different guidance constant K may be determined using a geometric interpretation of LOS PPG. A comprehensive design guideline may then be determined for the selection of the lookout distance l and guidance constant K along the reference path based on the analysis result.

Lypunov stability theory may be used to determine the stability for the guidance error dynamics. Consider an unforced system for Equation 64. By linearizing the unforced system at the origin, it can be seen that the origin is exponentially stable for K>0 and unstable for K<0. For the case where K=0, the solution may remain on a level surface $\gamma+\gamma_p=C$, where C is constant. Therefore, the origin may not be asymptotically stable for K=0. For the case where K>1, it can be shown that the system is uniformly ultimately bounded. The following theorem from Lyapunov analysis can be used in the proof of the main theorem.

Theorem 4.1: Consider the nonlinear system $$\dot{\xi}=f(t,\xi) \qquad \text{Eqn. 65}$$

where $f:[0,\infty)\times D \to \mathbb{R}^n$ is piecewise continuous in t and locally Lipschitz in $\xi$ on $[0, \infty)\times D$, and $D \subset \mathbb{R}^n$ is a domain that contains the origin. Let $V:[0,\infty)\times D \to \mathbb{R}$ be a continuously differentiable Lyapunov function that satisfies:

$$\alpha_1(\|\xi\|) \leq V(t, \xi) \leq \alpha_2(\|\xi\|) \qquad \text{Eqn. 66}$$

$$\frac{\partial V}{\partial t} + \frac{\partial V}{\partial \xi}f(t,\xi) \leq -W_3(\xi), \forall \|\xi\| \geq \mu > 0$$

on $[0, \infty) \times D$, where $\alpha_1$ and $\alpha_2$ are class $\mathcal{K}$ functions and $W_3(\xi)$ is a continuous positive definite function. Take r>0 such that $B_r \subset D$ and suppose that $\mu < \alpha_2^{-1}(\alpha_1(r))$. Then, there exists a class $\mathcal{KL}$ function $\beta$ and for every initial state $\xi(t_0)$, satisfying $\|\xi(t_0)\| \leq \alpha_2^{-1}(\alpha_1(r))$, there is $T \geq 0$ such that the solution of Equation 65 satisfies:

$$\|\xi(t)\|\leq\beta(\|\xi(t_0)\|,t-t_0), \forall t_0 \leq t \leq t_0+T \|\xi(t)\|\leq\alpha_1^{-1}(\alpha_2(\mu)),$$
$$\forall t \geq t_0+T \qquad \text{Eqn. 67}$$

The following trigonometric inequality may be used in the proof of Theorem 4.2: Lemma 4.1. Let $a \geq 1$, $x \in (-\pi/2, \pi/2)$ be real numbers, then the following inequality holds:

$$a\tan^2 x - \frac{\tan x}{\cos x} + \frac{1}{2a} > 0 \qquad \text{Eqn. 68}$$

This may be proven using the substitution y=tan x, which converts Equation 68 to:

$$ay^2 + \frac{1}{2a} > y\sqrt{y^2+1} \qquad \text{Eqn. 69}$$

If $y \leq 0$, it can be seen that the inequality holds directly. If y>0, by squaring the both sides, the inequality is proven.

Theorem 4.2: Consider the nonvanishing perturbed system of Equation 64, where l>0, K>1 and both l and K are constants. $\lambda$ is a smoothly and slowly varying variable that satisfies $\lambda_{min} \geq \lambda \geq \lambda_{max}$ for some positive numbers $\lambda_{min}$, $\lambda_{max}$. Suppose that there exists a positive constant m>1.04 that satisfies $ml\kappa_{p,max} < \min [1, K-1]$. Then, for all trajectories started in the region $$\Omega = \{\gamma,\gamma_p \in \mathbb{R}^n | \sqrt{\gamma^2+\gamma_p^2} < 1.44\}$$

the solutions of Equation 64 are uniformly ultimately bounded by:

$$\sqrt{\gamma^2+\gamma_p^2} \leq b \qquad \text{Eqn. 70}$$

where $$b = \sqrt{2\arcsin^2\left(\frac{1}{m}\right) + 2\arctan^2\left(\frac{1}{\sqrt{2}m}\right)} \qquad \text{Eqn. 71}$$

Moreover, if $\gamma_p$ is bounded by $|\gamma_p| \leq \gamma_{p,max}$, where $\gamma_{p,max} < \pi/2$ is a positive constant, and K satisfies K>tan $\gamma_{p,max}+1$, then the solution of $\gamma$ is uniformly ultimately bounded by:

$$|\gamma| \leq \arcsin\left(\frac{\tan\gamma_{p,max}}{K-1}\right) \qquad \text{Eqn. 72}$$

This may be proven by considering the Lyapunov function candidate:

$$V(\gamma, \gamma_p) = \ln\frac{1}{\cos\gamma} + \ln\frac{1}{\cos\gamma_p} \qquad \text{Eqn. 73}$$

It can be proven that V $(\gamma, \gamma_p)$ satisfies:

$$\frac{1}{2}(\gamma^2 + \gamma_p^2) \leq \ln\frac{1}{\cos\gamma} + \ln\frac{1}{\cos\gamma_p} \leq \gamma^2 + \gamma_p^2 \qquad \text{Eqn. 74}$$

in the region $\Omega = \{\gamma,\gamma_p | \sqrt{\gamma^2+\gamma_p^2} < 1.44\}$. Calculating the derivative of V($\gamma$, $\gamma_p$) along the trajectories of the perturbed system, we obtain:

$$\dot{V}(\gamma, \gamma_p) = -\frac{K-1}{\lambda}\sin\gamma\tan\gamma - \frac{1}{\lambda}\cos\gamma\tan^2\gamma_p + \frac{l\kappa_p}{\lambda}\frac{\cos\gamma\tan\gamma_p}{\cos\gamma_p} \qquad \text{Eqn. 75}$$

$$= -\frac{K-1-ml\kappa_p}{\lambda}\sin\gamma\tan\gamma - \frac{1-ml\kappa_p}{\lambda}\cos\gamma\tan^2\gamma_p - \frac{l\kappa_p\cos\gamma}{\lambda}\left(m\tan^2\gamma_p + m\tan^2\gamma - \frac{\tan\gamma_p}{\cos\gamma_p}\right)$$

Since $ml\kappa_{p,max} < \min\{1, K-1\}$, the first two terms are positive. It can be seen that:

$$m\tan^2\gamma_p - \frac{\tan\gamma_p}{\cos\gamma_p} = \frac{\tan\gamma_p}{\cos\gamma_p}(m\sin\gamma_p - 1) > 0 \qquad \text{Eqn. 76}$$

for all $$|\gamma_p| > \arcsin\left(\frac{1}{m}\right).$$

Also, by Lemma 4.1, it can be seen that:

$$m\tan^2\gamma_p + m\tan^2\gamma - \frac{\tan\gamma_p}{\cos\gamma_p} > -\frac{1}{2m} + m\tan^2\gamma > 0 \qquad \text{Eqn. 77}$$

for all $$|\gamma| > \arcsin\left(\frac{1}{\sqrt{2}\,m}\right).$$

Thus, the term in the bracket of equation 75 is greater than 0 for all $\gamma$ and $\gamma_p$ that satisfy:

$$\gamma^2 + \gamma_p^2 > \arcsin^2\left(\frac{1}{m}\right) + \arctan^2\left(\frac{1}{\sqrt{2}\,m}\right) \qquad \text{Eqn. 78}$$

For all $m > 1.04$, the ball:

$$B_\mu = \left\{\gamma, \gamma_p \bigg| \gamma^2 + \gamma_p^2 \leq \arcsin^2\left(\frac{1}{m}\right) + \arctan^2\left(\frac{1}{\sqrt{2}\,m}\right)\right\}$$

is contained by the region $\Omega$ and all trajectories starting inside $\Omega$ remain for all future time in $\Omega$. Moreover, the conditions of Theorem 4.1 are satisfied in $\Omega$. Therefore, the solutions of the perturbed system are uniformly ultimately bounded by:

$$b = \sqrt{2\arcsin^2\left(\frac{1}{m}\right) + 2\arctan^2\left(\frac{1}{\sqrt{2}\,m}\right)} \qquad \text{Eqn. 79}$$

Furthermore, the first equation in Equation 64 satisfies:

$$\dot\gamma = -\frac{K-1}{\lambda}\sin\gamma + \frac{1}{\lambda}\cos\gamma\tan\gamma_p < -\frac{K-1}{\lambda}\sin\gamma + \frac{1}{\lambda}\tan\gamma_{p,max} \qquad \text{Eqn. 80}$$

By the condition $K > \tan\gamma_{p,max} + 1$ and the comparison principle, the second part of the theorem is proved.

The first part of Theorem 4.2 implies that the conservative ultimate bound of $\sqrt{\gamma^2 + \gamma_p^2}$ increases as the product of lookout distance l and path curvature $\mathcal{K}_{p,max}$ increases. Therefore, in order to maintain the magnitude of $\gamma$ and $\gamma_p$ on the entire reference path, the lookout distance l must be reduced at the part where $|\mathcal{K}_p|$ is large, i.e., the vehicle must reduce the lookout distance l at the turns. By Equation 75, we can see that the rate of convergence to steady state increases as K increases. When there is a sudden change in the sign of the curvature of the reference path, the vehicle may tend to deviate from the reference path. Increasing K may drive the vehicle back to the reference path quickly. One practical issue for the LOS PPG system is that, by the LOS PPG rule of Equation 59, if the vehicle's maximum turning curvature $\mathcal{K}_{max} < K/l$, the resulting path may not be feasible at the part where $|\gamma|$ is too large. Therefore, if the vehicle has difficulty following the path at some part with a large curvature, K may be reduced so that $K < l\mathcal{K}_{max}$. Moreover, K may have no effect on the ultimate bound of $\sqrt{\gamma^2 + \gamma_p^2}$ if $K > 2$. However, by the second part of Theorem 4.2, the ultimate bound of $\gamma$ decreases as K increases. Thus, we may expect that the ultimate bound of $\gamma_p$ to increase as K increases for $K > 2$.

The cross-track error d may indicate the lateral deviation of the vehicle from a reference path. Because of the road restriction, LOS PPG must keep the cross-track error small enough to keep the vehicle in its lane, even during sharp turns. The ultimate bound of the steady state cross-track error may be provided by Theorem 4.3, which considers an LOS PPG system characterized by the polar coordinate representation of Equation 64 following a reference path segment. If the solution of the polar coordinate representation is uniformly ultimately bounded, then, the cross-track error d is uniformly ultimately bounded by:

$$d \leq \sqrt{l^2 + \frac{1}{\mathcal{K}_{p,max}^2} + \frac{2l\sin(\gamma_{p,ult})}{\mathcal{K}_{p,max}}} - \frac{1}{\mathcal{K}_{p,max}} \qquad \text{Eqn. 81}$$

where $\gamma_{p,ult}$ is the ultimate bound of $\gamma_p$ on this path segment.

Figure 21:
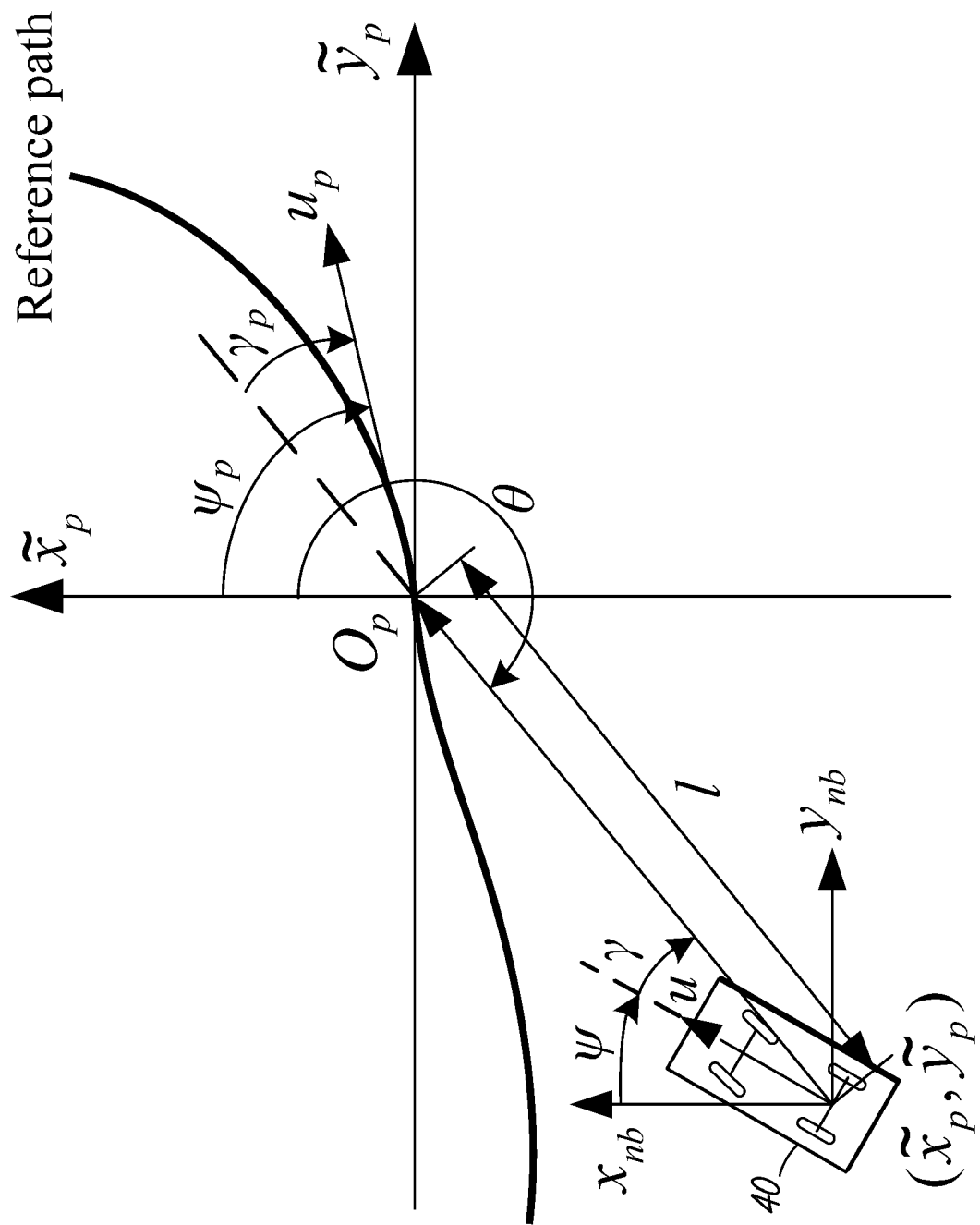
FIG. 21 is a diagrammatic view of an exemplary reference path in a polar coordinate system that may be used by the LOS PPG trajectory planner to generate a trajectory.

This may be proven by considering the polar coordinate graph shown in FIG. 21. By the rules of geometry, it can be seen that, for all the possible paths that pass through the origin $O_p$ with $|\mathcal{K}_p| \leq \mathcal{K}_{p,max}$ and tangent angle $\psi_p$, the circle arc represented by:

$$\tilde{x}_p^2 + \tilde{y}_p^2 - \text{sgn}(\gamma_p)\left(\frac{2}{\mathcal{K}_{p,max}}\cos\psi_p \cdot \tilde{x}_p - \frac{2}{\mathcal{K}_{p,max}}\sin\psi_p \cdot \tilde{y}_p\right) = 0 \qquad \text{Eqn. 82}$$

provides the maximum distance to the vehicle 40. By calculation, the corresponding minimum distance from the vehicle 40 to the circle arc is given by:

$$d_{arc} = \sqrt{l^2 + \frac{1}{\mathcal{K}_{p,max}^2} + \frac{2l\sin(|\gamma_p|)}{\mathcal{K}_{p,max}}} - \frac{1}{\mathcal{K}_{p,max}}$$

Since $\gamma_{p,ult}$ is the ultimate bound of $\gamma_p$, we have $|\gamma_p| < \gamma_{p,ult}$ at steady state. Theorem 4.3 is thus proven.

By Theorem 4.3, we can see that the ultimate bound of the cross-track error d increases as the lookout distance l or the maximum path curvature $\mathcal{K}_{p,max}$ increases. This means that, in order to maintain the same magnitude of the cross-track error d on the reference path, we must reduce the lookout distance l at the turns. Moreover, for $K > 2$, by Theorem 4.3, we may expect that the ultimate bound of the b-frame LOS angle $\gamma_p$ to increase as K increases. By Theorem 4.3, this will further result in a larger ultimate bound of cross-track error d.

Comparing the LOS PPG rule defined by Equation 59 with the algebraic expression of the ARC PPG rule, we can see that ARC PPG can be interpreted as a special case of LOS PPG with $K=2$. As described below, a geometric interpretation of LOS PPG may be determined by analyzing the general problem that how K affects the geometry of a fitted curve.

Consider the guidance scenario of a fixed target. Then, in Equation 58, we set the longitudinal speed $u_p=0$. The LOS PPG guidance rule defined by Equation 59 may then be used by allowing the lookout distance l to change continuously as the vehicle moves. Therefore, the guidance system can be characterized by:

$$\dot{l} = \cos(\psi - \theta) \cdot u$$
$$\dot{\theta} = \frac{1}{l}\sin(\psi - \theta) \cdot u \qquad \text{Eqn. 83}$$
$$\dot{\omega} = \frac{K}{l}\sin(\psi - \theta) \cdot u$$

where we take K>1 to guarantee the stability. By the first two equations of Equation 83, we have $$\frac{dl}{d\theta} = \frac{l}{\tan(\psi - \theta)} \qquad \text{Eqn. 84}$$

and by the last two equations of Equation 83, we have:

$$\psi = K\theta + C_1 \qquad \text{Eqn. 85}$$

where $C_1 = \gamma_0 - K\theta_0$, and $\psi_0$ and $\theta_0$ are the initial values of $\psi$ and $\theta$, respectively. Plugging Equation 85 into Equation 86 yields:

$$l = C_2 |\sin((K-1)\theta + C_1)|^{\frac{1}{K-1}} \qquad \text{Eqn. 86}$$

where $$C_2 = l_0 / |\sin(\psi_0 - \theta_0)|^{\frac{1}{K-1}}$$

in which $l_0$ is the initial lookout distance. By taking K=2, Equation 86 is reduced to:

$$l = C_2 |\sin(\theta - + C_1)| \qquad \text{Eqn. 87}$$

which is the polar equation of a circle arc.

Figure 22:
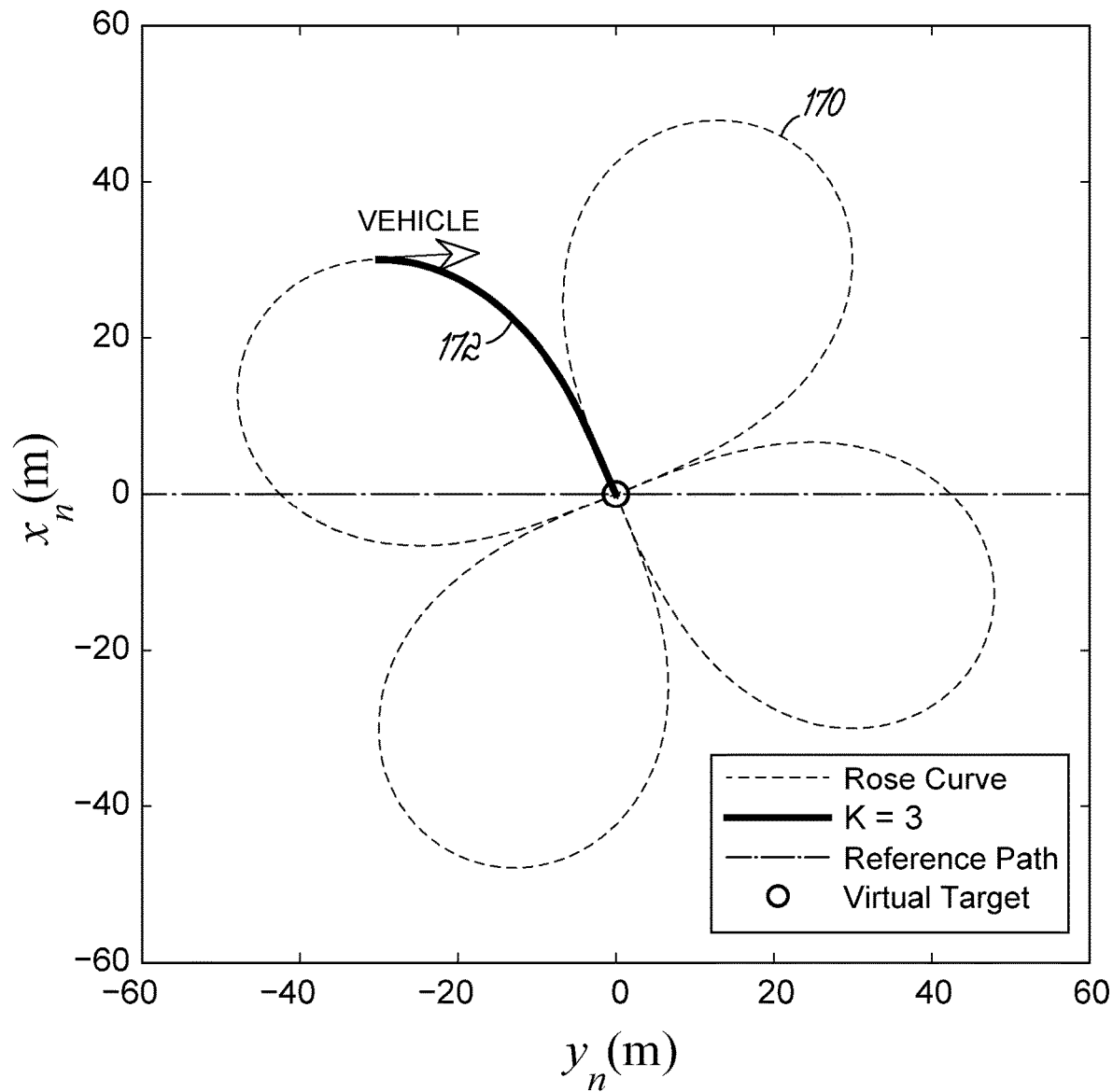
FIG. 22 is a graphical view of a fitted curve for following a virtual target on a reference path for the LOS PPG trajectory planner with a guidance constant K=3.

Referring now to FIG. 22, for the general K>1 condition, Equation 86 may represent a segment 170 of a rose curve 170. Under LOS PPG, the vehicle follows a portion of the rose curve 170 that joints the current pose of the vehicle and the virtual target at each instant. This fact can be confirmed by setting the initial pose $(x_0, y_0, \psi_0)=(30, -30, \pi/2)$, reference path $x_r=0$, the initial lookout distance $l=30\sqrt{2}$, and the initial virtual target $(x_p, y_p)=(0, 0)$. The fitted curve 172 from the initial pose to the virtual target for K=3 and the rose curve 170 is characterized by the equation:

$$l = \left(60/\sqrt[4]{2}\right)|\sin(2\theta + \pi/4)|^{\frac{1}{2}}$$

Figure 23:
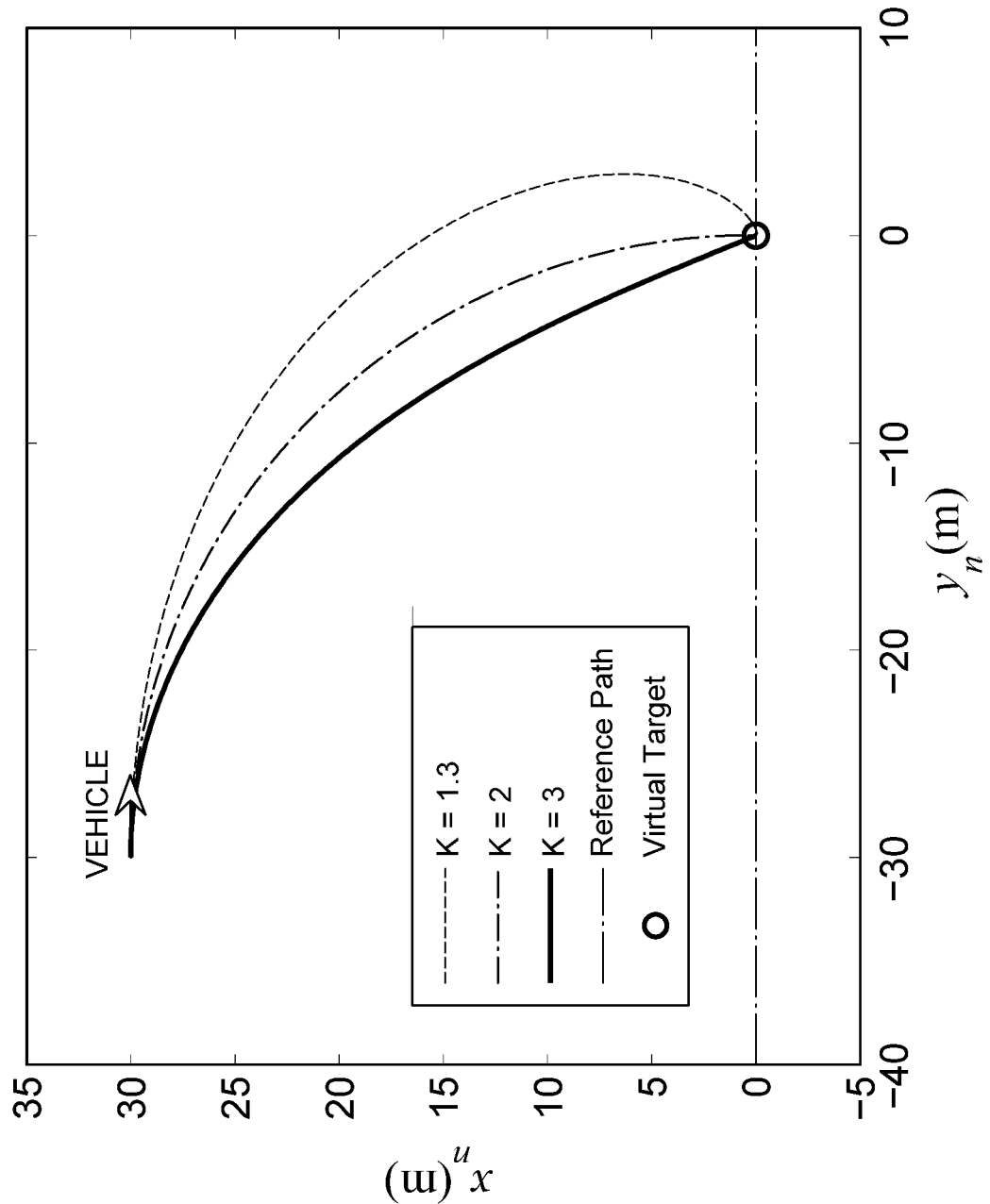
FIG. 23 is a graphical view illustrating fitted curves for the virtual target and reference path of FIG. 22 for different values of the guidance constant K.

It can be seen that the fitted curve 172 and the rose curve 170 overlap. Under the same conditions, the comparison of the fitted curves for different values of K is shown in FIG. 23. We can see that the guidance system has a quicker converging rate as K increases. This observation is in agreement with the previous discussion for Theorem 4.2. The curve is a circle arc when K=2. By the analysis above, we can achieve the geometrical interpretation of LOS PPG, which indicates that LOS PPG is geometrically equivalent to generating the nominal path by repeatedly fitting new rose curve segments to different virtual targets as the vehicle moves forward.

The selection of guidance parameters may affect the ability of the guidance system 150 to cope with delay directly. Reducing the lookout distance l may increase the guidance system's sensitivity to delay in the control loop. Thus, as the lookout distance l becomes larger, the guidance system 150 may need to have an increased ability to handle delay.

From Equation 64, it can be seen that the guidance constant K is proportional to the bandwidth of the guidance loop. The higher the system bandwidth, the weaker the system's ability to deal with delay, which essentially introduces a linear phase lag. Thus, we can conclude that the guidance system's ability to deal with delay would become weaker as K increases.

TABLE IV

Effects of Adjusting Guidance Parameters

| Guidance Parameter | UB(d) | Rate of Convergence | Ability to Deal with Delay |
|---|---|---|---|
| K ↑ | ↑ (K > 2) | ↑ | ↓ |
| l ↑ | ↑ | N/A | ↑ |

The above description describes the effects of the guidance parameters on the cross-track error d, the rate of convergence to steady state, and the ability of the guidance system 150 to deal with delay. These results are summarized in Table IV, where UB(•) represents the ultimate bound of the argument. In the practical LOS PPG design for lane following, the lookout distance l and guidance constant K should be selected according to the curvature of the road, the lane width, and the desired rate of convergence for guidance and the delay in the guidance loop.

The above analysis leads to the following design guidelines for LOS PPG for lane following in which the specific values of the parameters may be determined according to theorems 4.2 and 4.3: (1) The speed limit for u is determined based on the curvature of the road and the dynamic constraints of the vehicle. (2) The lookout distance l and guide constant K are selected based on the curvature of the road, the lane width, the desired rate of convergence for guidance, and the delay in the guidance loop. (3) To manage the magnitude of the cross-track error d in sections having a large curvature, the lookout distance l may be reduced. For example, by making the lookout distance l inversely proportional to the absolute curvature $|K_p|$. (4) To prevent the vehicle from deviating greatly from the center of the lane, the guidance constant K may be increased to increase the rate of convergence in response to a sudden change in the sign of the curvature of the road. (5) To increase the ability of the guidance system 150 to deal with delay in the guidance loop, increase the lookout distance l and decrease the guidance constant K.

Experimental Results for Los PPG Guidance System

Figure 24:
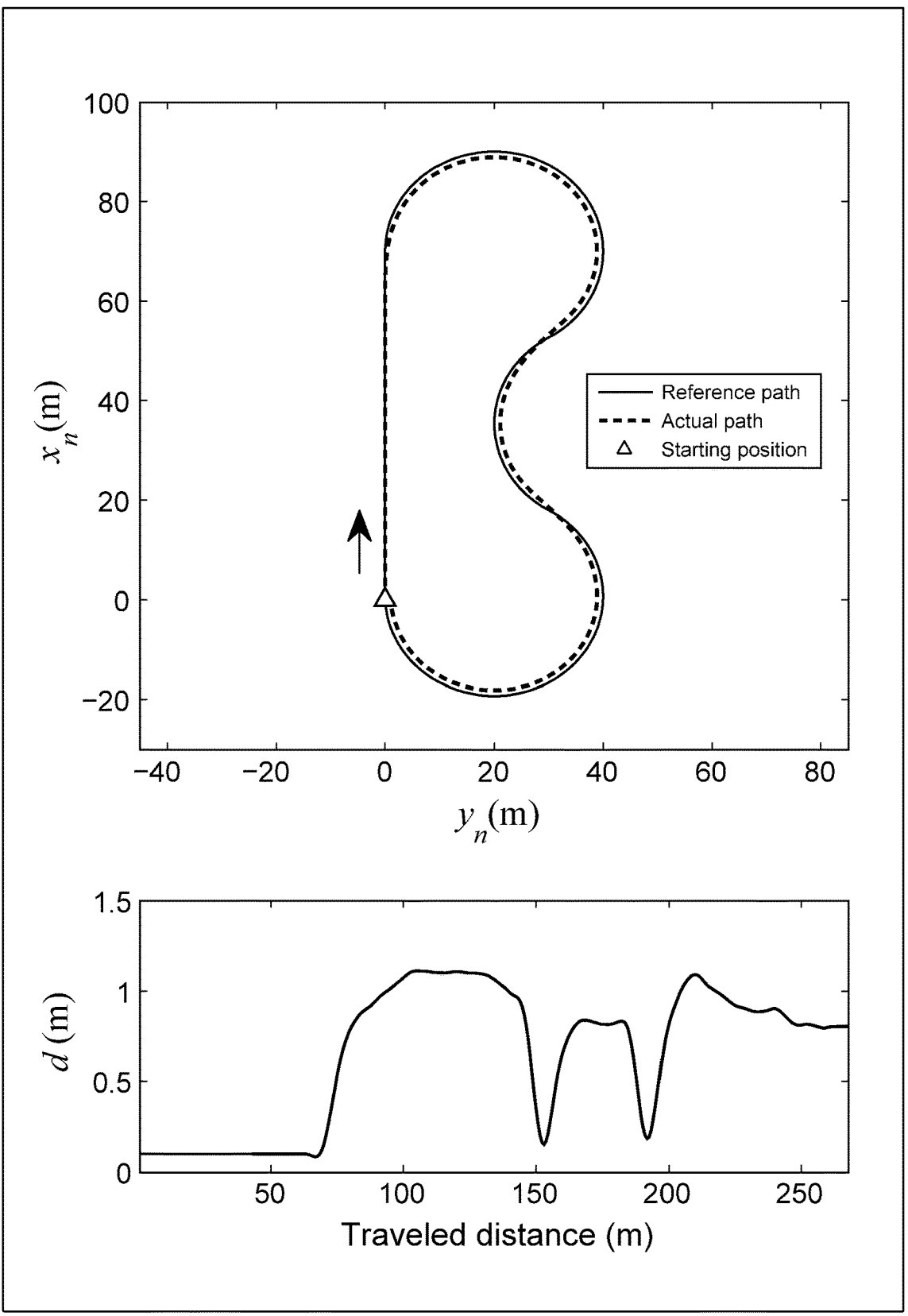
FIG. 24-30 are graphical views of plots depicting reference paths, actual paths, and cross track errors for the LOS PPG trajectory planner using guidance constants K and lookout distances d having various values.
Figure 25:
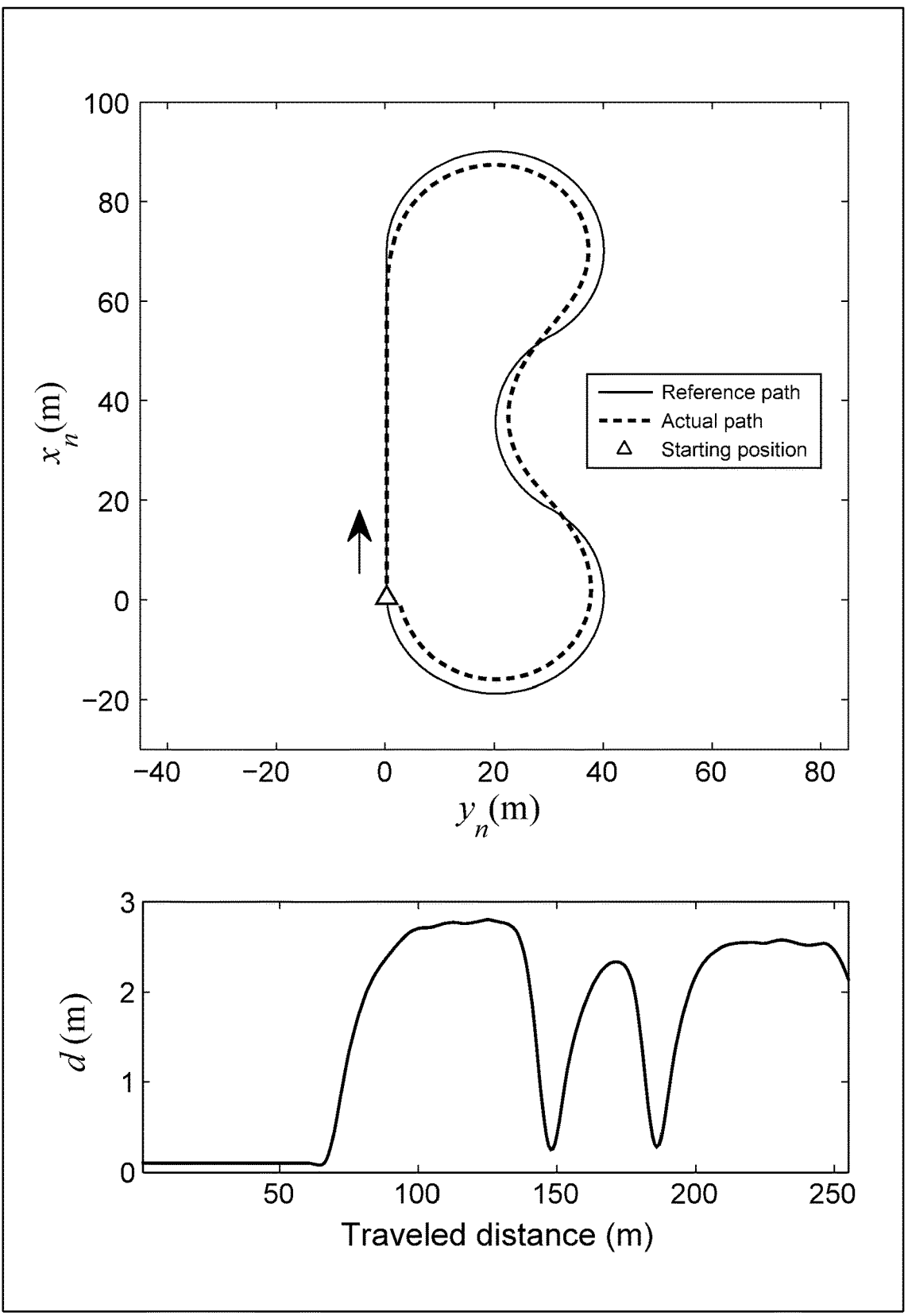
Figure 26:
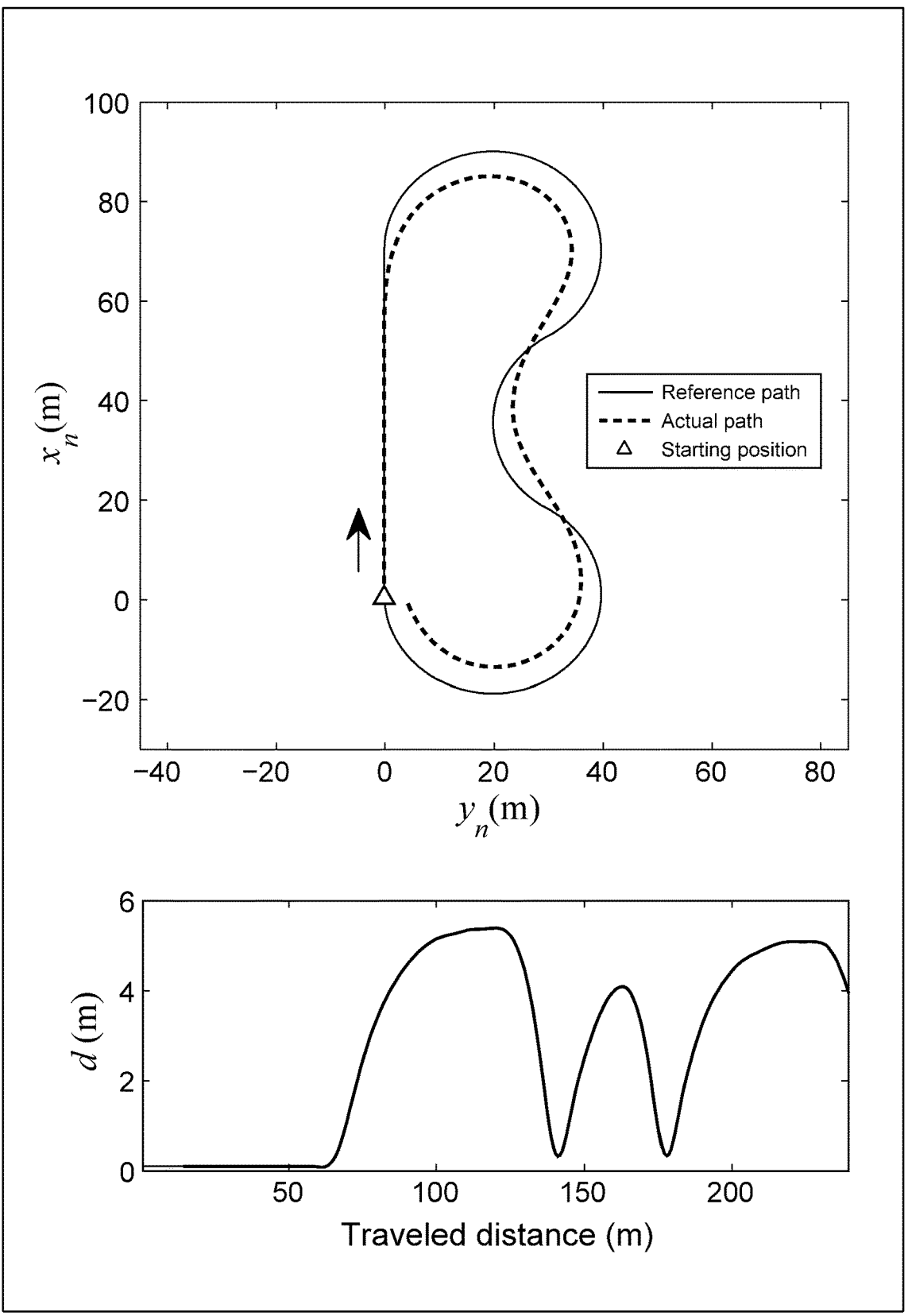
Figure 30:
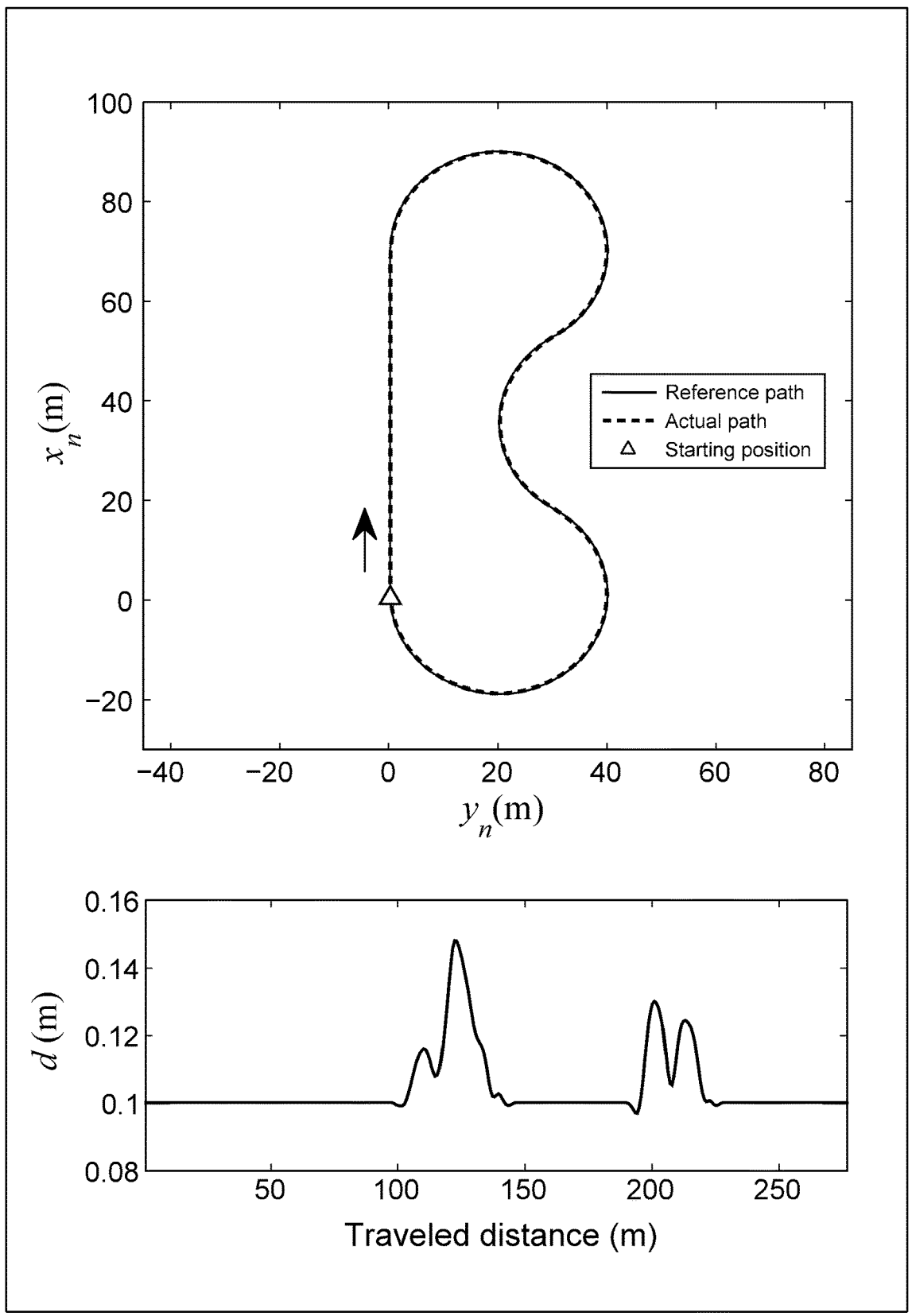

To verify the correctness of the stability analysis and demonstrate the usefulness of the design guideline, two scenarios were studied by simulation. The parameters used in the simulation include a full-size vehicle with minimum turning radius of about 4.75 m, an initial cross-track error of d=0, an initial orientation $\psi_0$ of the vehicle tangent to the reference path, an initial pose $(x_0, y_0, \psi_0)=(0, 0, 0)$, and a reference path including one straight line segment and three circle arcs each having a radius of 20 m. In the first scenario, the guidance constant was set to K=4 and the result observed for lookout distances l=10 m, 15 m, and 20 m, respectively. These results are shown in FIGS. 24-26. From the simulation results, we can see that the ultimate bounds of the cross-track error d decrease as the lookout distance l decreases. These results are exemplary only. In a practical implementation with a circle arc having a radius of 20 m, the lookout distance l may be set to about 5 m to have a cross-track error d less than 0.2 m, as shown in FIG. 30 where K=3 and l=5.

Figure 27:
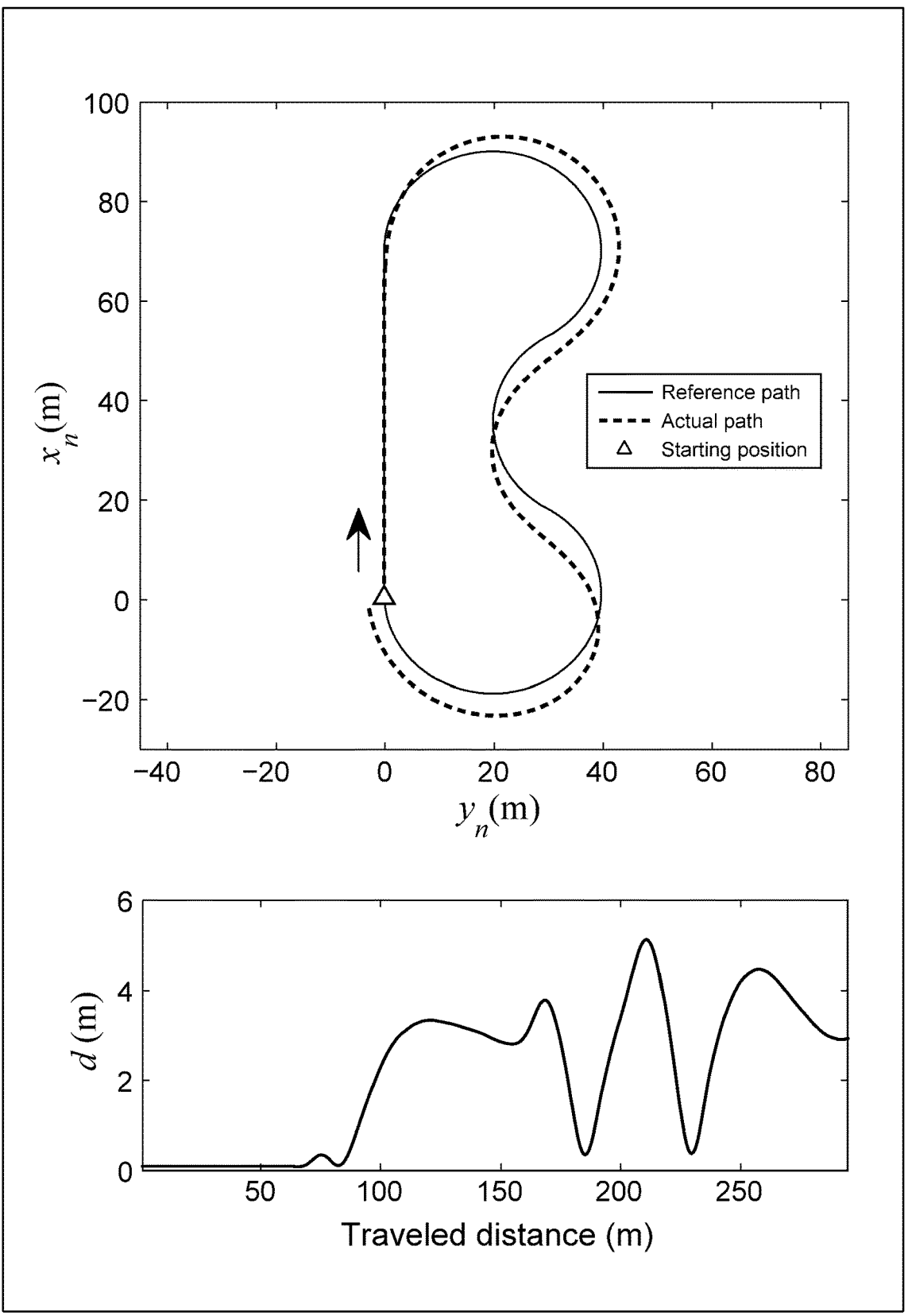
Figure 28:
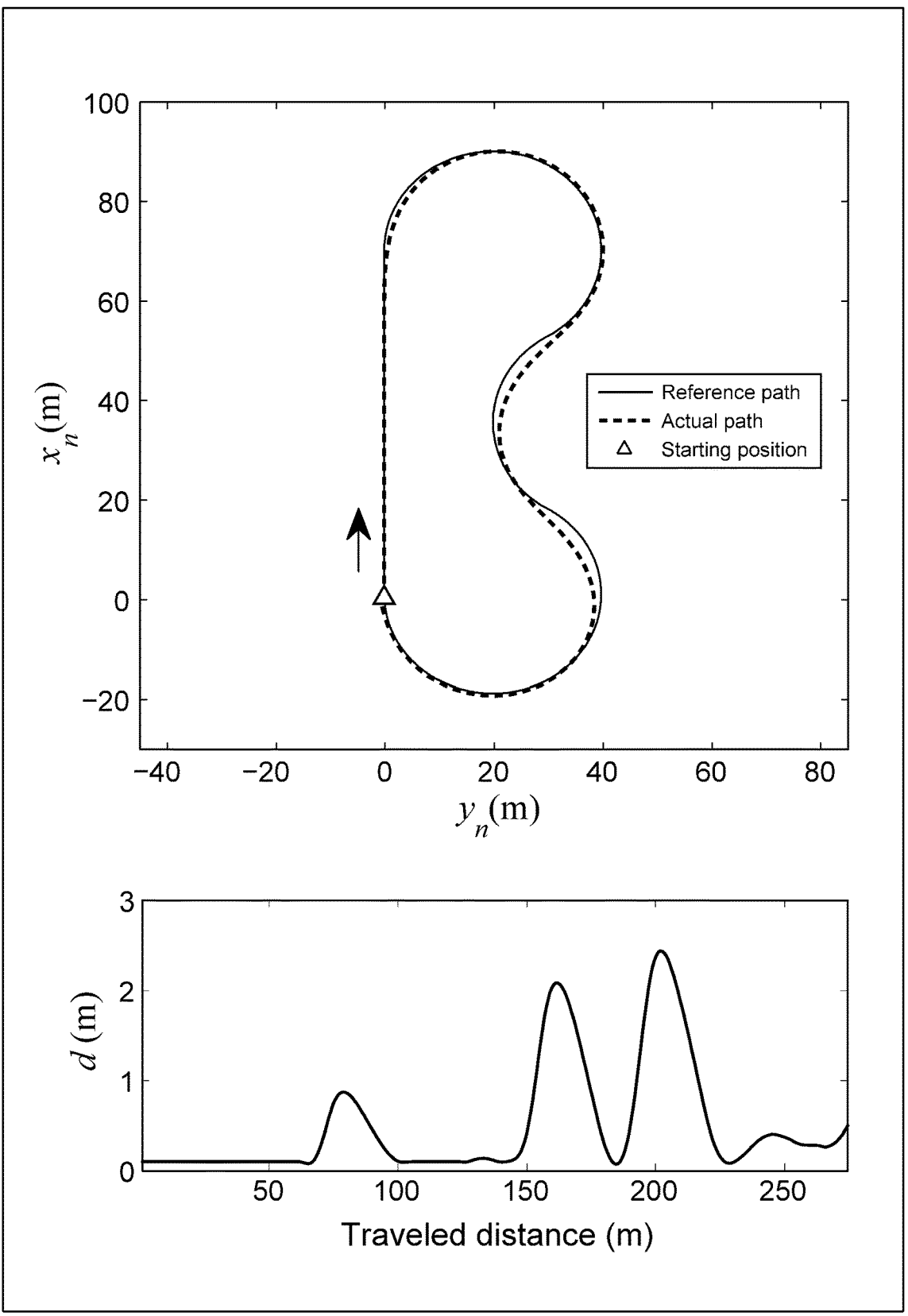
Figure 29:
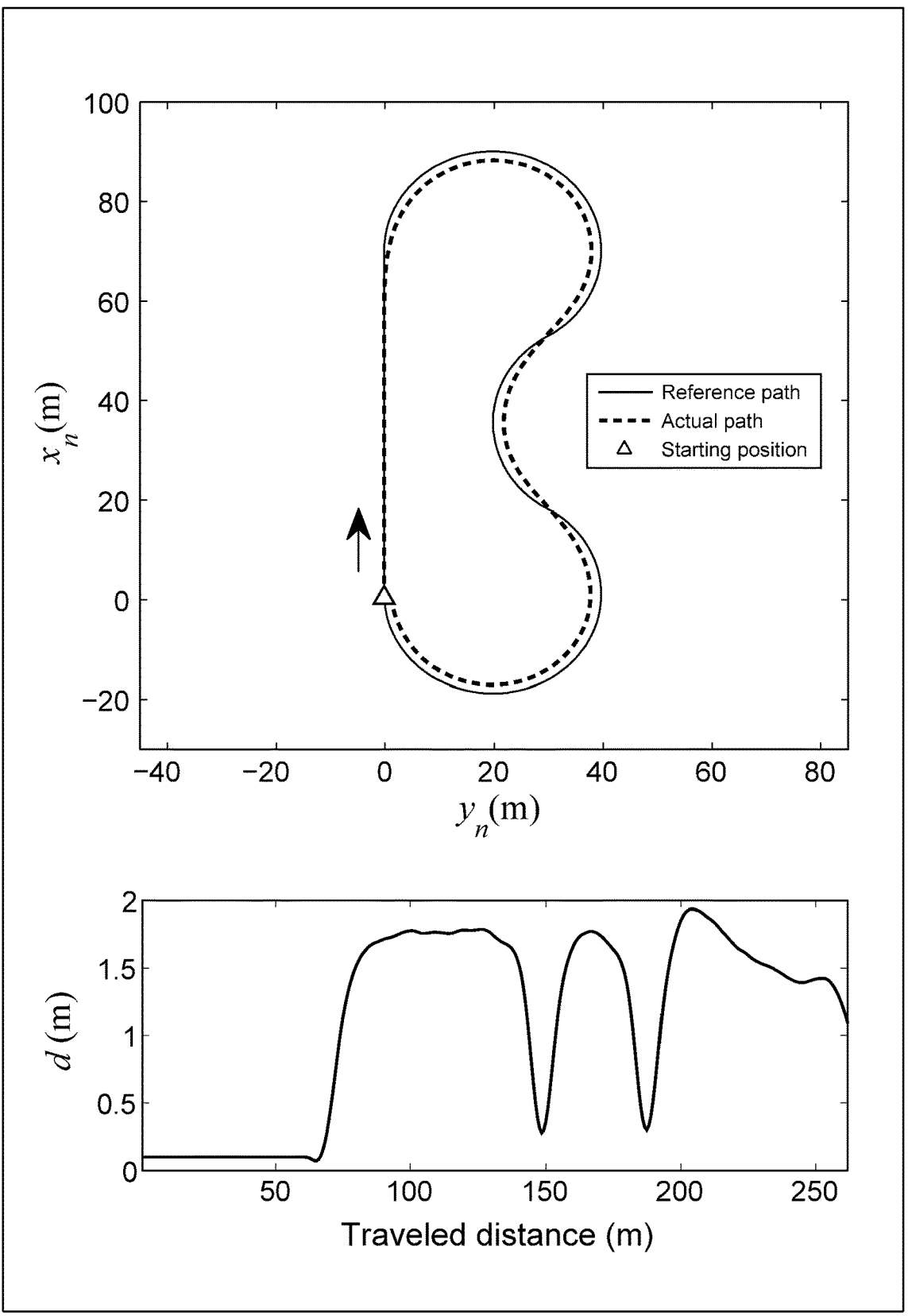

In the second scenario depicted in FIGS. 27-29, the lookout distance l is set to 15 m, and the guidance constant K is set to 1.3, 2, and 3, respectively. FIG. 30 shows the performance of the guidance system 150 with a lookout distance l=5 m and a guidance constant K=3. The simulation results show that a guidance constant K=2 produces a relatively small average value of d as compared to guidance values of 1.3 and 3. However, over portions of the path where the sign of the curvature changes (e.g., at about 150 m and 200 m traveled distance), the value of d for K=2 is larger than for K=3. This result is consistent with the above analysis indicating that a large K would result in a large rate of convergence, thereby increasing the ability of the guidance system 150 to deal with the sudden change in the sign of the curvature. Therefore, a guidance system 150 with a LOS PPG algorithm having a path dependent K may have improved performance over guidance systems lacking this feature.

Figure 31:
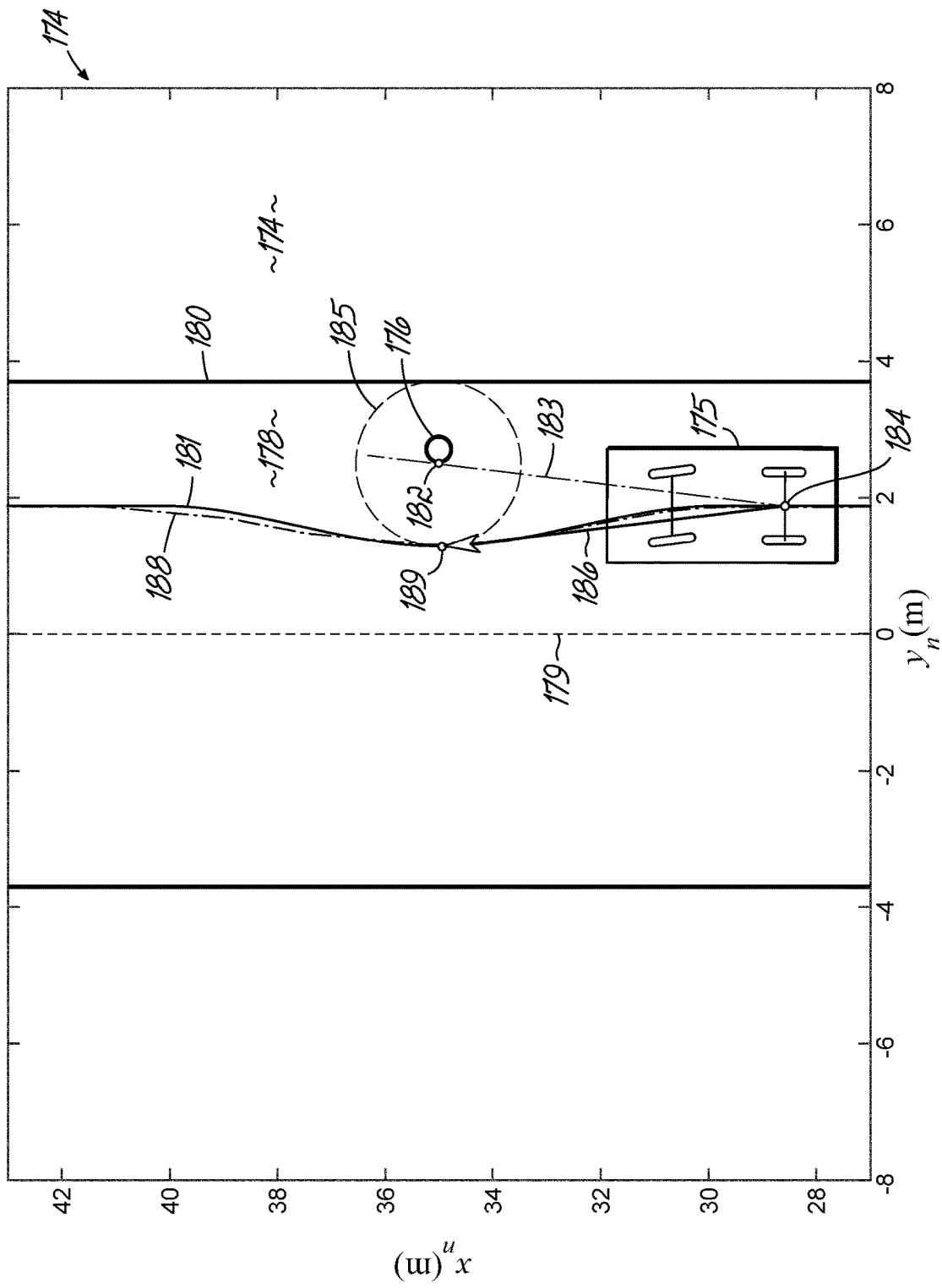
FIGS. 31 and 32 are diagrammatic views of a driving environment including an obstacle that is avoided by the vehicle.

Although path planning and trajectory generation are described above primarily with respect to parking maneuvers, embodiments of the invention are not limited to parking applications. The path planning and trajectory generation features described above may also be used to control vehicles and avoid objects under other driving conditions. By way of example, FIG. 31 depicts a driving environment 174 in which a vehicle 175 encounters an obstacle 176 in a drive aisle 178 bounded by a centerline 179 and an edge-line 180 while following a reference path 181. The obstacle 176 may be an object having dimensions and a location relative to a current path of the vehicle 175 such that the body of the vehicle 175 would contact or come within a minimum clearance distance of the obstacle 176 unless an evasive maneuver is executed. Thus, the obstacle 176 may be an object that is blocking or otherwise interfering with the current path of the vehicle 175.

In response to detecting the obstacle 176, one or more of the control system 10, guidance system 150, or another computer system of vehicle 175 may adjust or otherwise recalculate the reference path 181 to avoid the obstacle 176. To this end, the vehicle system may identify an obstacle corner 182. The obstacle corner 182 may be a point on the obstacle 176 that is last to contact a line 183 extending from a position point 184 of vehicle 175 (e.g., the midpoint of the rear axle, the geometric center of the vehicle, or some other suitable predefined point on the vehicle 175) as the line 183 is rotated about the position point 184 and away from a center of the obstacle 176.

The vehicle system may then define an avoidance circle 185 centered on the obstacle corner 182, e.g., as described above with respect to FIG. 7. The vehicle system may also define additional obstacle corners and avoidance circles (not shown) around other objects which are to be avoided, such as the centerline 179, edge-line 180, another vehicle, a pedestrian, etc. The vehicle system may then define a tangent line 186 that passes through the position point 184 of vehicle 175 and is tangent to the avoidance circle 185 at a ready position 189. The tangent line 186 may be used to define a LOS that is in turn used to determine a new reference path 181 around the obstacle 176. The LOS used to define the new reference path may be limited to LOSs that are within a range of LOS angles γ such that the LOS does not pass through any avoidance circles, or within the minimum clearance distance of any avoidance circles. In cases where a path cannot be found that avoids all obstacles, the vehicle system may bring the vehicle 175 to a stop. This may occur, for example, if there is not enough room between the obstacle 176 and an oncoming car or a prohibited region, e.g., the edge of the road.

Figure 32:
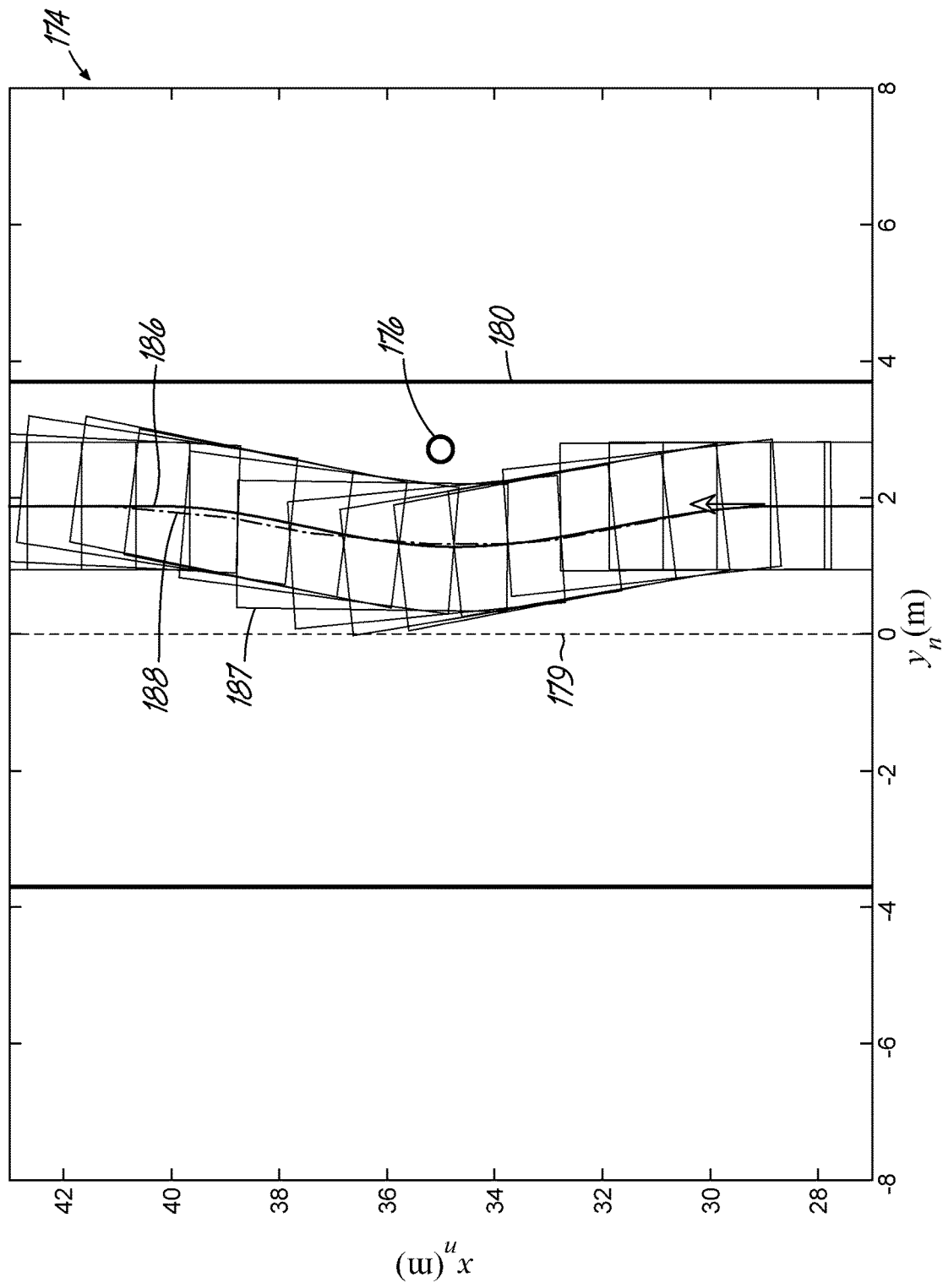

FIG. 32 depicts a plurality of boxes 187 each representing a pose of vehicle 175 as it moves along an actual path 188 following the adjusted reference path 181. The simulated results illustrated by FIG. 32 demonstrate how embodiments of the invention can be used to avoid obstacles in a driving environment. Obstacles can be moving (e.g., other vehicles, pedestrians, etc.) or stationary (e.g., road boundaries, traffic control devices, objects, etc.). By detecting obstacles, identifying one or more obstacle corners on each obstacle, defining avoidance circles around the obstacle corners, and using LOS guidance to avoid penetrating the circles, embodiments of the invention may be used to provide systems, methods, and computer program products for guiding autonomous vehicles.

Obstacle avoidance in general, and in particular with respect to parking, is a desirable feature with countless applications, and yet is one of the greatest challenges to autonomous ground vehicles and mobile robots. Present attempts to solve the challenges of obstacle avoidance have been inadequate. Various aspects of the present invention overcome these challenges and the drawbacks of the prior art.

To this end, certain aspects of the present invention include an autonomous driving system that enables a wheeled vehicle to park and drive around obstacles without human intervention. The autonomous driving system may include one or more algorithms implemented in a computer system onboard of the vehicle, motion sensors, situational awareness sensors, and suitable steering and speed actuators. The autonomous driving system may use a local pathway and obstacle map generated by a situational awareness sensor, or received from an off-board information source, and generate one or more feasible trajectories. These trajectories may be provided to a trajectory tracking controller to park the vehicle in tight spaces or drive through a tightly-cluttered obstacle course. The system may be configured to optimize the trajectory of the vehicle to move promptly and smoothly with minimal maneuvers, time, computational power, and human intervention. Applications of the autonomous driving system include, but are not limited to, wheeled ground vehicles such as automobiles, buses, trucks, and any vehicle-like mobile robots.

One or more aspects or embodiments of the present invention include, but are not limited to, the following features: (1) Instead of finding a path with enough width to accommodate the vehicle, the present method pads the obstacles with a buffer zone for collision avoidance, thereby reducing the feasible path to a single line, which greatly improves the computational efficiency. (2) The obstacle avoidance path planning is formulated as a switched control problem and convergence of the path to the final pose is guaranteed by a common weak Lyapunov function. (3) A feasible path is generated using the LOS-PPG guidance technique for non-holonomic ground vehicles that is described in currently pending International Application No. PCT/US2017/061319, which is hereby incorporated by reference in its entirety, and which produces feasible path segments that are natural and smooth. (4) The path planning process is divided into four steps wherein the more difficult backup driving path segments are first converted into forward driving from the final pose to the initial pose, which greatly simplifies the computations. The backup and forward driving path segments are then joined together within the constraints of the surrounding obstacles. (5) The feasible path is transformed into a trajectory for the vehicle with maximal speed by assigning a maximum allowable constant speed along the path. Then, the speeds at the path segments where the vehicle dynamics constraints or allowable deviations from the path have been violated are altered by an optimal control method. (6) The above described features may be achieved independent of vehicle size.

These above-described features result in, but are not limited to, several benefits, such as (1) a smooth path with the least number of cusps, paths that are applicable to all common parking scenarios with tight parking spaces or tight driving isles, and therefore most difficult obstacle courses, without the need to alter or switch algorithms or human intervention, (3) fast computation times and low computational power requirements, and (4) scalable to vehicles of any size without changes other than the vehicle size parameters.

Further, the present invention—in its various aspects and embodiments can be used for wheeled ground vehicle maneuvering in tightly congested areas and parking autonomously. It can also be modified for applications on surface water vehicles. The path-to-trajectory transformation method can also be allied to autonomous vehicle driving guidance. The algorithms can also be extended to ground vehicles with one or more trailers, and can also be used for autonomous driving wheelchairs for handicapped people or immobile patients.

Figure 33:
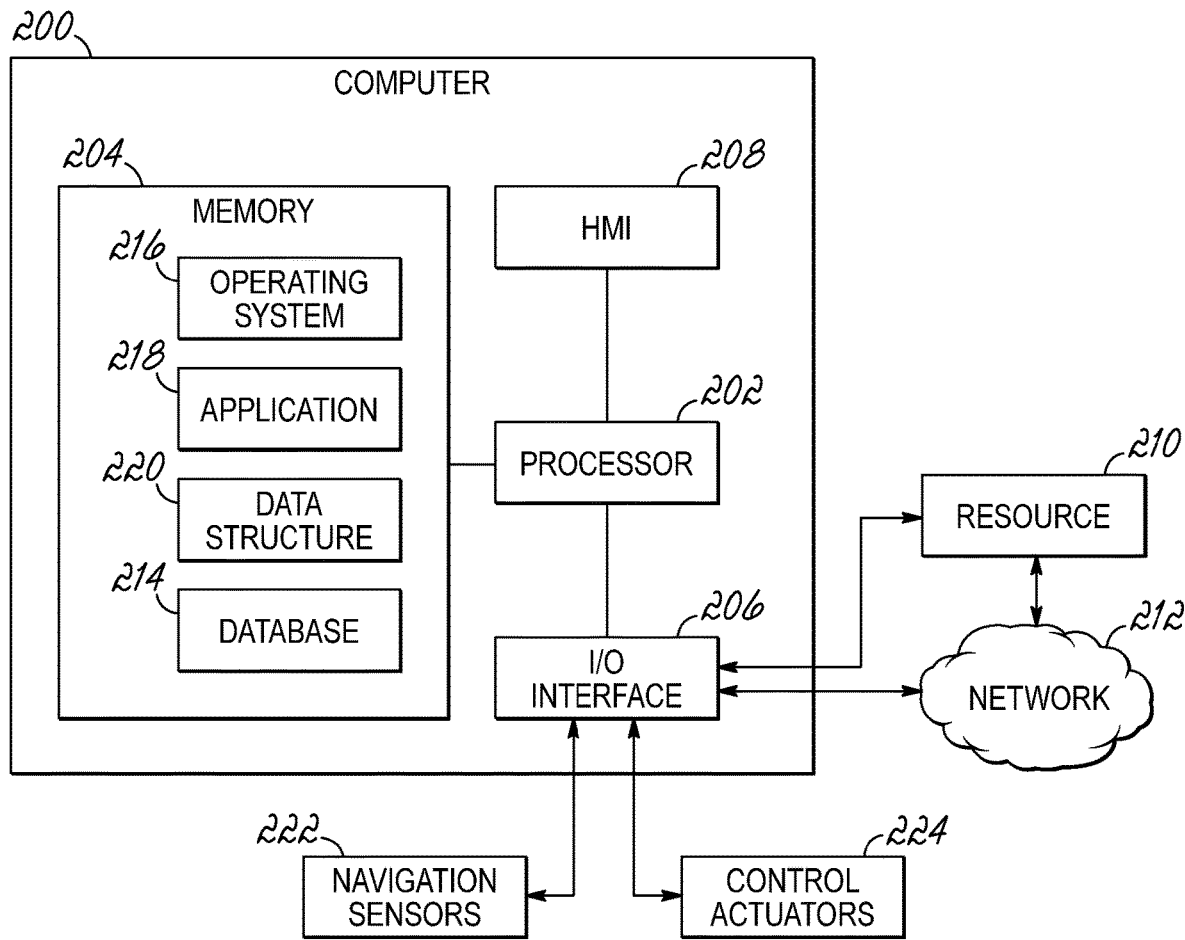
FIG. 33 is a schematic view of an exemplary computing system that may be used to implement one or more of the controllers, modules, or systems illustrated by, or used to generate simulated results illustrated by FIGS. 1-30.

Referring now to FIG. 33, embodiments of the invention described above may be implemented using one or more computer devices or systems, such as exemplary computer system 200. The computer system 200 may include a processor 202, a memory 204, an input/output (I/O) interface 206, and a Human Machine Interface (HMI) 208. The computer system 200 may also be operatively coupled to one or more external resources 210 via the I/O interface 206 or a network 212. The computer may be configured to support real-time communication channels to control actuators 222 and navigation sensors 224.

The processor 202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 204. Memory 204 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The memory 204 may also include data storage devices such as a hard drive, optical drive, tape drive, non-volatile solid state device, or any other device capable of storing information. A database 214 may reside in memory 204, and may be used to collect and organize data used by the various systems and modules described herein.

Processor 202 may operate under the control of an operating system 216 that resides in memory 204. The operating system 216 may manage computer resources so that computer program code embodied as one or more computer software applications, such as application 218 residing in memory 204, may have instructions executed by the processor 202. The operating system 216 may be a real-time operating system that process data as it comes in with little or no buffer delays, and that has well-defined and consistent time constraints. In an alternative embodiment, the processor 202 may execute the applications 218 directly, in which case the operating system 216 may be omitted. One or more data structures 220 may also reside in memory 204, and may be used by the processor 202, operating system 216, or application 218 to store or manipulate data.

The I/O interface 206 may provide a machine interface that operatively couples the processor 202 to other devices and systems, such as the network 212 or external resource 210. The application 218 may thereby work cooperatively with the network 212 or external resource 210 by communicating via the I/O interface 206 to provide the various features, functions, or modules comprising embodiments of the invention. The application 218 may also have program code that is executed by one or more external resources 210, or otherwise rely on functions or signals provided by other system or network components external to the computer system 200. Indeed, given the nearly endless hardware and software configurations possible, persons having ordinary skill in the art will understand that embodiments of the invention may include applications that are located externally to the computer system 200, distributed among multiple computers or other external resources 210, or provided by computing resources (hardware and software) that are provided as a service over the network 212, such as a cloud computing service.

The HMI 208 may be operatively coupled to the processor 202 of computer system 200 to allow a user to interact directly with the computer system 200. The HMI 208 may include video or alphanumeric displays, a touch screen, a speaker, and any other suitable audio and visual indicators capable of providing information to the user. The HMI 208 may also include input devices and controls such as an alphanumeric keyboard, a pointing device, keypads, push-buttons, control knobs, microphones, etc., capable of accepting commands or input from the user and transmitting the entered input to the processor 202.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
    one or more processors; and
    a memory coupled to the one or more processors and including program code that, when executed by the one or more processors, causes the system to:
    define a virtual space including a vehicle, a parking space, an obstacle corner, and a target line in a drive aisle adjacent to the parking space;
    determine a ready position from which the vehicle avoids the obstacle corner when moving along a linear path between the ready position and the target line;
    move the vehicle between a first pose in the parking space and a second pose in the ready position;

move the vehicle between the second pose and a third pose on the target line;
determine a first path segment by tracing the vehicle as the vehicle is moved between the first pose, the second pose, and the third pose;
move the vehicle between a fourth pose outside the parking space and a fifth pose on the target line;
determine a second path segment by tracing the vehicle as the vehicle is moved between the fourth pose and the fifth pose;
connect the first path segment to the second path segment to define a virtual path between the first pose and the fourth pose; and
generate one or more control signals that cause a physical vehicle to move in a physical space using the virtual path in the virtual space.

2. The system of claim 1 wherein the first pose is one of an initial pose or a final pose, and the fourth pose is the other of the initial pose or the final pose.

3. The system of claim 1 wherein the program code causes the system to move the vehicle between the first pose in the parking space and the second pose in the ready position by moving the vehicle from the first pose to the second pose, and move the vehicle between the second pose and the third pose by moving the vehicle from the third pose to the second pose.

4. The system of claim 1 wherein the program code causes the system to define the virtual space to further include a bounded region, and the vehicle is kept within the bounded region.

5. The system of claim 1 wherein the vehicle includes an orientation and a position, and when the vehicle is in the third pose, the orientation of the vehicle is within an orientation tolerance of the target line and the position of the vehicle is within a position tolerance of the target line.

6. The system of claim 1 wherein the vehicle has a longitudinal axis and a width, and the program code causes the system to move the vehicle between the first pose and the second pose by:
defining an avoidance circle around the obstacle corner having a radius greater than half the width of the vehicle;
maneuvering the vehicle from the first pose until the longitudinal axis is pointing out of the parking space without hitting the avoidance circle;
straightening a steering angle of the vehicle; and
moving the vehicle forward to the second pose.

7. The system of claim 6 wherein the vehicle has a rear axle having a midpoint, and the program code causes the system to maneuver the vehicle from the first pose until the longitudinal axis is pointing out of the parking space without hitting the avoidance circle by:
defining a line-of-sight that intersects the midpoint of the rear axle, points out of the parking space, and is tangent to the avoidance circle; and
alternately adjusting the steering angle and moving the vehicle backward and forward one or more times until an acute angle between the longitudinal axis of the vehicle and the line-of- sight is below an orientation threshold.

8. The system of claim 1 wherein the program code further causes the system to generate the one or more control signals by converting the virtual path to a trajectory that satisfies kinematics constraints of the vehicle, dynamics constraints of the vehicle, or both the kinematics constraints and the dynamics constraints of the vehicle.

9. The system of claim 8 wherein the virtual path includes one or more path segments, the program code causes the system to convert the virtual path to the trajectory by assigning a prespecified velocity profile to each path segment, and the prespecified velocity profile is selected from a plurality of prespecified velocity profiles based on a cost function that minimizes an error between the trajectory and the virtual path.

10. The system of claim 8 wherein the vehicle has a rear axle having a midpoint, and the program code causes the system to convert the virtual path to the trajectory by:
defining a line-of-sight that intersects the midpoint of the rear axle of the vehicle and a virtual target on the virtual path;
selecting a position of the virtual target on the virtual path that provides a lookout distance and a line-of-sight angle; and
determining a yaw rate for the vehicle based on the lookout distance, the line-of-sight angle, and a speed of the vehicle.

11. The system of claim 10 wherein the speed for the vehicle is determined based on a curvature of the virtual path, the position of the virtual target is selected so that the lookout distance is inversely proportional to the curvature of the virtual path, the yaw rate for the vehicle and the speed for the vehicle are further determined based on a guidance constant, and the guidance constant is increased in response to a change in a sign of the curvature of the virtual path.

12. A method comprising:
defining a virtual space including a vehicle, a parking space, an obstacle corner, and a target line in a drive aisle adjacent to the parking space;
determining a ready position from which the vehicle avoids the obstacle corner when moving along a linear path between the ready position and the target line;
moving the vehicle between a first pose in the parking space and a second pose in the ready position;
moving the vehicle between the second pose and a third pose on the target line;
determining a first path segment by tracing the vehicle as the vehicle is moved between the first pose, the second pose, and the third pose;
moving the vehicle between a fourth pose outside the parking space and a fifth pose on the target line;
determining a second path segment by tracing the vehicle as the vehicle is moved between the fourth pose and the fifth pose;
connecting the first path segment to the second path segment to define a virtual path between the first pose and the fourth pose; and
generating one or more control signals that cause a physical vehicle to move in a physical space using the virtual path in the virtual space.

13. The method of claim 12 wherein the first pose is one of an initial pose or a final pose, and the fourth pose is the other of the initial pose or the final pose.

14. The method of claim 12 wherein the vehicle has a longitudinal axis and a width, and moving the vehicle between the first pose and the second pose includes:
defining an avoidance circle around the obstacle corner having a radius greater than half the width of the vehicle;
maneuvering the vehicle from the first pose until the longitudinal axis is pointing out of the parking space without hitting the avoidance circle;
straightening a steering angle of the vehicle; and
moving the vehicle forward to the second pose.

15. The method of claim 14 wherein the vehicle has a rear axle having a midpoint, and maneuvering the vehicle from the first pose until the longitudinal axis is pointing out of the parking space without hitting the avoidance circle includes:
   defining a line-of-sight that intersects the midpoint of the rear axle, points out of the parking space, and is tangent to the avoidance circle; and
   alternately adjusting the steering angle and moving the vehicle backward and forward one or more times until an acute angle between the longitudinal axis of the vehicle and the line-of- sight is below an orientation threshold.

16. The method of claim 12 wherein the one or more control signals is generated by converting the virtual path to a trajectory that satisfies kinematics constraints of the vehicle, dynamics constraints of the vehicle, or both the kinematics constraints and the dynamics constraints of the vehicle.

17. The method of claim 16 wherein the virtual path includes one or more path segments, the virtual path is converted to the trajectory by assigning a prespecified velocity profile to each path segment, and the prespecified velocity profile is selected from a plurality of prespecified velocity profiles based on a cost function that minimizes an error between the trajectory and the virtual path.

18. The method of claim 16 wherein the vehicle has a rear axle having a midpoint, and converting the virtual path to the trajectory includes:
   defining a line-of-sight that intersects the midpoint of the rear axle of the vehicle and a virtual target on the virtual path;
   selecting a position of the virtual target on the virtual path that provides a lookout distance and a line-of-sight angle; and
   determining a yaw rate for the vehicle based on the lookout distance, the line-of-sight angle, and a speed of the vehicle.

19. The method of claim 18 wherein the speed for the vehicle is determined based on a curvature of the virtual path, the position of the virtual target is selected so that the lookout distance is inversely proportional to the curvature of the virtual path, the yaw rate for the vehicle and the speed for the vehicle are further determined based on a guidance constant, and the guidance constant is increased in response to a change in a sign of the curvature of the virtual path.

20. A computer program product comprising:
   a non-transitory computer-readable storage medium; and
   program code stored on the non-transitory computer-readable storage medium that, when executed by one or more processors, causes the one or more processors to:
   define a virtual space including a vehicle, a parking space, an obstacle corner, and a target line in a drive aisle adjacent to the parking space;
   determine a ready position from which the vehicle avoids the obstacle corner when moving along a linear path between the ready position and the target line;
   move the vehicle between a first pose in the parking space and a second pose in the ready position;
   move the vehicle between the second pose and a third pose on the target line;
   determine a first path segment by tracing the vehicle as the vehicle is moved between the first pose, the second pose, and the third pose;
   move the vehicle between a fourth pose outside the parking space and a fifth pose on the target line;
   determine a second path segment by tracing the vehicle as the vehicle is moved between the fourth pose and the fifth pose;
   connect the first path segment to the second path segment to define a virtual path between the first pose and the fourth pose; and
   generate one or more control signals that cause a physical vehicle to move in a physical space using the virtual path in the virtual space.

* * * * *